United States Patent
Noma

(10) Patent No.: US 9,032,718 B2
(45) Date of Patent: May 19, 2015

(54) ENGINE DEVICE

(75) Inventor: Yasuo Noma, Osaka (JP)

(73) Assignee: Yanmar Co., Ltd, Osaka (JP)

( * ) Notice: Subject to any disclaimer, the term of this patent is extended or adjusted under 35 U.S.C. 154(b) by 75 days.

(21) Appl. No.: 13/261,092

(22) PCT Filed: Jul. 1, 2010

(86) PCT No.: PCT/JP2010/061244
§ 371 (c)(1),
(2), (4) Date: Jan. 20, 2012

(87) PCT Pub. No.: WO2011/002055
PCT Pub. Date: Jan. 6, 2011

(65) Prior Publication Data
US 2012/0124979 A1    May 24, 2012

(30) Foreign Application Priority Data

Jul. 2, 2009 (JP) .................................. 2009-158143
Jul. 7, 2009 (JP) .................................. 2009-160960

(51) Int. Cl.
| | |
|---|---|
| *F01N 3/02* | (2006.01) |
| *F02D 41/02* | (2006.01) |
| *B66F 9/075* | (2006.01) |
| *E02F 9/20* | (2006.01) |
| *F01N 3/021* | (2006.01) |
| *F01N 13/18* | (2010.01) |
| *F02D 41/08* | (2006.01) |
| *F01N 13/00* | (2010.01) |

(52) U.S. Cl.
CPC .......... *F02D 41/029* (2013.01); *B66F 9/07595* (2013.01); *E02F 9/2066* (2013.01); *E02F 9/2095* (2013.01); *F01N 3/0211* (2013.01); *F01N 13/1855* (2013.01); *F01N 2470/02* (2013.01); *F01N 2470/18* (2013.01); *F01N 2470/24* (2013.01); *F01N 2590/08* (2013.01); *F02D 41/0205* (2013.01); *F02D 41/0245* (2013.01); *F02D 41/08* (2013.01); *Y02T 10/20* (2013.01); *F01N 13/0097* (2014.06)

(58) Field of Classification Search
USPC ..................................... 60/311, 297, 295, 287
See application file for complete search history.

(56) References Cited

U.S. PATENT DOCUMENTS

| | | | |
|---|---|---|---|
| 2003/0217549 A1* | 11/2003 | Watanabe et al. ............... | 60/285 |
| 2010/0095656 A1 | 4/2010 | Kamiya et al. | |
| 2010/0170227 A1 | 7/2010 | Tsukada et al. | |

FOREIGN PATENT DOCUMENTS

| | | |
|---|---|---|
| CN | 101379284 | 3/2009 |
| JP | 5-312082 | 11/1993 |
| JP | 9-025838 | 1/1997 |

(Continued)

*Primary Examiner* — Thomas Denion
*Assistant Examiner* — Kelsey Stanek
(74) *Attorney, Agent, or Firm* — Jordan and Hamburg LLP

(57) ABSTRACT

In an engine device provided with an engine which serves as a power source, an exhaust gas purifying filter device which is arranged in an exhaust gas path of the engine, and control means which executes a low rotation control for lowering an engine speed to a predetermined first low rotating speed at a time when a previously set low rotation condition is established, the control means is structured such as to maintain the engine speed at a second low rotating speed which is higher than the first low rotating speed, for suppressing a reduction of an exhaust gas temperature at a time when both of the low rotation condition and a previously set forced regeneration condition are established.

2 Claims, 31 Drawing Sheets

(56) References Cited

FOREIGN PATENT DOCUMENTS

| JP | 9-088650 | 3/1997 | |
|---|---|---|---|
| JP | 2000-145430 | 5/2000 | |
| JP | 2003-027922 | 1/2003 | |
| JP | 2004-340152 | 12/2004 | |
| JP | WO2008090695 | * | 7/2008 |
| JP | 2009-079501 | | 4/2009 |
| JP | WO2009041165 | * | 4/2009 |
| JP | 2009-138689 | | 6/2009 |
| JP | 2010-065577 | | 3/2010 |
| WO | WO-2009/060719 | | 5/2009 |

* cited by examiner

ENGINE DEVICE

TECHNICAL FIELD

The present invention relates to an engine device which is mounted to a working machine (for example, an agricultural machine, a construction machine, a marine vessel or the like).

BACKGROUND ART

Conventionally, in a working machine such as a combined harvester or a hydraulic shovel, there has been employed a technique of a so-called automatic low rotation control (an auto deceleration control) which automatically lowers an engine speed to a low idle rotating speed under a predetermined condition so as to achieve a low fuel consumption and a low noise (refer to patent documents 1 and 2). For example, in the patent document 1, there is disclosed such a matter that an engine speed is lowered to a low idle rotating speed if a grain threshing clutch connecting and disconnecting a power transmission to a grain threshing device is in an off state and a main shift lever for carrying out a shift operation of a traveling machine body becomes in a neutral state, under a state in which an idling selection switch is operated to be turned on, in a combined harvester. In the patent document 2, there is disclosed such a matter that an engine speed is lowered to a low idle rotating speed in the case that an operating lever operating a working portion (a bucket or the like) of a hydraulic shovel is not operated continuously for a predetermined time.

Further, in the working machine, there is a structure which employs a so-called forced low rotation control (a one touch deceleration control) which achieves a low fuel consumption and a low noise by automatically lowering the engine speed to the low idle rotating speed, on the basis of a push-down operation of a push button type switch which is arranged within a control portion (refer to patent document 3).

On the other hand, in conjunction with an application of emission regulations of high order relating to a diesel engine, it is going to be desired to mount an exhaust gas purifying device which purifies an air pollutant in an exhaust gas to a working machine on which the diesel engine is mounted. As the exhaust gas purifying device, for example, a diesel particulate filter (DPF) has been known (refer to patent documents 4 and 5). In the DPF, since a particulate matter in the exhaust gas is piled up in a soot filter due to an aged use, the soot filter is regenerated by burning and removing the particulate matter at a time of driving the diesel engine. As is known well, a soot filter regenerating action occurs in the case that a temperature of an exhaust gas is equal to or higher than a regenerable temperature (for example, about 300° C.).

If a state in which the exhaust gas temperature is less than the regenerable temperature carries over, a lot of particulate matters are piled up in the soot filter. As a result, the soot filter is clogged and an exhaust gas pressure rises up, thereby causing an engine trouble. As one example of a countermeasure for dissolving the problem, there has been known a forced regeneration control which enhances an output (a rotating speed or a load) of a diesel engine in the case that a depositing amount of the particulate matter reaches a predetermined amount, thereby forcibly raising a temperature of the exhaust gas conducted to the DPF so as to burn and remove the particulate matter collected in the DPF.

CITATION LIST

Patent Literature

Patent Document 1: Japanese Unexamined Patent Publication No. 9-25838

Patent Document 2: Japanese Patent Application Laid-open No. 5-312082

Patent Document 3: Japanese Patent Application Laid-open No. 9-88650

Patent Document 4: Japanese Patent Application Laid-open No. 2000-145430

Patent Document 5: Japanese Patent Application Laid-open No. 2003-27922

SUMMARY OF INVENTION

Technical Problem

As mentioned above, the automatic low rotation control (the auto deceleration control) and the forced low rotation control (the one touch deceleration control) are the control for decelerating the output of the engine, however, the forced regeneration control is the control for ascending the output of the engine, so that both are in a mutually opposed relationship. However, in the case that the DPF is mounted to the working machine, it is necessary to make the low rotation control and the forced regeneration control compatible. The present invention is made by taking the point mentioned above into consideration, and an object of the present invention is to provide an engine device which can execute both of a low rotation control and a forced regeneration control.

Solution to Problem

The invention of claim 1 is an engine device comprising an engine which serves as a power source, an exhaust gas purifying filter device which is arranged in an exhaust gas path of the engine, and control means which executes a low rotation control for lowering an engine speed to a predetermined first low rotating speed at a time when a previously set low rotation condition is established, wherein the control means is structured such as to maintain the engine speed at a second low rotating speed which is higher than the first low rotating speed, for suppressing a reduction of an exhaust gas temperature at a time when both of the low rotation condition and a previously set forced regeneration condition are established.

The invention of claim 2 is an engine device described in claim 1, wherein the control means is structured such as to lower the engine speed to the first low rotating speed, at a time when only the forced regeneration condition dissolves after setting the engine speed to the second low rotating speed.

The invention of claim 3 is an engine device described in claim 1 or 2, wherein the control means is structured such as to return the engine speed to an original rotating speed before both of the conditions are established, at a time when both of the low rotation condition and the forced regeneration condition dissolve, after setting the engine speed to the second low rotating speed.

The invention of claim 4 is an engine device comprising an engine which serves as a power source, an exhaust gas purifying filter device which is arranged in an exhaust gas path of the engine, and control means which executes a forced regeneration control of the filter device on the basis of a clogged state of the filter device and a driving state of the engine, wherein the engine device further comprises forced low rotation operating means for executing a forced low rotation control which forcibly lowers the engine speed to a predetermined low rotating speed, and the control means is structured such as to execute the forced low rotation control in preference at a time of operating the forced low rotation operating means to be turned on, regardless of necessity of the forced regeneration control.

The invention of claim 5 is an engine device described in claim 4, wherein the control means is structured such as to stop the forced low rotation control at a time of operating moving system operating means or working system operating means with respect to a working machine on which the engine is mounted, execute the forced regeneration control if a clogged state of the filter device reaches a previously set state at this time, and return the engine speed to an original rotating speed before being lowered if the clogged state of the filter device does not reach the previously set state.

The invention of claim 6 is an engine device described in claim 4 or 5, wherein the control means is structured such as to inform by informing means which is connected to the control means at a time when the clogged state in the filter device reaches the previously set state during an execution of the forced low rotation control.

Advantageous Effect of Invention

According to the invention of claim 1, since in the engine device comprising the engine which serves as the power source, the exhaust gas purifying filter device which is arranged in the exhaust gas path of the engine, and the control means which executes the low rotation control for lowering the engine speed to the predetermined first low rotating speed at a time when the previously set low rotation condition is established, the control means is structured such as to maintain the engine speed at the second low rotating speed which is higher than the first low rotating speed, for suppressing the reduction of the exhaust gas temperature at a time when both of the low rotation condition and the previously set forced regeneration condition are established, the engine speed is maintained at the second low rotating speed (a high idle rotating speed) which is higher than the first low rotating speed (a low idle rotating speed) as long as the filter device is going to be clogged to some extent, even during an execution of the low rotation control which lowers the output of the engine. Thus, it is possible to suppress a reduction of the exhaust gas temperature so as to prevent a deterioration of the clogged state of the filter device, while intending a saving of a fuel consumption and a suppression of a noise due to the low rotation control. In other words, it is possible to suppress a progress of the clogging of the filter device in such a range as not to deteriorate a function of the low rotation control, and it is accordingly possible to enjoy two benefits, that is, a fuel consumption saving and an exhaust gas purification by the working machine. There is achieved such an effect that it is possible to avoid a trouble of a failure caused by the clogging of the filter device because of the execution of the low rotation control.

Further, according to the invention of claim 2, since in the engine device described in claim 1, the control means is structured such as to lower the engine speed to the first low rotating speed, at a time when only the forced regeneration condition dissolves after setting the engine speed to the second low rotating speed, there is achieved such an effect that it is possible to further improve a fuel consumption reducing effect on the basis of the low rotation control.

Further, according to the invention of claim 3, since in the engine device described in claim 1 or 2, wherein the control means is structured such as to return the engine speed to the original rotating speed before both of the conditions are established, at a time when both of the low rotation condition and the forced regeneration condition dissolve, after setting the engine speed to the second low rotating speed, it is possible to easily secure the output of the engine only by carrying out an operation for starting the working machine or an operation for driving a working portion. Therefore, there is achieved such an effect that it is possible to securely prevent a problem that the engine rapidly stops due to a lack of the output or an overload, by starting the working machine or driving the working portion under the first low rotating speed (the low idle rotating speed), at a time of returning from the low rotation control.

According to the invention of claim 4, since in the engine device comprising the engine which serves as the power source, the exhaust gas purifying filter device which is arranged in the exhaust gas path of the engine, and the control means which executes the forced regeneration control of the filter device on the basis of the clogged state of the filter device and the driving state of the engine, the engine device further comprises the forced low rotation operating means for executing the forced low rotation control which forcibly lowers the engine speed to the predetermined low rotating speed, and the control means is structured such as to execute the forced low rotation control in preference at a time of operating the forced low rotation operating means to be turned on, regardless of necessity of the forced regeneration control, the forced regeneration control for raising the output of the engine is not carried out in an overlapping manner, during the execution of the forced low rotation control for lowering the output of the engine. Thus, it is possible to efficiently execute each of the controls without overlapping, in addition to coexistence of two fuel injection controls (the forced low rotation control and the forced regeneration control) which require the mutually opposed actions to the engine. Therefore, it is possible to achieve such an effect that the fuel consumption saving and the exhaust gas purification in the working machine are compatible. Further, there is such an advantage that it is possible to do away with an uncomfortable feeling of an operator due to a rapid change of an engine noise.

Further, according to the invention of claim 5, since the control means is structured such as to stop the forced low rotation control at a time of operating the moving system operating means or the working system operating means with respect to the working machine on which the engine is mounted, execute the forced regeneration control if the clogged state of the filter device reaches the previously set state at this time, and return the engine speed to the original rotating speed before being lowered if the clogged state of the filter device does not reach the previously set state, it is possible to easily secure the output of the engine only by carrying out the operation for starting the working machine or the operation for driving the working portion, even if an operator fails to carry out the returning operation from the forced low rotation control. Therefore, there is achieve such an effect that it is possible to securely prevent a problem that the engine rapidly stops due to a lack of the output or the overload, by starting the working machine or driving the working portion under the low rotating speed, at a time of returning from the forced low rotation control.

Further, according to the invention of claim 6, since the control means is structured such as to inform by the informing means which is connected to the control means, at a time when the clogged state in the filter device reaches the previously set state during the execution of the forced low rotation control, there is achieved such an effect that it is possible to comprehend whether the clogging is generated in the filter device so as to call an operator's attention to the clogging of the filter device, even during the execution of the forced low rotation control in which the forced regeneration control is inhibited. Since the forced low rotation control is executed, there is such an advantage that it is possible to avoid a trouble of a failure caused by the clogging of the filter device.

DESCRIPTION OF EMBODIMENTS

Figure 1:
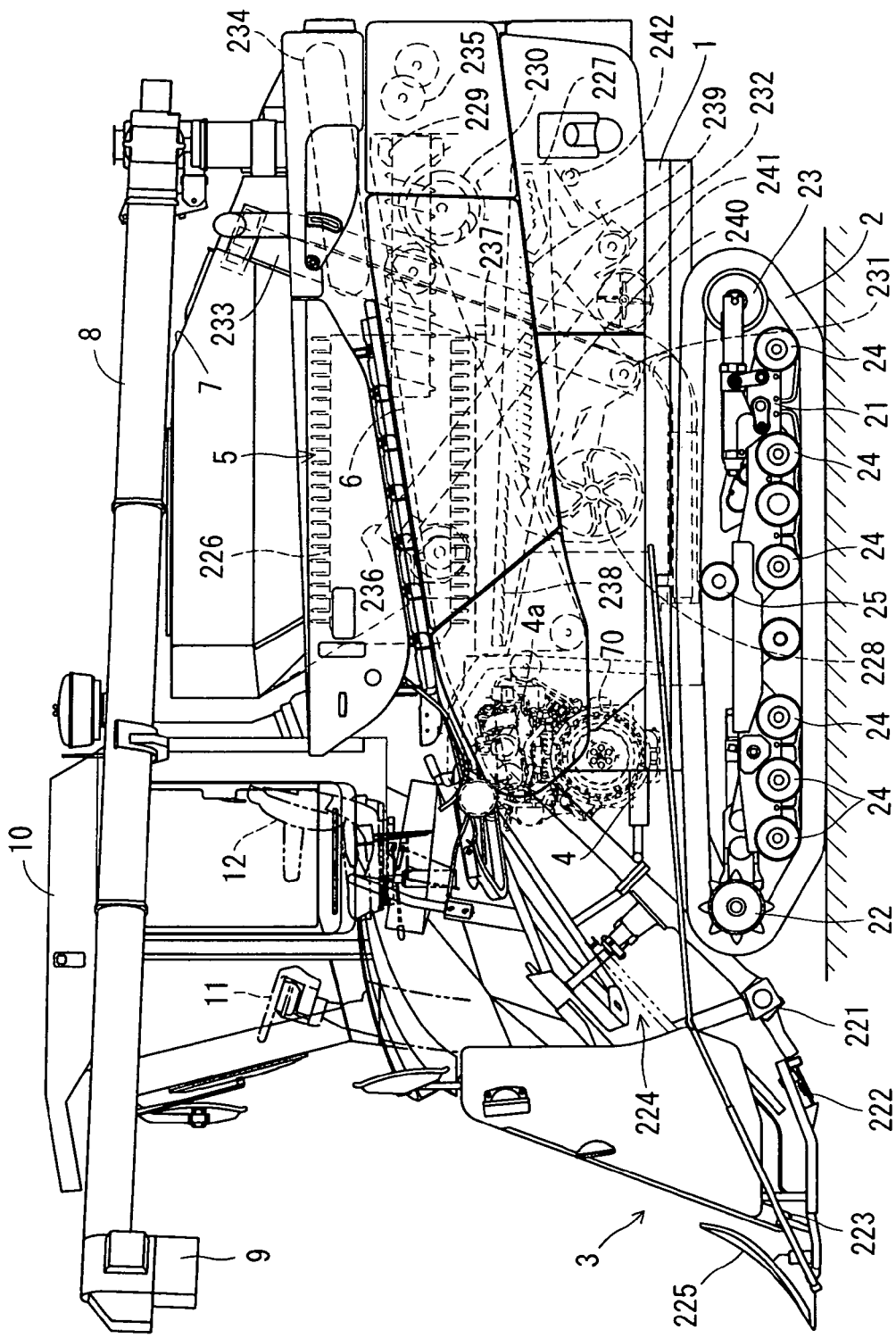
FIG. 1 is a left side elevational view of a combined harvester according to a first embodiment.

A description will be given below of embodiments which embody the present invention on the basis of the accompanying drawings.

(1) First Embodiment

FIG. 1 to FIG. 12 show a first embodiment in the case that the present invention is applied to a combined harvester serving as a working machine. In this case, in the description relating to a combined harvester in FIG. 1 to FIG. 3, a left side heading for a forward moving direction of a traveling machine body 1 is called simply as a left side, and a right side heading for the forward moving direction is called simply as a right side in the same manner. They are set to references of positional relationships in four directions, and upper and lower in the combined harvester conveniently.

(1-1) Whole Structure of Combined Harvester

First of all, a description will be given of a whole structure of the combined harvester which corresponds to the first embodiment of a working machine with reference to FIG. 1 to FIG. 3. The combined harvester is provided with a traveling machine body 1 which is supported by a pair of right and left traveling crawlers 2. A harvesting device 3 for six-rowed harvesting which incorporates grain haulms while harvesting is installed to a front portion of the traveling machine body 1 in such a manner as to be adjustable to move up and down around a harvesting rotation supporting point axis 4a by a single acting type elevating hydraulic cylinder 4. On the traveling machine body 1, there are mounted a grain threshing device 5 which has a feed chain 6, and a grain tank 7 which reserves the grains after the grain threshing side by side. In this case, the grain threshing device 5 is arranged in a left side in a forward moving direction of the traveling machine body 1, and the grain tank 7 is arranged in a right side in the forward moving direction of the traveling machine body 1. A grain discharge auger 8 which can swivel is provided in a rear portion of the traveling machine body 1. It is structured such that the grains in an inner portion of the grain tank 7 are discharged from a rough rice throwing port 9 of the grain discharge auger 8 to a bed of a truck or a container. The grain threshing device 5 and the grain discharge auger 8 correspond to a working portion. An operation cabin 10 is provided in a front side of the grain tank 7 in a right side of the harvesting device 3.

A control handle 11 and an operation seat 12 are arranged within the operation cabin 10. In this case, as shown in FIG. 2, in the operation cabin 10, there are arranged a step (not shown) in which an operator gets on board, a handle column 14 which is provided with the control handle 11, a main shift lever 16 which is provided in a lever column 15 in a left side of an operation seat 12 and serves as shift operating means, an auxiliary shift lever 17, a working clutch lever 18 for operating a working clutch (a harvesting clutch and a grain threshing clutch, an illustration of which are omitted) to turn on and off, and the like. A diesel engine 70 which serves as a power source is arranged in the traveling machine body 1 below the operation seat 12.

As shown in FIG. 1, right and left truck frames 21 are arranged in a lower surface side of the traveling machine body 1. The truck frame 21 is provided with a drive sprocket 22 which transmits a power of the engine 70 to the traveling crawler 2, a tension roller 23 which maintains a tension of the traveling crawler 2, a plurality of truck rollers 24 which hold a ground side of the traveling crawler 2 in a ground state, and an intermediate roller 25 which holds a non-ground side of the traveling crawler 2. A front side of the traveling crawler 2 is supported by the drive sprocket 22, a rear side of the traveling crawler 2 is supported by the tension roller 23, a ground side of the traveling crawler 2 is supported by the truck rollers 24, and a non-ground side of the traveling crawler 2 is supported by the intermediate roller 25. An output of the diesel engine 70 is transmitted to a transmission case 19, the output of the diesel engine 70 is shifted by the transmission case 19, and the traveling crawler 2 is driven on the basis of a shift output of the transmission case 19.

Figure 2:
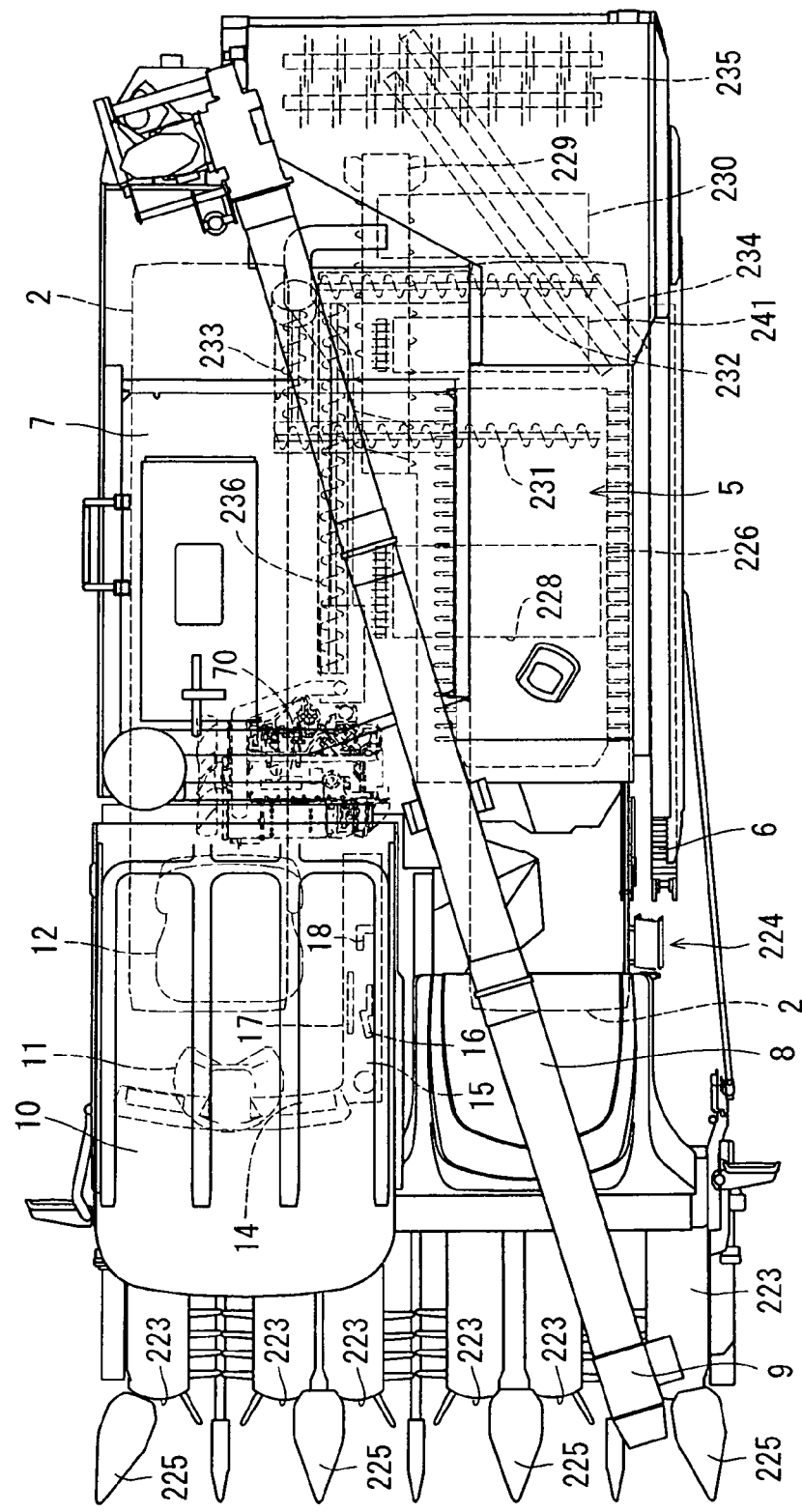
FIG. 2 is a plan view of the combined harvester.

As shown in FIG. 1 and FIG. 2, a hair clipper type harvesting blade device 222 which cuts a root of a unharvested grain haulm in a farm field is provided below a harvesting frame 221 which is connected to the harvesting rotation supporting point axis 4a of the harvesting device 3. A grain haulm raising device 223 for six rows which raises up the unharvested grain haulm in the farm field is arranged in a front side of the harvesting frame 221. A grain haulm feeding device 224 which feeds the harvested grain haulm harvested by the harvesting blade device 222 is arranged between the grain haulm raising device 223 and a front end portion (a feeding start end side) of the feed chain 6. In this case, a grass dividing body 225 for six rows which divides the unharvested grain haulm in the farm field is provided in a protruding manner in a lower front side of the grain haulm raising device 223. The unharvested grain haulm in a farm field is continuously harvested by driving the harvesting device 3 while traveling within the farm field by driving the traveling crawler 2 by means of the diesel engine 70.

Figure 3:
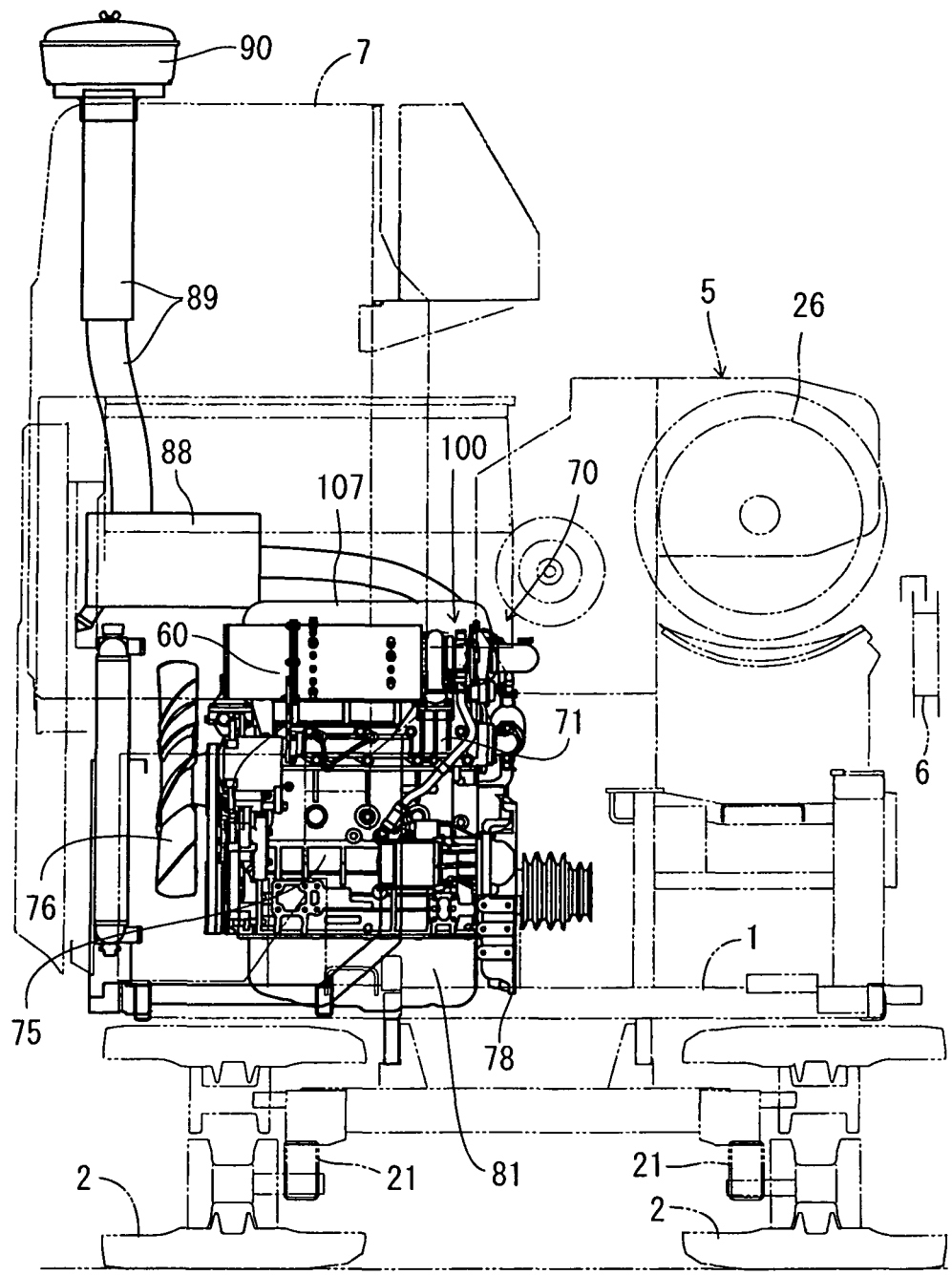
FIG. 3 is a front elevational view showing a positional relationship of a diesel engine with respect to a traveling machine body.

As shown in FIG. 1 to FIG. 3, the grain threshing device 5 is provided with a threshing cylinder 226 for threshing the grain haulm, a swing sorting plate 227 and a fanning mill fan 228 which sort out the threshed grains falling down to the below of the threshing cylinder 226, a processing cylinder 229 which reprocesses the grain threshed discharged material taken out of a rear portion of the threshing cylinder 226, and a dust exhaust fan 230 which discharges a dust exhaust in a rear portion of the swing sorting plate 227. In this case, a rotating shaft of the threshing cylinder 226 extends along a feeding direction of the grain haulm by the feed chain 6 (in other words, the forward moving direction of the traveling machine body 1). The root side of the grain haulm which is fed from the harvesting device 3 by a grain haulm feeding device 224 is taken over by the feed chain 6 so as to be fed in a pinched manner. Further, an ear tip side of the grain haulm is fed into a threshing chamber of the grain threshing device 5 so as to be threshed by the threshing cylinder 226.

As shown in FIG. 1 and FIG. 2, a lower side of the swing sorting plate 227 is provided with a first conveyor 231 which picks up the grain (the first grain) sorted by the swing sorting plate 227, and a second conveyor 232 which picks up the second grain such as the grain with branch or the like. Both the conveyors 231 and 232 are provided side by side in an upper surface side of the traveling machine body 1 above the rear portion of the traveling crawler 2 in a side elevational view, in the order of the first conveyor 231 and the second conveyor 232 from a front side in the forward moving direction of the traveling machine body 1. In this case, the structure is made such that the swing sorting plate 227 is reciprocated and swung forward and backward and in a vertical direction at an approximately fixed speed, by a swing drive shaft 242. The threshed grain which leaks down from a receiving net 237 provided in a tension manner below the threshing cylinder 226 is swung and sorted (sorted by specific gravity) by a feed pan 238 of the swing sorting plate 227 and a chaff sieve 239.

The threshed grain is swung and sorted by the swing sorting plate 227, whereby the grain in the threshed grain falls down from a grain sieve 240 of the swing sorting plate 227. The grain falling down from the grain sieve 240 falls down to the first conveyor 231 while the powder dust in the grain is removed by a sorting wind from the fanning mill fan 228. A grain elevating tube 233 extending in a vertical direction is communicated with and connected to a terminal end portion which protrudes outward from one side wall (a right side wall in the embodiment) close to the grain tank 7 in the grain threshing device 5 among the first conveyor 231. The grain picked up from the first conveyor 231 is fed into the grain tank 7 via the grain elevating tube 233, and is collected in the grain tank 7. In this case, the grain elevating tube 233 is provided in a rising manner in a rear side of the grain tank 7 in a rearward inclined attitude in which an upper end side of the grain elevating tube 233 is inclined rearward, along an incline of the rear surface of the grain tank 7.

Further, as shown in FIG. 1 and FIG. 2, the swing sorting plate 227 is structured such as to bring down the second material such as the grain with branch or the like from the chaff sieve 239 to the second conveyor 232 in accordance with a swing sorting (a specific gravity sorting). A fanning mill fan 228 sorting by wind the second material falling to the below of the chaff sieve 239 is provided. The second material falling down from the chaff sieve 239 falls down to the second conveyor 232 while the powder dust and the straw dust in the grain are removed by a sorting wind from the sorting fan 241. A terminal end portion protruding outward from one side wall close to the grain tank 7 in the grain threshing device 5 among the second conveyor 232 is communicated with and connected to an upper surface side of the feed pan 238 via a reducing tube 236 which extends in a back and forth direction while intersecting the grain elevating tube 233, and is structured such as to return the second material to the upper surface side of the feed pan 238 so as to resort.

On the other hand, a straw discharge chain 234 is arranged in a rear end side (a feed terminal end side) of the feed chain 6. The discharged straw which is taken from the rear end side of the feed chain 6 to the straw discharge chain 234 (the haulm in which the grain is threshed) is discharged to a rear side of the traveling machine body 1 in a long state, or is discharged to a rear below of the traveling machine body 1 after being cut short at an appropriate length by a straw discharge cutter 235 which is provided in a rear side of the grain threshing device 5.

(1-2) Whole Structure of Diesel Engine

Next, a description will be given of a whole structure of the common rail type diesel engine 70 mainly with reference to FIG. 3 to FIG. 7. In the description relating to the diesel engine 70 in FIG. 4 to FIG. 7, an intake manifold 73 installation side of the diesel engine 70 which turns backward with respect to the traveling machine body 1 is called simply as a rear side of the diesel engine 70, and an exhaust manifold 71 installation side of the diesel engine 70 which turns forward with respect to the traveling machine body 1 is called simply as a front side of the diesel engine 70 in the same manner.

As shown in FIG. 3 to FIG. 7, the exhaust manifold 71 is arranged in a front side surface of a cylinder head 72 in the diesel engine 70. The intake manifold 73 is arranged in a rear side surface of the cylinder head 72. The cylinder head 72 is mounted on a cylinder block 75 which has an engine output shaft 74 (a crank shaft) and a piston (not shown) built-in. Right and left leading end sides of the engine output shaft 74 are protruded from both right and left side surfaces of the cylinder block 75. A cooling fan 76 is provided in a right side surface of the cylinder block 75. The structure is made such that a rotating force is transmitted to the cooling fan 76 via a V belt 77 from a right leading end side of the engine output shaft 74.

As shown in FIG. 3 to FIG. 7, a flywheel housing 78 is firmly fixed to a left side surface of the cylinder block 75. A flywheel 79 is arranged within the flywheel housing 78. The flywheel 79 is pivoted to a left leading end side of the engine output shaft 74. The flywheel 79 is structured such as to integrally rotate with the engine output shaft 74. The structure is made such that a power of the diesel engine 70 is taken out via the flywheel 79 to the driving portion such as the traveling crawler 2 which serves as a traveling portion (a high load working portion), the harvesting device 3 and the grain threshing device 5 which serve as the high load working portion, and the grain discharge auger 8 which serves as a low load working portion.

Further, an oil pan mechanism 81 is arranged in a lower surface of the cylinder block 75. An engine leg attaching portion 82 is provided in each of right and left side surface of the cylinder block 75 and right and left side surfaces of the flywheel housing 78. An engine leg body 83 having a vibration proof rubber is fastened by bolt to each of the engine leg attaching portions 82. The diesel engine 70 is supported in a vibration proofing manner to an engine support chassis 84 which is formed integrally in the traveling machine body 1, via each of the engine leg bodies 83. As is apparent from the description mentioned above, the diesel engine 70 is arranged within an engine room which is formed below the operation cabin 10 in such a manner that the flywheel 79 is positioned in a center side of the traveling machine body 1 and the cooling fan 77 is positioned in a right side of the traveling machine body 1. In other words, the diesel engine 70 is arranged in such a manner that the direction of the engine output shaft 74 extends to right and left directions.

Figure 4:
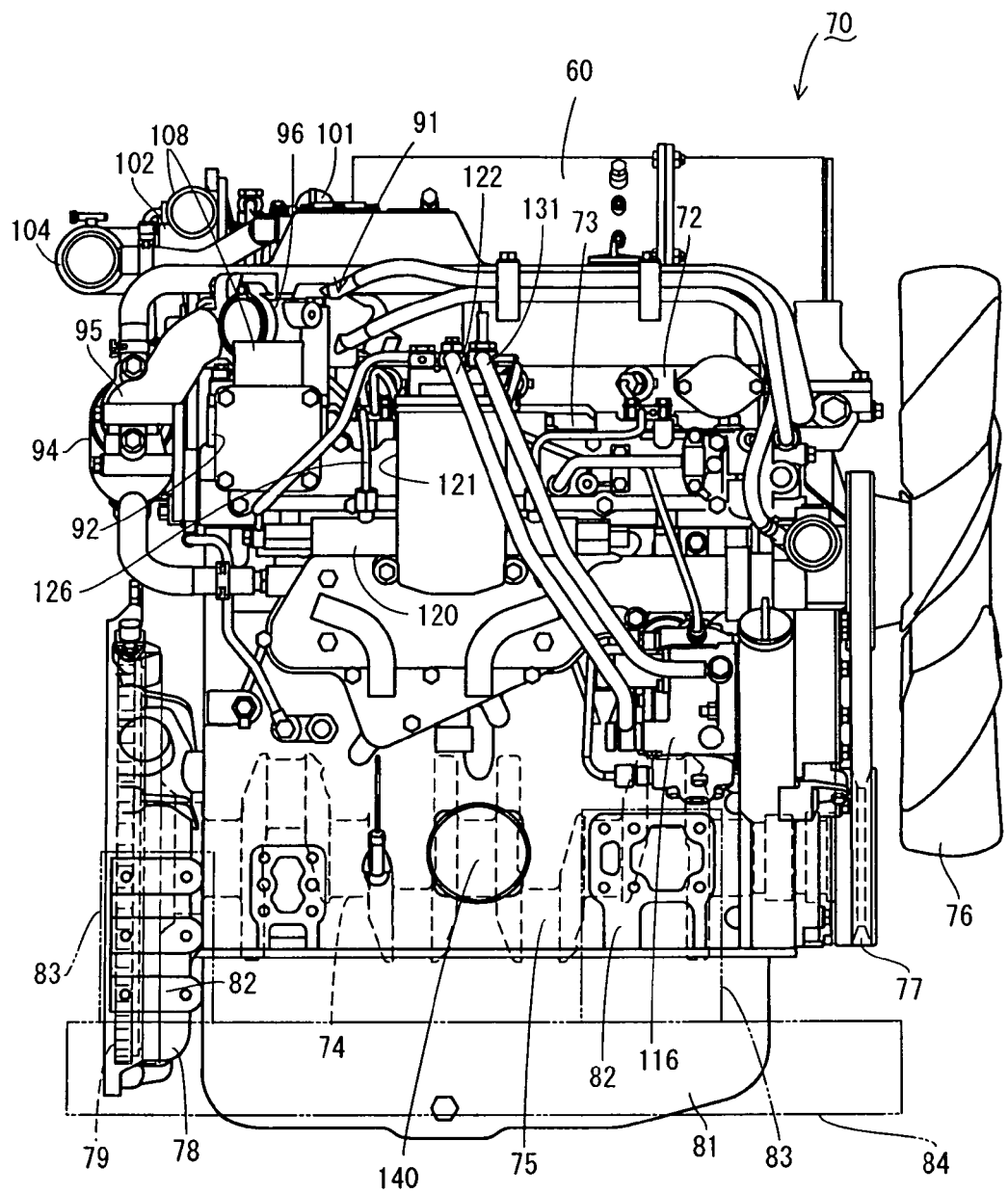
FIG. 4 is a side elevational view of an intake manifold installation side of the diesel engine.
Figure 5:
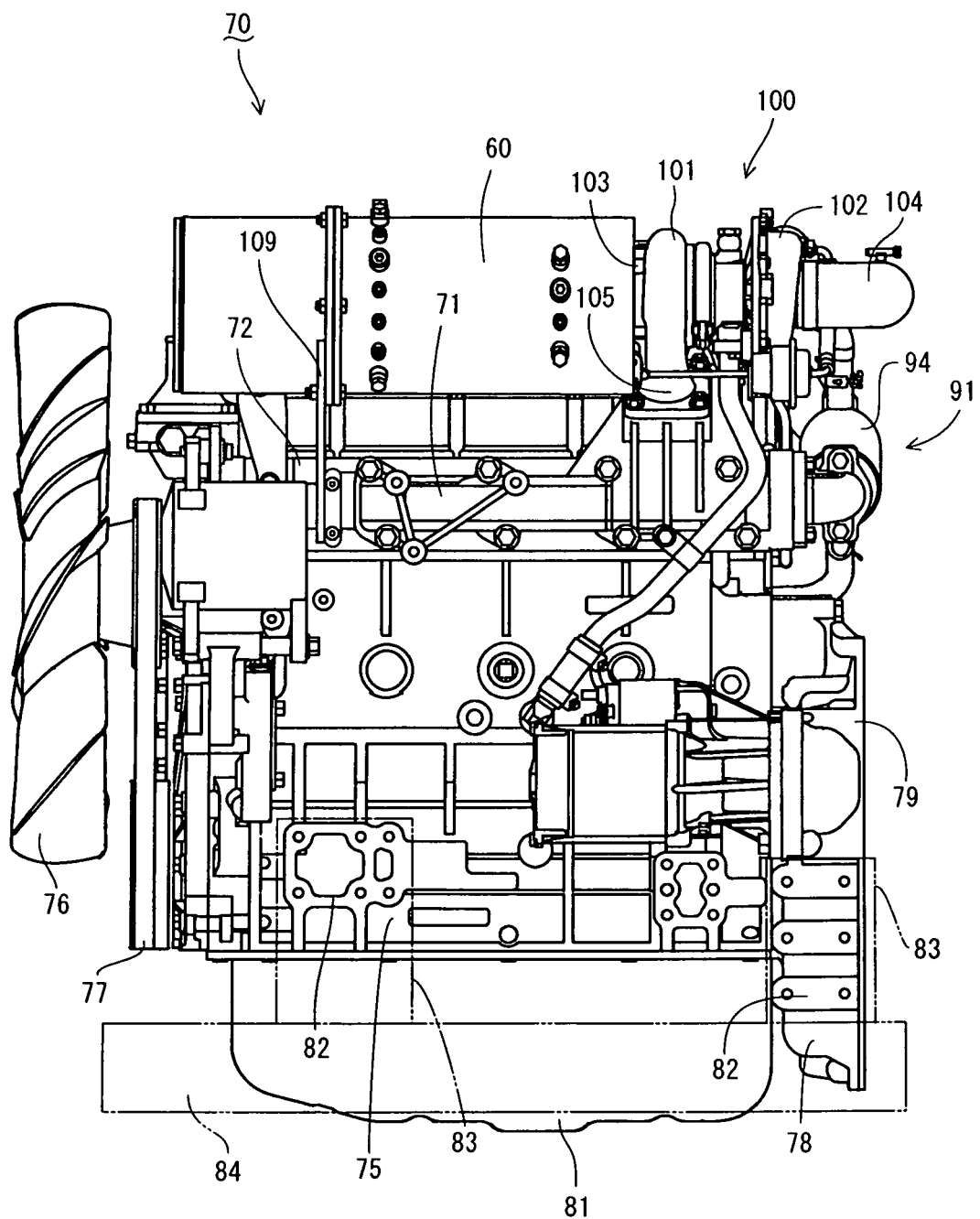
FIG. 5 is a side elevational view of an exhaust manifold installation side of the diesel engine.
Figure 6:
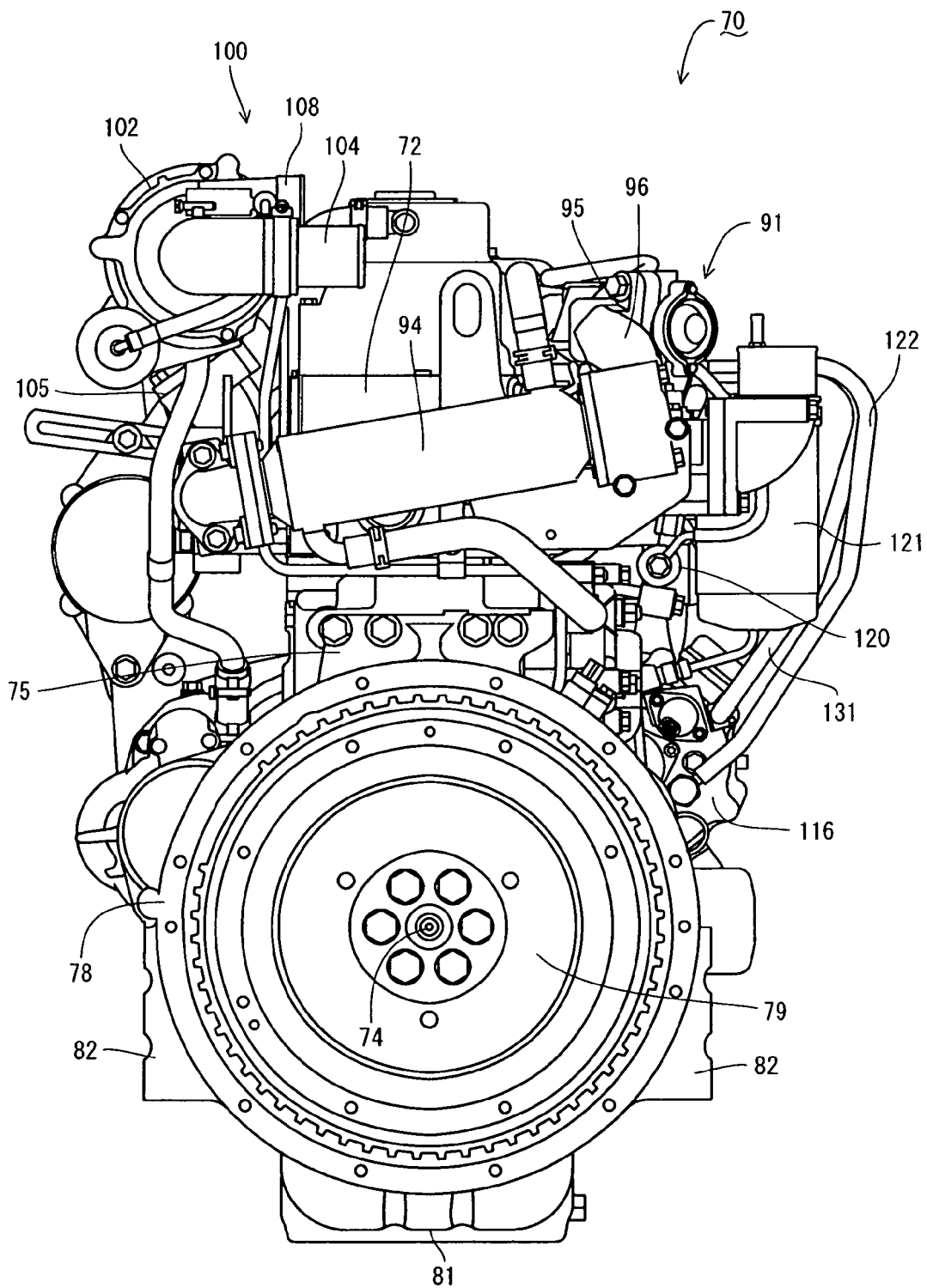
FIG. 6 is a side elevational view of a flywheel installation side of the diesel engine.
Figure 7:
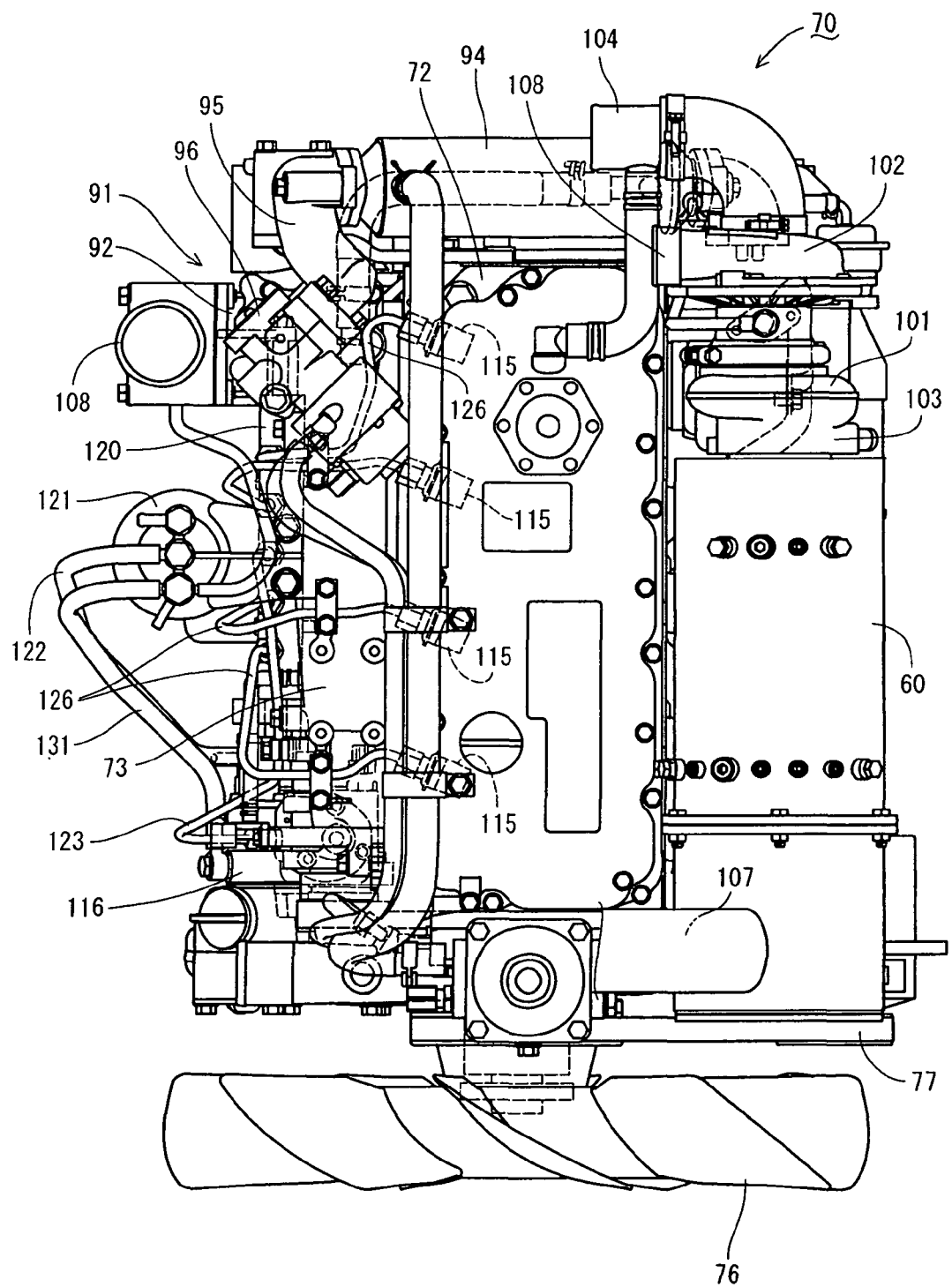
FIG. 7 is a plan view of the diesel engine.

As shown in FIG. 3, FIG. 4, and FIG. 7, an air cleaner 88 is connected to the intake manifold 73 via an EGR device (an exhaust gas regeneration device) 81 and a supercharging tube 108. The EGR device 91 has an EGR main body case (collector) 92 which mixes a regeneration exhaust gas of the diesel engine 70 (an EGR gas from the exhaust manifold 71) and a fresh air (an external air from the air cleaner) so as to feed to the intake manifold 73, a regeneration exhaust gas pipe 95 which is connected to the exhaust manifold 71 via an EGR cooler 94, and an EGR valve 96 which communicates the EGR main body case 92 with the regeneration exhaust gas pipe 95.

The ambient air is fed into the EGR main body case 92, and the EGR gas (a part of the exhaust gas discharged from the exhaust manifold 71) is fed into the EGR main body case 92 via the EGR valve 96 from the exhaust manifold 71. After the ambient air and the EGR gas from the exhaust manifold 71 are mixed within the EGR main body case 92, a mixed gas within the EGR main body case 92 is fed to the intake manifold 73. In other words, a part of the exhaust gas which is discharged to the exhaust manifold 71 from the diesel engine 70 is recirculated to the diesel engine 70 from the intake manifold 73, whereby a maximum combustion temperature at a time of the high load operation descends, and a discharge amount of NOx (a nitrogen oxide) from the diesel engine 70 is lowered.

As shown in FIG. 4 to FIG. 7, a turbo supercharger 100 is attached to a rear side surface of the cylinder head 72. The turbo supercharger 100 has a turbine case 101 which has a turbine wheel (not shown) build-in, and a compressor case 102 which has a blower wheel (not shown) built-in. The exhaust manifold 71 is connected to an exhaust gas intake pipe 105 of the turbine case 101. A tail pipe 107 is connected to an exhaust gas discharge pipe 103 of the turbine case 101 via a diesel particulate filter 60 (hereinafter, refer to as DPF) which serves as a filter device. In other words, the exhaust gas which is discharged to the exhaust manifold 71 from each of the cylinders of the diesel engine 70 is discharged to an external portion from the tail pipe 107 via the turbo supercharger 100 and the DPF 60.

On the other hand, a supply air discharge side of the air cleaner 88 is connected to a supply air intake side of the compressor case 102 via a supply air pipe 104. The intake manifold 73 is connected to a supply air discharge side of the compressor case 102 via a supercharging pipe 108. An intake air intake side of the air cleaner 88 is connected to a pre cleaner 90 via an intake duct 89. In other words, the ambient air which is removed the dusts by the pre cleaner 90 and the air cleaner 88 is fed to the intake manifold 73 from the compressor case 102 via the supercharging pipe 108, and is fed to each of the cylinders of the diesel engine 70.

As shown in FIG. 4 to FIG. 7, the DPF 60 serving as the filter device is structured such as to collect a particulate matter (PM) in the exhaust gas, and is arranged above the exhaust manifold 71 in the cylinder head 72. The DPF 60 according to the embodiment is formed such a shape as to be longer in the right and left direction which is in parallel to the engine output shaft 74 in a plan view. An exhaust gas intake side of the DPF 60 is connected to the exhaust gas discharge pipe 103 of the turbine case 101, and the tail pipe 107 is connected to the exhaust gas discharge side of the DPF 60.

Figure 8:
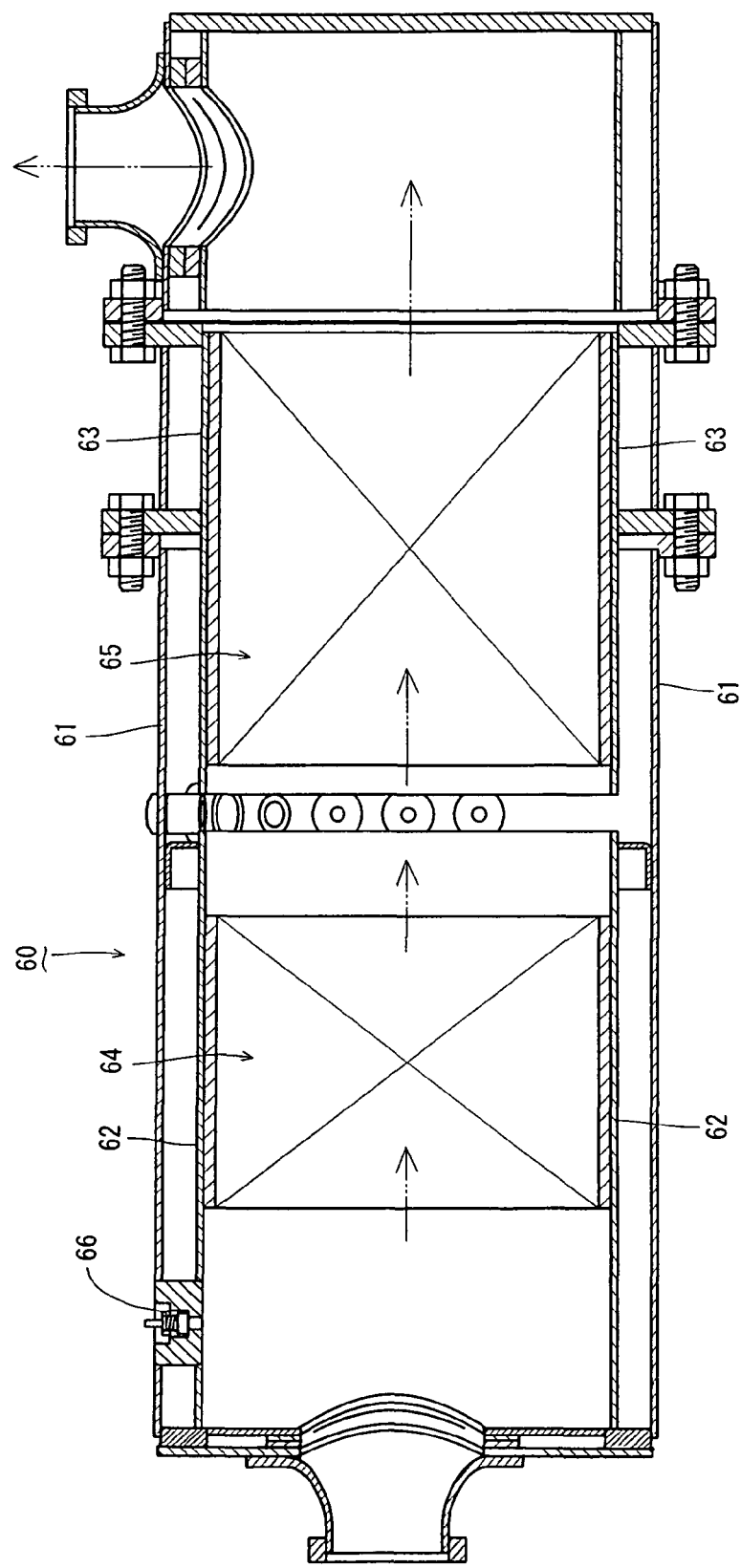
FIG. 8 is a cross sectional explanatory view of a DPF.

As shown in FIG. 8, the DPF 60 is structured such that a diesel oxidation catalyst 64, for example, a platinum or the like and a soot filter 65 which is a filter body having a honeycomb structure are lined up in series and accommodated in approximately tubular filter cases 62 and 63 which are incorporated in a DPF casing 61 made of a heat resisting metal material. One end side (a right side) in a longitudinal direction of the DPF casing 61 is fixed by welding in an upper end side of a fixed leg body 109. A lower end side of the fixed leg body 109 is fastened by bolt to a front surface side of the cylinder head 72. In other words, the DPF 60 mentioned above is stably connected and supported to the above of the exhaust manifold 71 by the fixed leg body 109 and the exhaust gas discharge pipe 103 of the turbine case 101.

A pressure sensor 66 is provided in the DPF casing 61 as one example of clogging detecting means which detects a clogged state of the DPF 60 (refer to FIG. 8). The pressure sensor 66 have a well-known structure, for example, utilizing a piezo resistance effect. In this case, a pressure Ps (a reference pressure value) in an upstream side of the soot filter 65 at a time when the particulate matter is not piled up in the soot filter 65 (at a time when the DPF 60 is new) is previously stored in an ROM or the like of a fuel injection controller 311 mentioned below, a current pressure P at the same measuring position is detected by the pressure sensor 66, a difference ΔP between the reference pressure value Ps and the detection value P of the pressure sensor 66 is determined, and a particulate matter sedimentation amount of the soot filter 65 is converted (estimated) on the basis of the pressure difference ΔP (refer to FIG. 12). In this case, the pressure sensor may be arranged in upstream and downstream sides with respect to the soot filter 65 in the DPF 60, and the particulate matter sedimentation amount of the soot filter 65 may be converted (estimated) from a difference between both the detection values.

In the structure mentioned above, the exhaust gas of the diesel engine 70 flows into a space in an upstream side than the diesel oxidation catalyst 64 in the DPF casing 61 from the exhaust gas discharge pipe 103 of the turbine case 101, and passes through the diesel oxidation catalyst 64 and the soot filter 65 in this order so as to be purified. The particulate matter in the exhaust gas can not pass through a porous partition wall between cells in the soot filter 65 in this stage so as to be collected. Thereafter, the exhaust gas passing through the diesel oxidation catalyst 64 and the soot filter 65 is discharged to the tail pipe 107.

If the exhaust gas temperature goes beyond a regenerable temperature (for example, about 300° C.) at a time when the exhaust gas passes through the diesel oxidation catalyst 64 and the soot filter 65, NO (nitrogen oxide) in the exhaust gas is oxidized to unstable $NO_2$ (nitrogen dioxide) on the basis of an action of the diesel oxidation catalyst 64. Further, the particulate matter piled up in the soot filter 65 is oxidized and removed by O (oxygen) which is discharged at a time when NO$_2$ returns to NO, whereby a particulate matter collecting capacity of the soot filter 65 is restored (the soot filter 65 is regenerated).

(1-3) Common Rail System and Fuel System Structure of Diesel Engine

Figure 9:
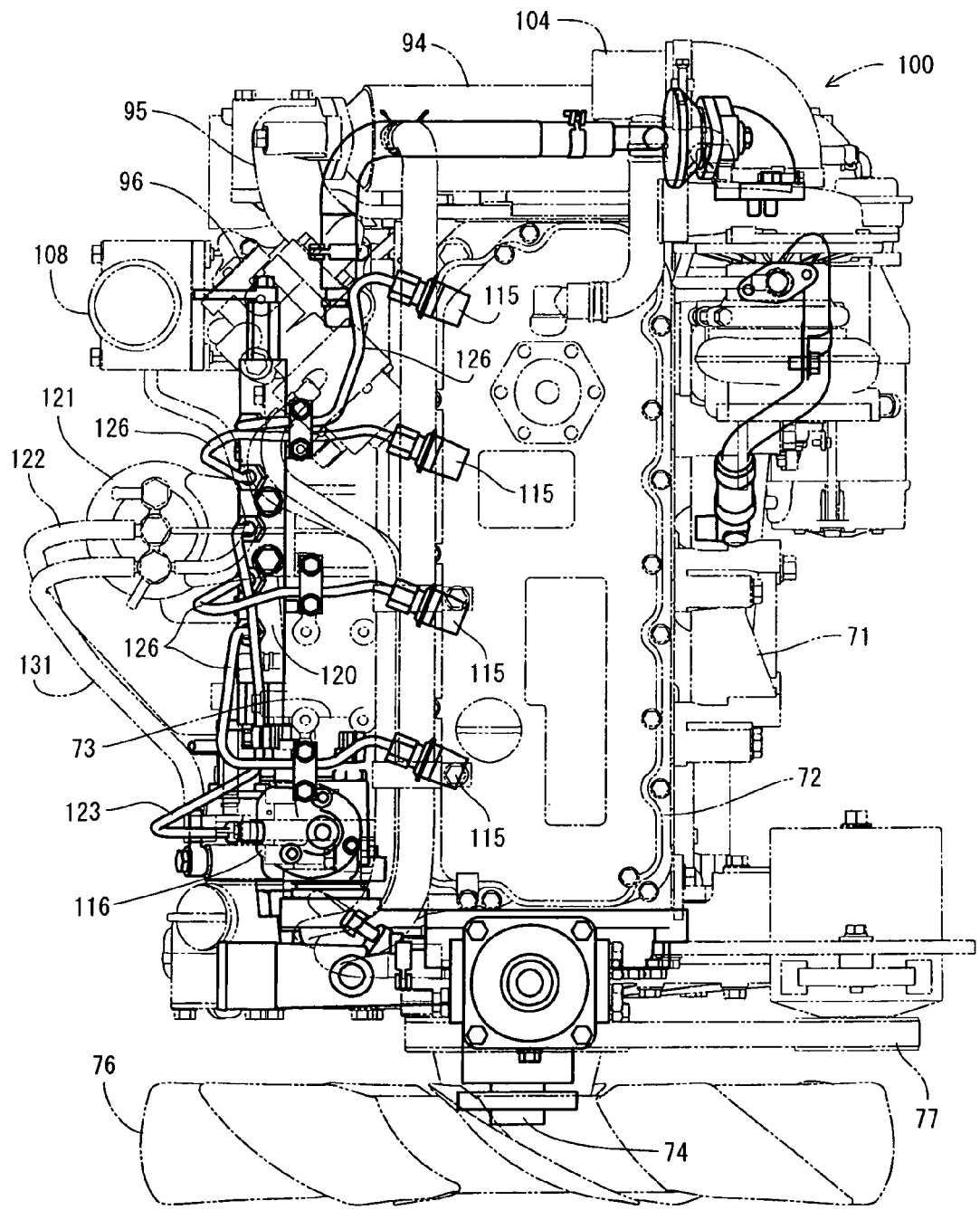
FIG. 9 is a plan explanatory view of a common rail system.

Next, a description will be given of a common rail system 117 and a fuel system structure of the diesel engine 70 with reference to FIG. 3 to FIG. 7 and FIG. 9 to FIG. 11. As shown in FIG. 4 and FIG. 9, a fuel tank 118 is connected to each of injectors 115 for four cylinders provided in the diesel engine 70 via a fuel pump 116 and the common rail system 117. Each of the injectors 115 has an electromagnetic opening and closing control type fuel injection valve 119. the common rail 117 has a cylindrical common rail 120.

Figure 11:
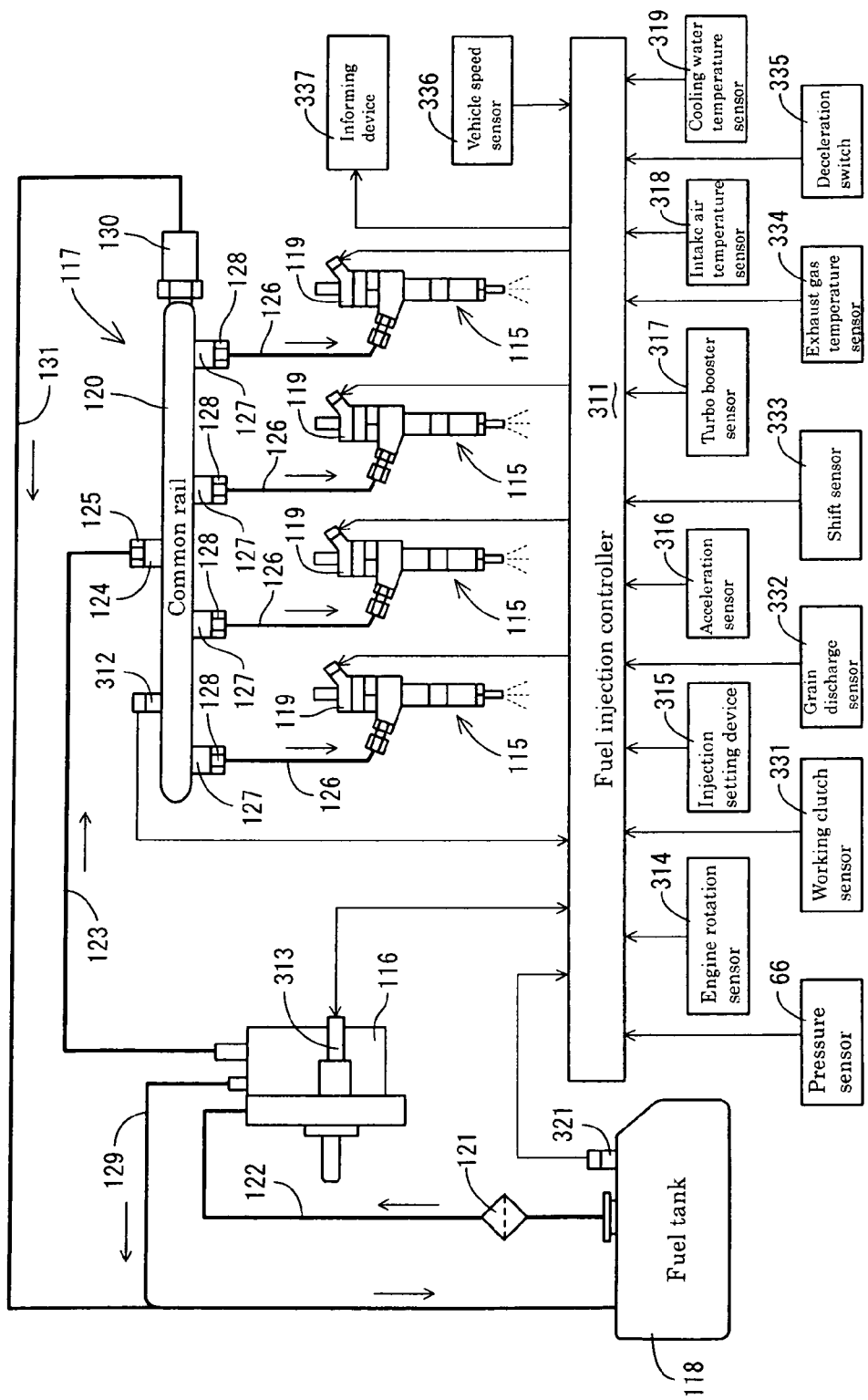
FIG. 11 is a fuel system explanatory view of the diesel engine.
Figure 12:
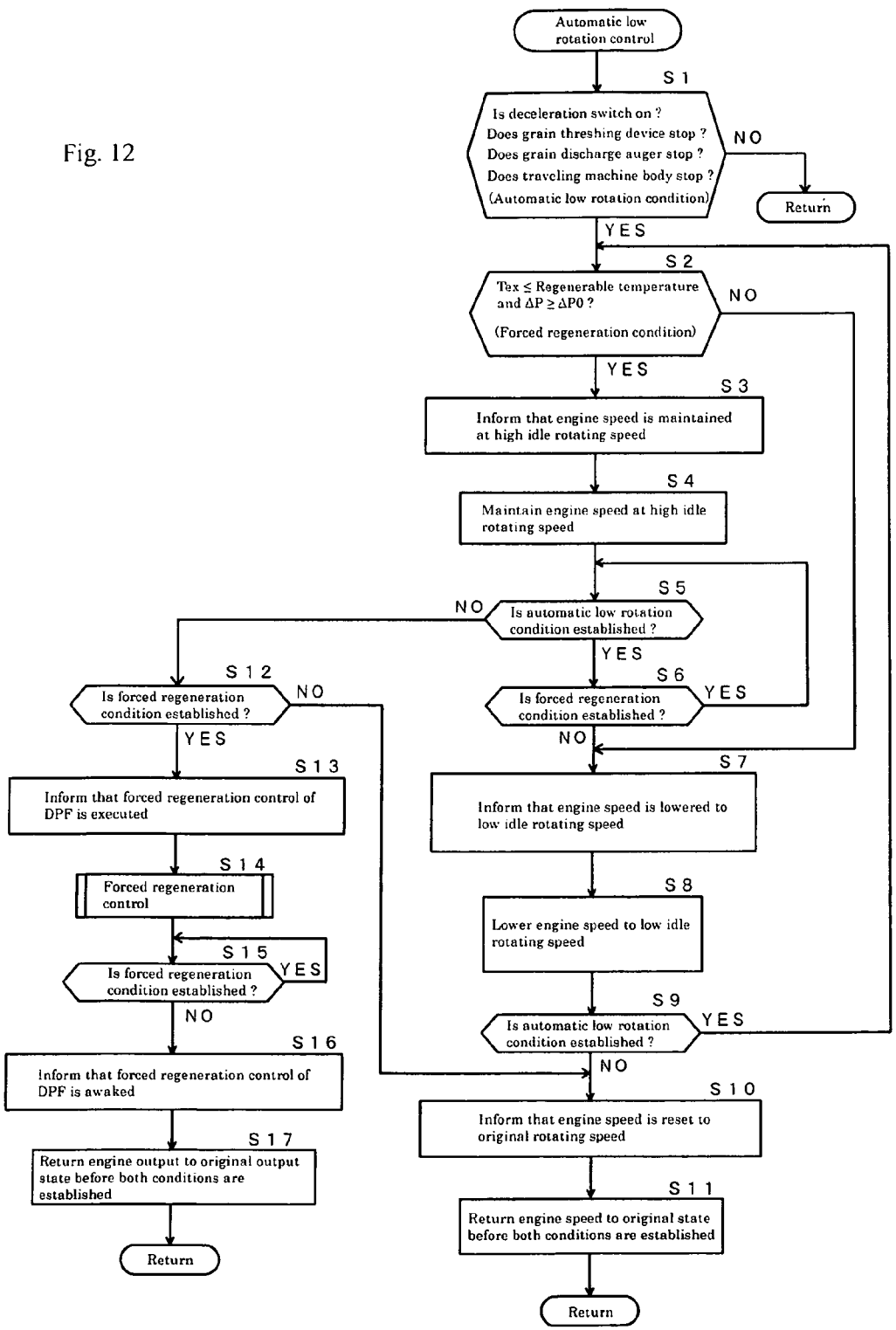
FIG. 12 is a flow chat of an automatic low rotation control.

As shown in FIG. 4, FIG. 9, and FIG. 11, the fuel tank 118 is connected to an intake side of the fuel pump 116 via a fuel filter 121 and a low pressure pipe 122. A fuel within the fuel tank 118 is sucked into the fuel pump 116 via the fuel filter 121 and the low pressure pipe 122. On the other hand, the common rail 120 is connected to a discharge side of the fuel pump 116 via a high pressure pipe 123. A high pressure pipe connector 124 is provided in an intermediate in a longitudinal direction of the cylindrical common rail 120, and an end portion of the high pressure pipe 123 is connected to the high pressure pipe connector 124 by means of a screw attachment of a high pressure pipe connector nut 125.

Further, the injectors 115 for four cylinders are connected to the common rail 120 via four corresponding fuel injection pipes 126. Fuel injection pipe connectors 127 for four cylinders are provided in a longitudinal direction of the cylindrical common rail 120, and an end portion of the fuel injection pipe 126 is connected to the fuel injection connector 127 by means of a screw attachment of a fuel injection pipe connector nut 128.

According to the structure mentioned above, the fuel within the fuel tank 118 is pressure fed to the common rail 120 by the fuel pump 116, and a high pressure fuel is reserved in the common rail 120. Each of the fuel injection valves 119 is controlled so as to be opened and closed, whereby the high pressure fuel within the common rail 120 is injected into each of the cylinders of the diesel engine 70 from each of the injectors 115. In other words, it is possible to control at a high precision an injection pressure, an injection timing, and an injection period (an injection amount) of the fuel which is fed from each of the injectors 115 by electronically controlling each of the fuel injection valves 119. Thus, it is possible to reduce the nitrogen oxide (NOx) which is discharged from the diesel engine 70, and it is possible to reduce a noise vibration of the diesel engine 70.

In this case, as shown in FIG. 11, the fuel pump 116 is connected to the fuel tank 118 via a pump fuel return pipe 129. A common rail fuel return pipe 131 is connected to an end portion in a longitudinal direction of the cylindrical common rail 120 via a return pipe connector 130 with pressure regulating valve which limits the pressure of the fuel within the common rail 120. In other words, an excess fuel of the fuel pump 116 and an excess fuel of the common rail 120 are recovered in the fuel tank 118 via the pump fuel return pipe 129 and the common rail fuel return pipe 131.

Figure 10:
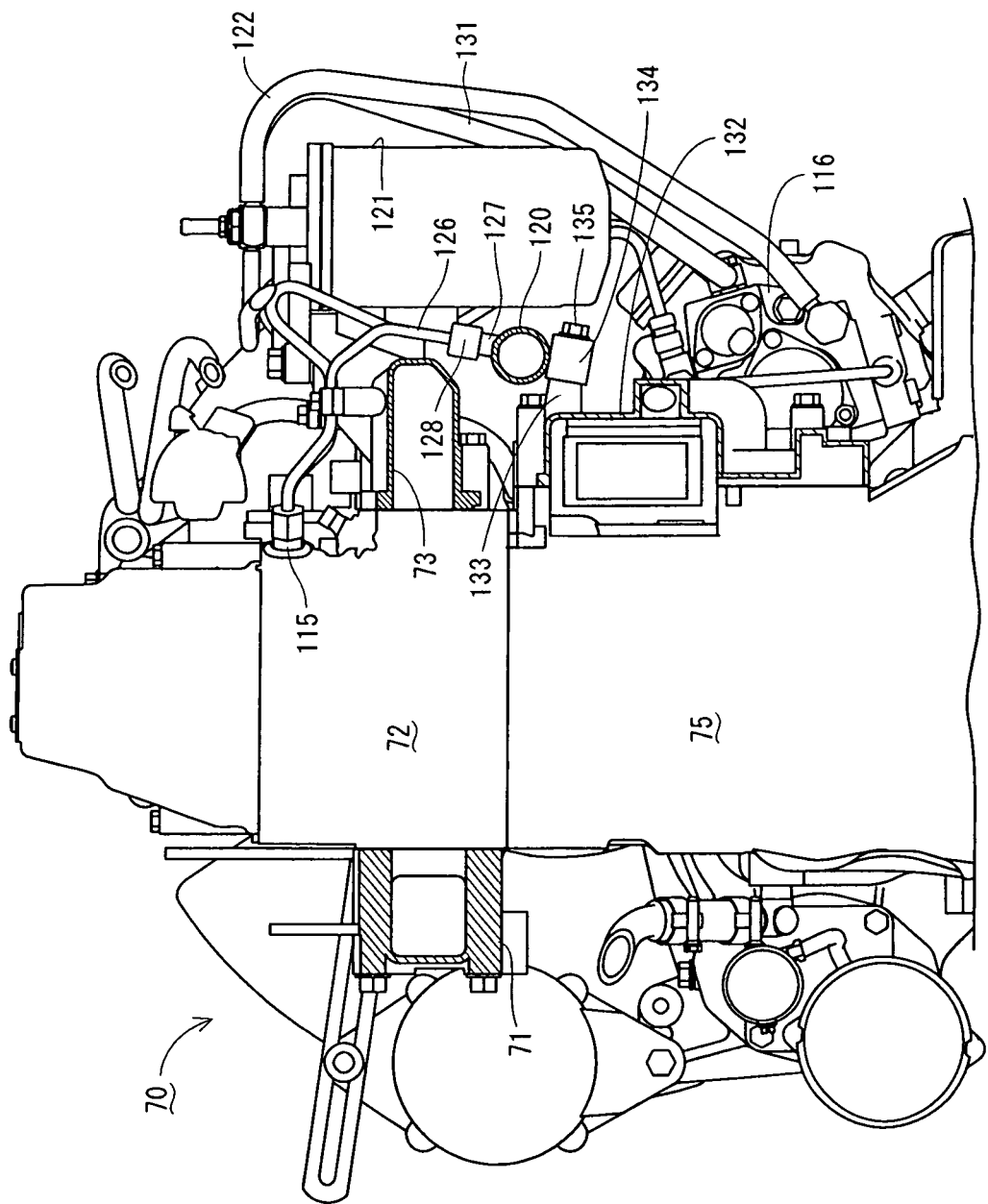
FIG. 10 is a cross sectional explanatory view of an upper portion side of the diesel engine.

In this connection, as shown in FIG. 4 and FIG. 10, a fastening table 133 is integrally formed in an oil cooler housing 132 which is provided in one side of the cylinder block 75. Further, a fastening boss 134 is integrally formed in the common rail 120. The fastening boss 134 is firmly fixed to the fastening table 133 by a rail attaching bolt 135. The common rail 120 is detachably fastened to one side of the cylinder block 75 via the oil cooler housing 132. In other words, the common rail 120 is provided in one side of the cylinder block 75. The common rail 120 is arranged so as to be close to a corner portion diagonally below the intake manifold 73.

As shown in FIG. 4 and FIG. 10, the common rail 120 is provided in line diagonally below the intake manifold 73. The common rail 120 is structured such as to be tilted to such an attitude that the fuel injection pipe connector 127 arranged in an upper surface side of the common rail 120 comes to a diagonally upward outward direction. Accordingly, since a part of the upper surface side of the common rail 120 is covered by the intake manifold 73, it is possible to reduce a damage due to a collision of the common rail 120 or the like by means of the intake manifold 73, even if a tool or the like falls down from the above toward the common rail 120 during an assembling and disassembling work of the diesel engine 70 or the like. Further, it is possible to easily execute a screwing operation or the like of the fuel injection pipe connector nut 128 which connects the fuel injection pipe 126 to the fuel injection pipe connector 127. It is possible to improve an assembling and disassembling workability of a piping or the like of the fuel injection pipe 126.

(1-4) Structure for Executing Fuel Injection Control

Next, a description will be given of a structure for executing a fuel injection control with reference to FIG. 11. A fuel injection controller 311 actuating the fuel injection valve 119 in each of the cylinders in the diesel engine 70 is mounted as one example of control means to the combined harvester according to the first embodiment. The fuel injection controller 311 is provided with an ROM which serves as memory means for storing control programs and data, an RAM for temporarily storing the control programs and the data, an input and output interface and the like in addition to a CPU which executes various computing processes and controls.

To an input side of the fuel injection controller 311, there are connected a rail pressure sensor 312 which detects a fuel pressure within the common rail 120, an electromagnetic clutch 313 which rotates or stops the fuel pump 116, an engine rotation sensor 314 which detects an engine speed of the diesel engine 70 (a position of a crank type cam shaft of the engine output shaft 74), an injection setting device 315 which detects and sets a fuel injection frequency of the injector 115 (a fuel injection frequency during one stroke fuel injection period), an acceleration sensor 316 which detects an operation position of an acceleration operating device (not shown) such as an acceleration lever or an acceleration pedal, a turbo booster sensor 317 which detects a pressure of the turbo supercharger 100, an intake air temperature sensor 318 which detects an intake air temperature of the intake manifold 73, and a cooling water temperature sensor 319 which detects a temperature of a cooling water of the diesel engine 70.

Electromagnetic solenoids of the fuel injection valves 119 for four cylinders are connected to an output side of the fuel injection controller 311. In other words, it is structured such that a high pressure fuel reserved in the common rail 120 is injected from the fuel injection valve 119 at plural times in one stroke, while controlling a fuel injection pressure, a fuel injecting timing, or a fuel injection period. Thus, it is possible to improve a fuel consumption by suppressing a generation of the nitrogen oxide, and executing a complete combustion in which a generation of the particulate matter (soot) and a carbon dioxide is reduced. In this connection, in the case of manually operating the acceleration operating device, the fuel injection controller 311 electronically controls each of the fuel injection valves 119 so as to regulate the fuel which is fed from each of the injectors 115 in such a manner that the engine speed comes to a set rotating speed by the acceleration operating device. Thus, the engine speed is held at a value which corresponds to an operation position of the acceleration operating device.

As shown in FIG. 11, to an input side of the fuel injection controller 311, there are connected a working clutch sensor 331 which detects an on-off operation of the working clutch lever 18 (a drive or a stop of the grain threshing device 5), a grain discharge sensor 332 which detects with or without an actuation of the grain discharge auger 8 (with or without a grain discharging work of the grain tank 7), a potentiometer type shift sensor 333 which detects an operation position (a forward movement, a neutral, and a rearward movement) of the main shift lever 16, an exhaust gas temperature sensor 334 which detects an exhaust gas temperature of the exhaust manifold 71, a deceleration switch 335 which serves as selection operating means selectively operating an auto deceleration control lowering the engine speed to the low idle rotating speed, a vehicle speed sensor 336 which detects a vehicle speed (a moving speed) of the traveling machine body 1, and a pressure sensor 66 which detects a clogged state of the DPF 60.

Further, an informing device 337 which serves as informing means is electrically connected to an output side of the fuel injection controller 311. The informing device 337 is a lamp which carries out a visual information in correspondence to the actuation state of the combined harvester, and various blinking data is previously stored in memory means (ROM) of the fuel injection controller 311. In this case, the informing means is not limited to the lamp which visually informs, but may be constructed by a buzzer or a voice device, or display means such as a liquid crystal panel which displays letters and marks.

In the fuel injection controller 311 according to the first embodiment, as one example of the fuel injection control, in order to execute the automatic low rotation control (the auto deceleration control) for lowering the engine speed to a predetermined first low rotating speed (the low idle rotating speed) at a time when an automatic low rotation condition mentioned below is established, and suppress the reduction of the exhaust gas temperature at a time when both of the automatic low rotation condition and a forced regeneration condition mentioned below are established, the engine speed is set to be maintained at a second low rotating speed (a high idle rotating speed) which is higher than the low idle rotating speed.

In this case, the automatic low rotation control (the auto deceleration control) means automatically lowering the engine speed to the low idle rotating speed (lowering the output of the diesel engine 70), by electronically controlling each of the fuel injection valves 119 so as to regulate the injection state (the injection pressure, the injection timing, the injection period and the like) of the fuel which is fed from each of the injectors 115, at a time when the automatic low rotation condition is established. The forced regeneration control means forcibly burning the particulate matter in the DPF 60 (the soot filter 65) by raising the output of the diesel engine 70 and raising the exhaust gas temperature by electronically controlling each of the fuel injection valves 119 so as to regulate the injection state of the fuel which is fed from each of the injectors 115 on the basis of the detection information.

In the first embodiment, it is set such that the automatic low rotation condition is established at a time when the working portion (the grain threshing device 5 and the grain discharge auger 8) are not operated and the traveling machine body 1 stops under a state of operating the deceleration switch 335 so as to be allowed (turned on). In other words, the automatic low rotation condition in the first embodiment is constructed by three conditions of the operation of the deceleration switch 335 to be turned on, the non-operating state of the working portion (the grain threshing device 5 and the grain discharge auger 8), and the stop of the traveling machine body 1. In addition, it is set such that the forced regeneration condition is established, at a time when a detection value Tex of the exhaust gas temperature is equal to or less than a regenerable temperature (for example, about 300° C.), and a pressure difference $\Delta P$ between a detection value P of the pressure sensor 66 and a reference pressure value Ps is equal to or more than a critical pressure difference value $\Delta P0$. In other words, the forced regeneration condition in the first embodiment is constructed by two conditions of a matter that the detection value Tex of the exhaust gas temperature is equal to or less than the regenerable temperature (for example, about 300° C.), and a matter that the pressure difference $\Delta P$ between the detection value P of the pressure sensor 66 and the reference pressure value Ps is equal to or more than the critical pressure difference value $\Delta P0$.

Further, the fuel injection controller 311 according to the first embodiment is structured such as to lower the engine speed to the low idle rotating speed from the high idle rotating speed, at a time when only the forced regeneration condition is dissolved after setting the engine speed to the high idle rotating speed, and to return the engine speed to the original rotating speed before both the conditions are established, at a time when both the low rotation condition and the forced regeneration condition are dissolved after setting the engine speed to the high idle rotating speed.

According to the structure mentioned above, if the DPF 60 (the soot filter 65) is going to be clogged to some extent under the execution of the automatic low rotation control which lowers the output of the diesel engine 70, the engine speed is maintained at the high idle rotating speed which is higher than the low idle rotating speed. Thus, it is possible to suppress the reduction of the exhaust gas temperature so as to prevent the clogged state of the DPF 60 from being deteriorated, while achieving a saving of a fuel consumption and a suppression of a noise on the basis of the automatic low rotation control. In other words, it is possible to suppress a progress of the clogging of the DPF 60 in a range which does not deteriorate the function of the automatic low rotation control, and it is accordingly possible to enjoy two advantages of a fuel consumption saving and an exhaust gas purification in the combined harvester. Since the automatic low rotation control is executed, it is possible to avoid such a trouble of a malfunction due to a development of the clogging of the DPF 60.

Further, since the fuel injection controller 311 according to the first embodiment is structured such as to lower the engine speed to the low idle rotating speed from the high idle rotating speed, at a time when only the forced regeneration condition is dissolved after setting the engine speed to the high idle rotating speed, it is possible to further improve a fuel consumption reducing effect on the basis of the automatic low rotation control. Further, since the fuel injection controller 311 according to the first embodiment is structured such as to return the engine speed to the original rotating speed before the establishment of both the conditions, at a time when both the low rotation condition and the forced regeneration condition are dissolved after setting the engine speed to the high idle rotating speed, it is possible to easily secure the output of the diesel engine 70 only by carrying out an operation of starting the combined harvester, and an operation of driving the working portion (the grain threshing device 5 or the like). Accordingly, it is possible to securely prevent such a problem that the diesel engine 70 rapidly stops due to a lack of output or an overload, by starting the combined harvester or driving the working portion under the low idle rotating speed, at a time of returning from the automatic low rotation control.

(1-5) Description of Automatic Low Rotation Control

Next, a description will be given of one example of the automatic low rotation control mentioned above with reference to a flow chart in FIG. 12. The automatic low rotation control according to the first embodiment first of all discriminates whether a disconnecting operation of the working clutch lever 18 (a stop of the grain threshing device 5) is detected by the clutch sensor 331, a stop of the grain discharge auger 8 is detected by the grain discharge sensor 332, and a neutral position operation of the main shift lever 16 (a stop of the traveling machine body 1) is detected by the vehicle speed sensor 336, under a state of turning on the deceleration switch 335, that is, whether the automatic low rotation condition is established (a step S1). If the condition is established (YES in the step S1), it is next discriminated whether the detection value Tex of the exhaust gas temperature is equal to or less than the regenerable temperature (for example, about 300° C.), and the pressure difference ΔP between the detection value P of the pressure sensor 66 and the reference pressure value Ps is equal to or more than the critical pressure difference value ΔP0, that is, whether the forced regeneration condition is established (a step S2).

If the forced regeneration condition is not established (NO in the step S2), the step goes to a step S7 mentioned below, and it is informed that the engine speed of the diesel engine 70 will be lowered to the low idle rotating speed (from the original rotating speed) for a predetermined time by the informing device 337. When the forced regeneration condition is established (YES in the step S2), the particulate matter is piled up to some extent in the soot filter 65 and there is generated a state in which the regenerating motion of the soot filter 65 is hard to make progress. Then, it is next informed that the engine speed of the diesel engine 70 will be maintained at the high idle rotating speed, for a predetermined time by the informing device 337 (a step S3), and thereafter the injection state of the fuel from each of the injectors 115 is regulated so as to maintain the engine speed of the diesel engine 70 to the high idle rotating speed which is higher than the low idle rotating speed, for suppressing the reduction of the exhaust gas temperature so as to prevent a deterioration of the clogged state of the DPF 60 (a step S4).

Further, it is discriminated whether the automatic low rotation condition mentioned above is established (a step S5), and if it is established (YES in the step S5), it is discriminated whether the forced regeneration condition mentioned above is established (a step S6). If the forced regeneration condition is not established (NO in the step S6), a sedimentation state of the particulate matter in the soot filter 65 is relaxed to some extent, so that it is informed that the engine speed of the diesel engine 70 will be lowered to the low idle rotating speed, for a predetermined time by the informing device 337 (a step S7), and thereafter the injection state of the fuel from each of the injectors 115 is regulated so as to lower the engine speed of the diesel engine 70 to the low idle rotating speed (from a quasi low rotating speed) (a step S8).

Next, it is discriminated whether the same automatic low rotation condition as the steps S1 and S5 is continuously established (a step S9), and if it is established (YES in the step S9), the step goes back to the step S2 mentioned above. If the automatic low rotation condition is not established (NO in the step S9), it is informed that the engine speed of the diesel engine 70 will be returned to the original rotating speed, for a predetermined time by the informing device 337 (a step S10), and thereafter the injection state of the fuel from each of the injectors 15 is regulated so as to return the engine speed of the diesel engine 70 to the original rotating speed before both the conditions (the automatic low rotation condition and the forced regeneration condition) are established (a step S11).

Turning to the step S5, if the automatic low rotation condition is not established (NO in the step S5), it is next discriminated whether the forced regeneration condition is established (a step S12). If the forced regeneration condition is established (YES in the step S12), it is informed that the forced regeneration control of the DPF 60 will be executed, for a predetermined time by the informing device 337 (a step S13), and thereafter the forced regeneration control of the DPF 60 is executed (a step S14). In other words, the step regulates the injection state of the fuel from each of the injectors 115, raises the output of the diesel engine 70 so as to raise the exhaust gas temperature, and forcibly burns the particulate matter in the soot filter 65. Next, if the forced regeneration condition is not established (NO in the step S15), it is informed that the forced regeneration control of the DPF 60 will be awaked, for a predetermined time by the informing device 337 (a step S16), thereafter the injection state of the fuel from each of the injectors 115 is regulated, and the output of the diesel engine 70 is returned to the original state before both the conditions (the automatic low rotation condition and the forced regeneration condition) are established (a step S17).

Turning to the step S12, if the forced regeneration condition is not established (NO in the step S12), the step goes to a step S10, it is informed that the engine speed of the diesel engine 70 will be returned to the original rotating speed, for a predetermined time by the informing device 337, thereafter the injection state of the fuel from each of the injectors 115 is regulated in a step S11, and the engine speed of the diesel engine 70 is returned to the original rotating speed before both the conditions (the automatic low rotation condition and the forced regeneration condition) are established.

As is apparent from the description mentioned above, since in the engine device having the engine 70 which serves as the power source, the exhaust gas purifying filter device 60 which is arranged in the exhaust gas path of the engine 70, and the control means 311 which executes the low rotation control for lowering the engine speed to the predetermined first low rotating speed (the low idle rotating speed) at a time when the previously set low rotation condition is established, the control means 311 is structured such as to maintain the engine speed at the second low rotating speed (the high idle rotating speed) which is higher than the first low rotating speed (the low idle rotating speed), for suppressing the reduction of the exhaust gas temperature at a time when both of the low rotation condition and the previously set forced regeneration condition are established, the engine speed is maintained at the high idle rotating speed which is higher than the low idle rotating speed as long as the filter device 60 is going to be clogged to some extent, even during the execution of the low rotation control which lowers the output of the engine 70. Thus, it is possible to suppress the reduction of the exhaust gas temperature so as to prevent the deterioration of the clogged state of the filter device 60, while intending the saving of the fuel consumption and the suppression of the noise due to the low rotation control. In other words, it is possible to suppress the progress of the clogging of the filter device 60 in such a range as not to deteriorate the function of the low rotation control, and it is accordingly possible to enjoy two benefits, that is, the fuel consumption saving and the exhaust gas purification by the working machine. There is achieved such an effect that it is possible to avoid the trouble of the failure caused by the clogging of the filter device 60 because of the execution of the low rotation control.

Further, since the control means 311 is structured such as to lower the engine speed to the low idle rotating speed, at a time when only the forced regeneration condition dissolves after setting the engine speed to the high idle rotating speed, there is achieved such an effect that it is possible to further improve the fuel consumption reducing effect on the basis of the low rotation control.

Further, since the control means 311 is structured such as to return the engine speed to the original rotating speed before both of the conditions are established, at a time when both of the low rotation condition and the forced regeneration condition dissolve, after setting the engine speed to the high idle rotating speed, it is possible to easily secure the output of the engine 70 only by carrying out the operation for starting the working machine or the operation for driving the working portion (the grain threshing device 5 or the like). Therefore, there is achieved such an effect that it is possible to securely prevent the problem that the engine 70 rapidly stops due to the lack of the output or the overload, by starting the working machine or driving the working portion under the low idle rotating speed, at a time of returning from the low rotation control.

(2) Second Embodiment

FIG. 13 to FIG. 16 show a second embodiment in the case that the present invention is applied to a hydraulic shovel which corresponds to the working machine. In this case, in the description relating to the hydraulic shovel in FIG. 13 and FIG. 14, a left side heading for a forward moving direction of a traveling machine body 1 is called simply as a left side, and a right side heading for the forward moving direction is called simply as a right side in the same manner. They are set to references of positional relationships in four directions, and upper and lower in the hydraulic shovel conveniently.

(2-1) Whole Structure of Hydraulic Shovel

Figure 13:
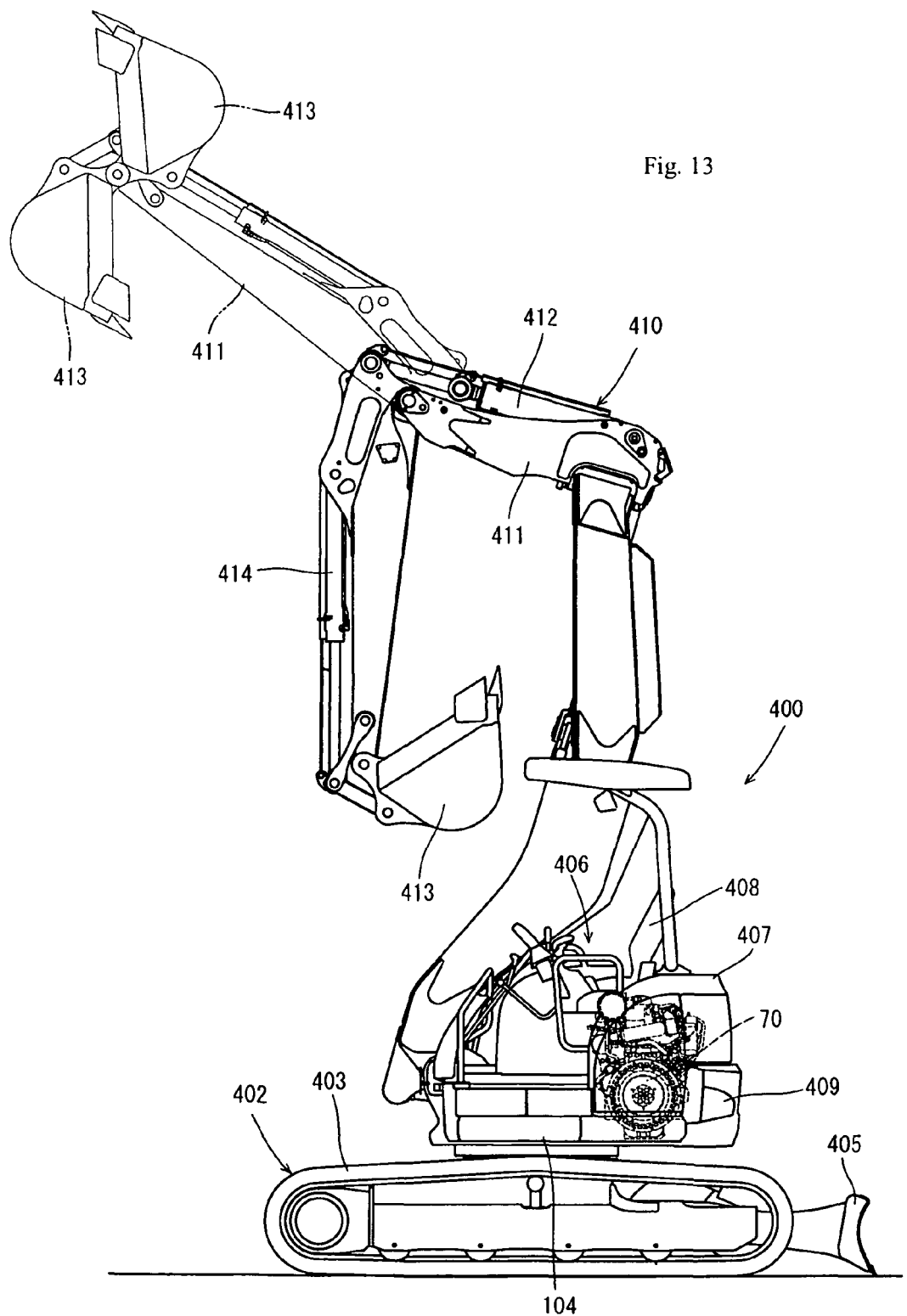
FIG. 13 is a side elevational view of a hydraulic shovel according to a second embodiment.
Figure 14:
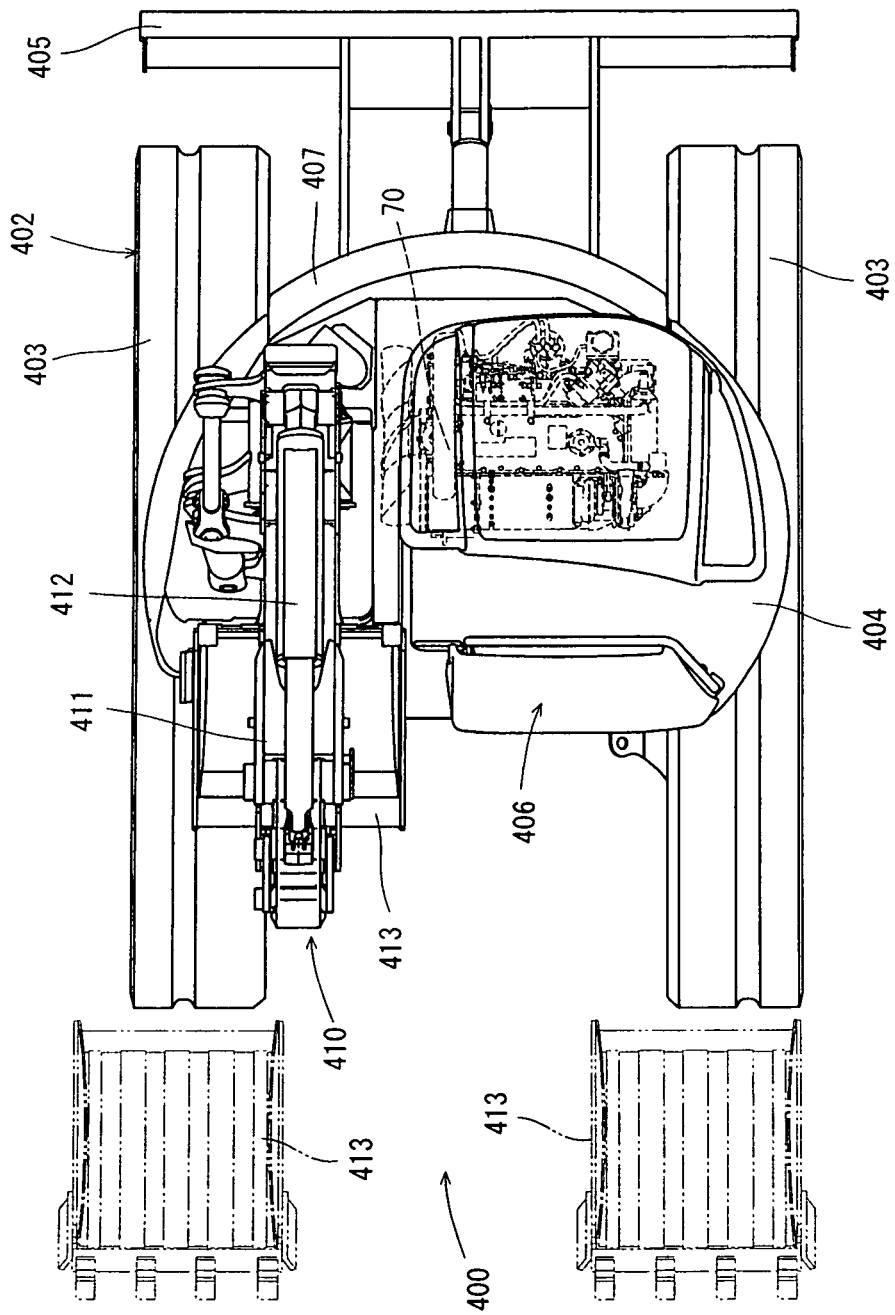
FIG. 14 is a plan view of the hydraulic shovel.

A description will be given of a whole structure of the hydraulic shovel which corresponds to the second embodiment of the working machine, with reference to FIG. 13 and FIG. 14. As shown in FIG. 13 and FIG. 14, a hydraulic shovel 400 is provided with a crawler type traveling device 402 which has a pair of right and left traveling crawlers 403, and a swivel machine body 404 which is provided on the traveling device 402. The swivel machine body 404 is structured such as to be capable of horizontally swiveling over all directions of 360 degree, by a swiveling hydraulic motor which is not illustrated. A bulldozing blade 405 for a ground work is installed to a rear portion of the traveling device 402 so as to be movable up and down. A control portion 406 and a diesel engine 70 are mounted to a left side portion of the swivel machine body 404. Since structures of the diesel engine 70 and auxiliary machines thereof are basically the same as the first embodiment, a detailed description thereof will be omitted by attaching the same reference numerals as the first embodiment. A right side portion of the swivel machine body 404 is provided with a working portion 410 which has a boom 411 and a bucket 413 for an excavating work.

In the control portion 406, there are arranged a control seat 408 on which an operator seats, operating means which operates the diesel engine 70 or the like so as to output, and an operation lever 416 or a switch which serves as operating means for the working portion 410. A boom cylinder 412 and a bucket cylinder 414 are arranged in the boom 411 which corresponds to a constituent part of the working portion 410. The bucket 413 which serves as an excavating attachment is pivoted to a leading end portion of the boom 411 so as to be capable of scooping and rotating. The structure is made such as to execute an earth work (a ground work such as a groove formation or the like) by means of the bucket 413 by actuating the boom cylinder 412 or the bucket cylinder 414.

(2-2) Structure for Executing Fuel Injection Control

Next, a description will be given of a structure for executing a fuel injection control with reference to FIG. 15. A basic structure of the fuel injection controller 311 which is mounted to the hydraulic shovel 400 according to the second embodiment is the same as that of the first embodiment. To an input side of the fuel injection controller 311, there are connected a rail pressure sensor 312 which detects a fuel pressure within the common rail 120, an electromagnetic clutch 313 which rotates or stops the fuel pump 116, an engine rotation sensor 314 which detects an engine speed of the diesel engine 70 (a position of a crank type cam shaft of the engine output shaft 74), an injection setting device 315 which detects and sets a fuel injection frequency of the injector 115 (a fuel injection frequency during one stroke fuel injection period), an acceleration sensor 316 which detects an operation position of an acceleration operating device (not shown) such as an acceleration lever or an acceleration pedal, a turbo booster sensor 317 which detects a pressure of the turbo supercharger 100, an intake air temperature sensor 318 which detects an intake air temperature of the intake manifold 73, and a cooling water temperature sensor 319 which detects a temperature of a cooling water of the diesel engine 70.

Electromagnetic solenoids of the fuel injection valves 119 for four cylinders are connected to an output side of the fuel injection controller 311. In other words, it is structured such that a high pressure fuel reserved in the common rail 120 is injected from the fuel injection valve 119 at plural times in one stroke, while controlling a fuel injection pressure, a fuel injecting timing, or a fuel injection period.

Figure 15:
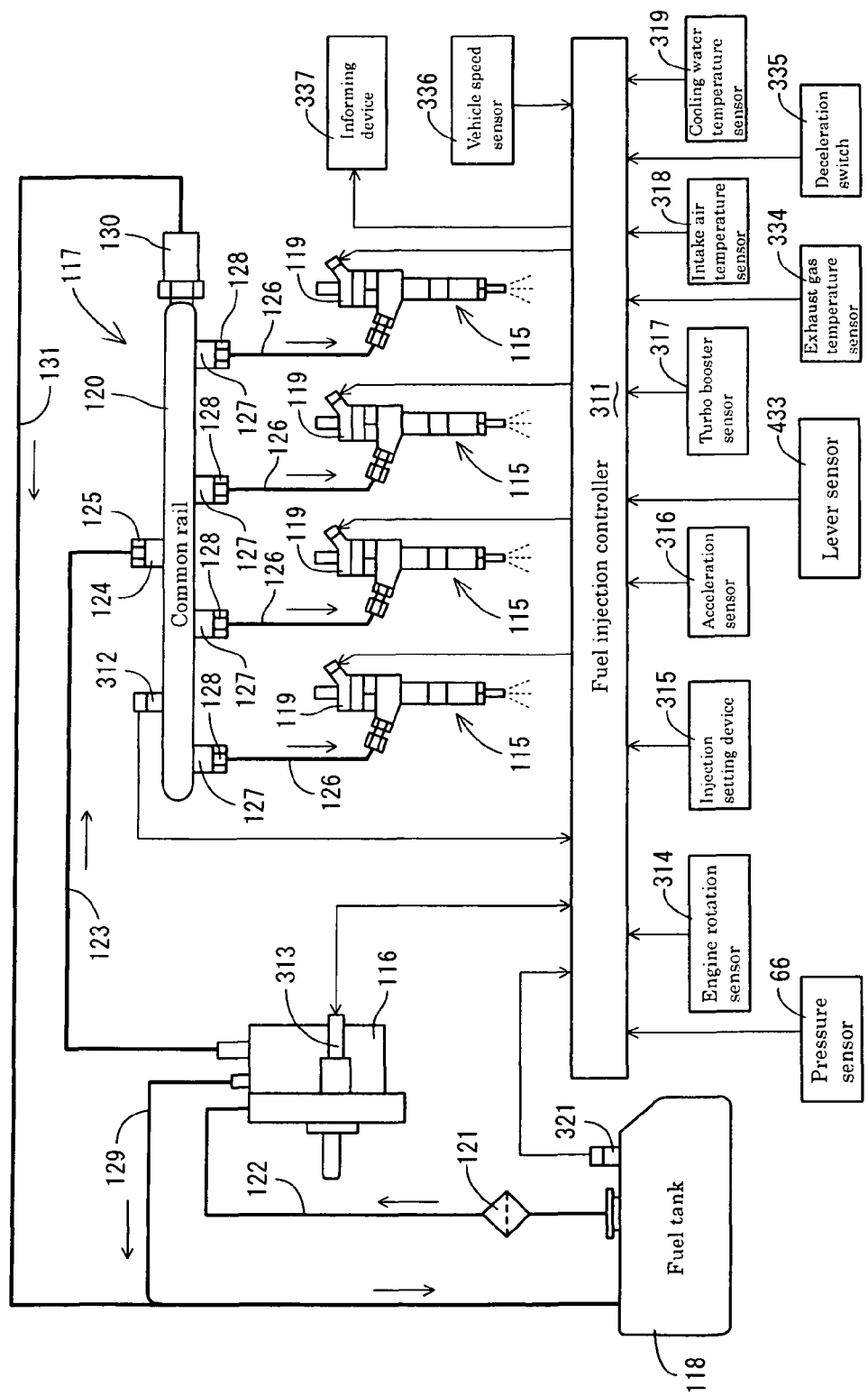
FIG. 15 is a fuel system explanatory view of a diesel engine.
Figure 16:
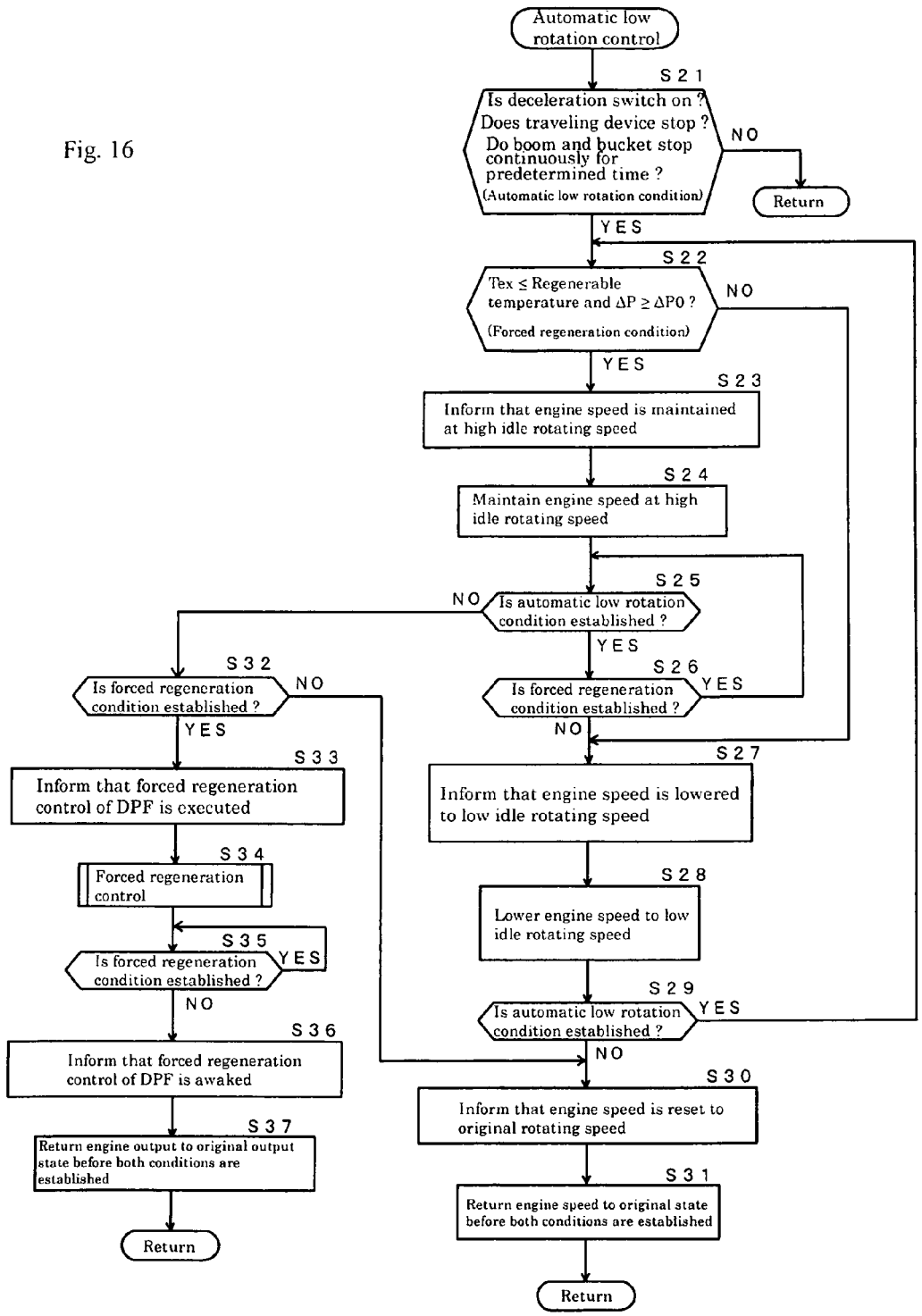
FIG. 16 is a flow chart of an automatic low rotation control.

As shown in FIG. 15, to an input side of the fuel injection controller 311, there are electrically connected a potentiometer type lever sensor 433 which detects an operation position of the operation lever 416, an exhaust gas temperature sensor 334 which detects an exhaust gas temperature of the exhaust manifold 71, a deceleration switch 335 which serves as selection operating means selectively operating an auto deceleration control lowering the engine speed to the low idle rotating speed, a vehicle speed sensor 336 which detects a vehicle speed (a moving speed) of the hydraulic shovel 400, and a pressure sensor 66 which detects a clogged state of the DPF 60. Further, an informing device 337 which visually informs of various alarms or the like is electrically connected to an output side of the fuel injection controller 311. Various blinking data of the informing device 337 is previously stored in memory means (ROM) of the fuel injection controller 311.

In the fuel injection controller 311 according to the second embodiment, in order to execute the automatic low rotation control (the auto deceleration control) for lowering the engine speed to the predetermined low rotating speed (the low idle rotating speed) at a time when a previously set automatic low rotation condition is established, and suppress the reduction of the exhaust gas temperature at a time when both of the automatic low rotation condition and a forced regeneration condition mentioned below are established, the engine speed is set to be maintained at a second low rotating speed (a high idle rotating speed) which is higher than the low idle rotating speed.

In the second embodiment, it is set such that the automatic low rotation condition is established at a time when the working portion 410 (the boom 411 and the bucket 413) are not operated continuously for a predetermined time, under a state of operating the deceleration switch 335 so as to be allowed (turned on). In other words, the automatic low rotation condition in the second embodiment is constructed by two conditions of the operation of the deceleration switch 335 to be turned on, and the continuous non-operating state of the working portion 410 (the boom 411 and the bucket 413) for the predetermined time. Further, the forced regeneration condition in the second embodiment is constructed by two conditions of a detection value Tex of the exhaust gas temperature being equal to or less than a regenerable temperature (for example, about 300° C.), and a pressure difference $\Delta P$ between a detection value P of the pressure sensor 66 and a reference pressure value Ps being equal to or more than a critical pressure difference value $\Delta P0$.

(2-3) Description of Automatic Low Rotation Control

Next, a description will be given of one example of the automatic low rotation control mentioned above with reference to a flow chart in FIG. 16. The automatic low rotation control according to the second embodiment first of all discriminates whether a position fixing state of a traveling lever 415 is detected by a traveling sensor 432, and a position fixing state of an operation lever 416 (a stop of the boom and the bucket) is continuously detected by a lever sensor 433 for a predetermined time, at a time of turning on the deceleration switch 335, that is, whether the automatic low rotation condition is established (a step S21). If the condition is established (YES in the step S21), it is next discriminated whether the detection value Tex of the exhaust gas temperature is equal to or less than the regenerable temperature (for example, about 300° C.), and the pressure difference $\Delta P$ between the detection value P of the pressure sensor 66 and the reference pressure value Ps is equal to or more than the critical pressure difference value $\Delta P0$, that is, whether the forced regeneration condition is established (a step S22).

If the forced regeneration condition is not established (NO in the step S22), the step goes to a step S27 mentioned below, and it is informed that the engine speed of the diesel engine 70 will be lowered to the low idle rotating speed (from the original rotating speed) for a predetermined time by the informing device 337 (details will be mentioned below). When the forced regeneration condition is established (YES in the step S22), the particulate matter is piled up to some extent in the soot filter 65 and there is generated a state in which the regenerating motion of the soot filter 65 is hard to make progress. Then, it is next informed that the engine speed of the diesel engine 70 will be maintained at the high idle rotating speed, for a predetermined time by the informing device 337 (a step S23), and thereafter the injection state of the fuel from each of the injectors 115 is regulated so as to maintain the engine speed of the diesel engine 70 to the high idle rotating speed which is higher than the low idle rotating speed, for suppressing the reduction of the exhaust gas temperature so as to prevent a deterioration of the clogged state of the DPF 60 (a step S24).

Further, it is discriminated whether the automatic low rotation condition mentioned above is established (a step S25), and if it is established (YES in the step S25), it is discriminated whether the forced regeneration condition mentioned above is established (a step S26). If the forced regeneration condition is not established (NO in the step S26), a sedimentation state of the particulate matter in the soot filter 65 is relaxed to some extent, so that it is informed that the engine speed of the diesel engine 70 will be lowered to the low idle rotating speed, for a predetermined time by the informing device 337 (a step S27), and thereafter the injection state of the fuel from each of the injectors 115 is regulated so as to lower the engine speed of the diesel engine 70 to the low idle rotating speed (from the high rotating speed) (a step S28).

Next, it is discriminated whether the same automatic low rotation condition as the steps S21 and S25 is continuously established (a step S29), and if it is established (YES in the step S29), the step goes back to the step S22 mentioned above. If the automatic low rotation condition is not established (NO in the step S29), it is informed that the engine speed of the diesel engine 70 will be returned to the original rotating speed, for a predetermined time by the informing device 337 (a step S30), and thereafter the injection state of the fuel from each of the injectors 115 is regulated so as to return the engine speed of the diesel engine 70 to the original rotating speed before both the conditions (the automatic low rotation condition and the forced regeneration condition) are established (a step S31).

Turning to the step S25, if the automatic low rotation condition is not established (NO in the step S25), it is next discriminated whether the forced regeneration condition is established (a step S32). If the forced regeneration condition is established (YES in the step S32), it is informed that the forced regeneration control of the DPF 60 will be executed, for a predetermined time by the informing device 337 (a step S33), and thereafter the forced regeneration control of the DPF 60 is executed (a step S34). In other words, the step regulates the injection state of the fuel from each of the injectors 115, raises the output of the diesel engine 70 so as to raise the exhaust gas temperature, and forcibly burns the particulate matter in the soot filter 65. Next, if the forced regeneration condition is not established (NO in the step S35), it is informed that the forced regeneration control of the DPF 60 will be awaked, for a predetermined time by the informing device 337 (a step S36), thereafter the injection state of the fuel from each of the injectors 115 is regulated, and the output of the diesel engine 70 is returned to the original state before both the conditions (the automatic low rotation condition and the forced regeneration condition) are established (a step S37).

Turning to the step S32, if the forced regeneration condition is not established (NO in the step S32), the step goes to a step S30, it is informed that the engine speed of the diesel engine 70 will be returned to the original rotating speed, for a predetermined time by the informing device 337, thereafter the injection state of the fuel from each of the injectors 115 is regulated in a step S31, and the engine speed of the diesel engine 70 is returned to the original rotating speed before both the conditions (the automatic low rotation condition and the forced regeneration condition) are established.

As is apparent from the description mentioned above, the same operations and effects as those of the case of the first embodiment can be obtained in the case of being structured as the second embodiment.

(3) Third Embodiment

FIG. 17 to FIG. 23 show a third embodiment in the case that the present invention is applied to a hydraulic shovel which mounts an electronic governor type diesel engine thereon. Since the structure of the hydraulic shovel 400 is basically the same as the second embodiment, a detailed description will be omitted by attaching the same reference numerals as the reference numerals of the second embodiment.

(3-1) Whole Structure of Electronic Governor Type Diesel Engine

A description will be given of a whole structure of an electronic governor type diesel engine 570 with reference to FIG. 17 to FIG. 21. In this case, in the description relating to the diesel engine 570, an installation side of an intake manifold 573 of the diesel engine 570 which is directed rearward with respect to the hydraulic shovel 400 is called simply as a rear side of the diesel engine 570, and an installation side of an exhaust manifold 571 of the diesel engine 570 which is directed forward with respect to the hydraulic shovel 400 is called simply as a front side of the diesel engine 570 in the same manner.

Figure 17:
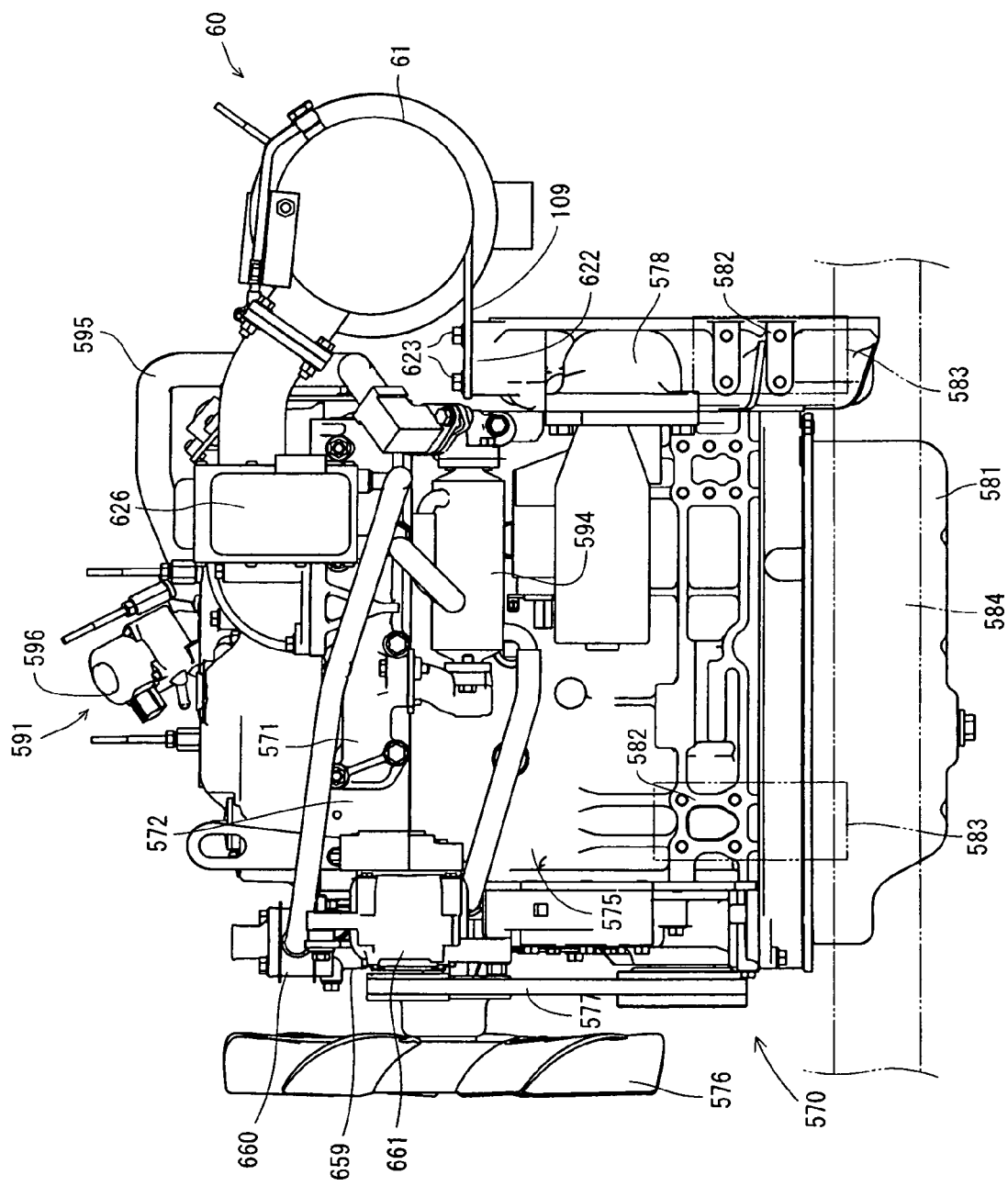
FIG. 17 is a side elevational view of an exhaust manifold installation side of an electronic governor type diesel engine according to a third embodiment.
Figure 19:
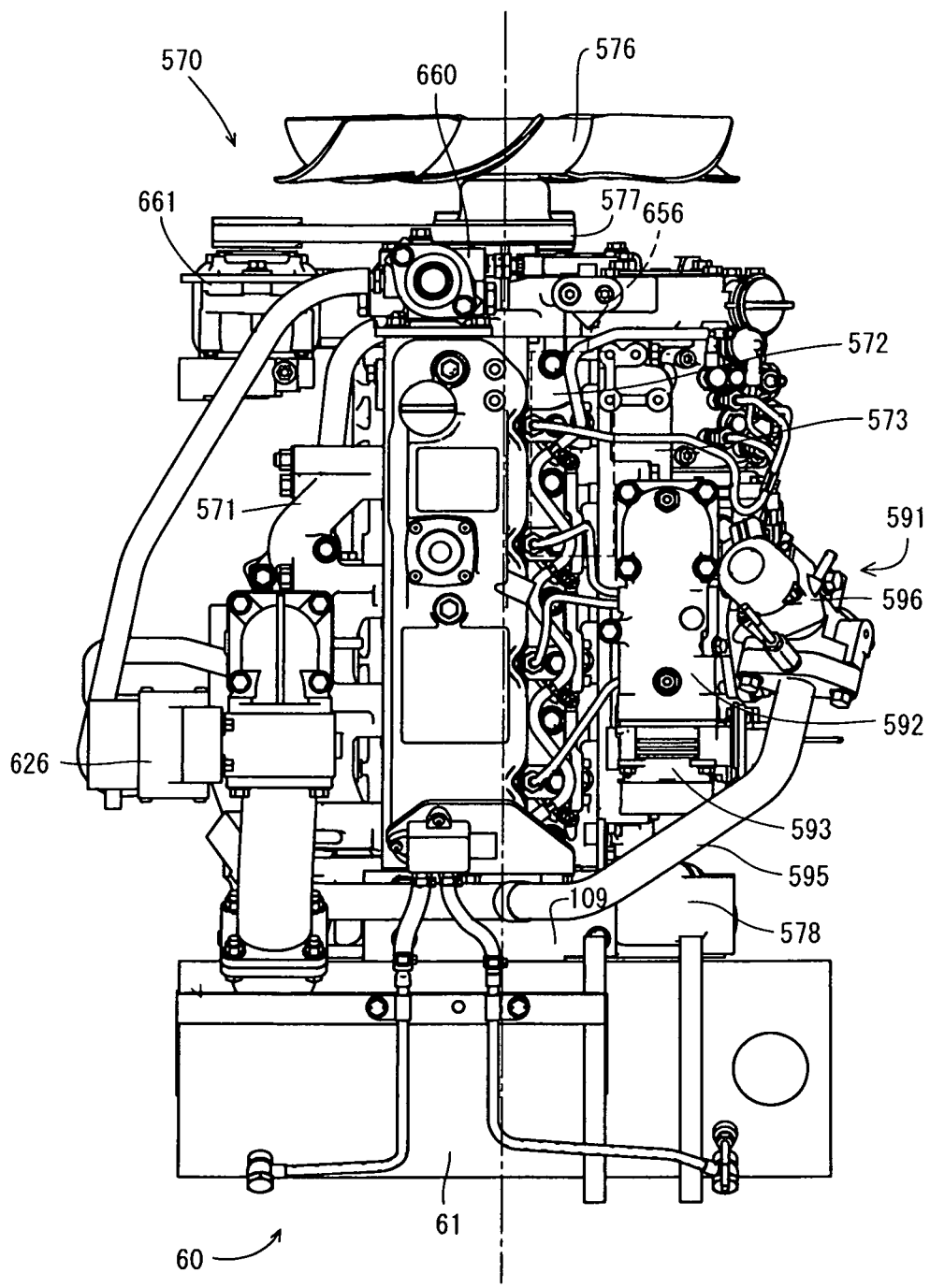
FIG. 19 is a plan view of the electronic governor type diesel engine.

As shown in FIG. 17 and FIG. 19, the exhaust manifold 571 is arranged in a front side surface of a cylinder head 572 in the diesel engine 570. The intake manifold 573 is arranged in a right side surface of the cylinder head 572. The cylinder head 572 is mounted on a cylinder block 575 which has an engine output shaft 574 (a crank shaft) and a piston (not shown). Right and left leading end portions of the engine output shaft 574 are protruded respectively from both right and left side surfaces of the cylinder block 575. A cooling fan 576 is provided in a right side surface of the cylinder block 575. The structure is made such that a rotating force is transmitted to the cooling fan 576 via a V belt 577 from a front end side of the engine output shaft 574.

Figure 18:
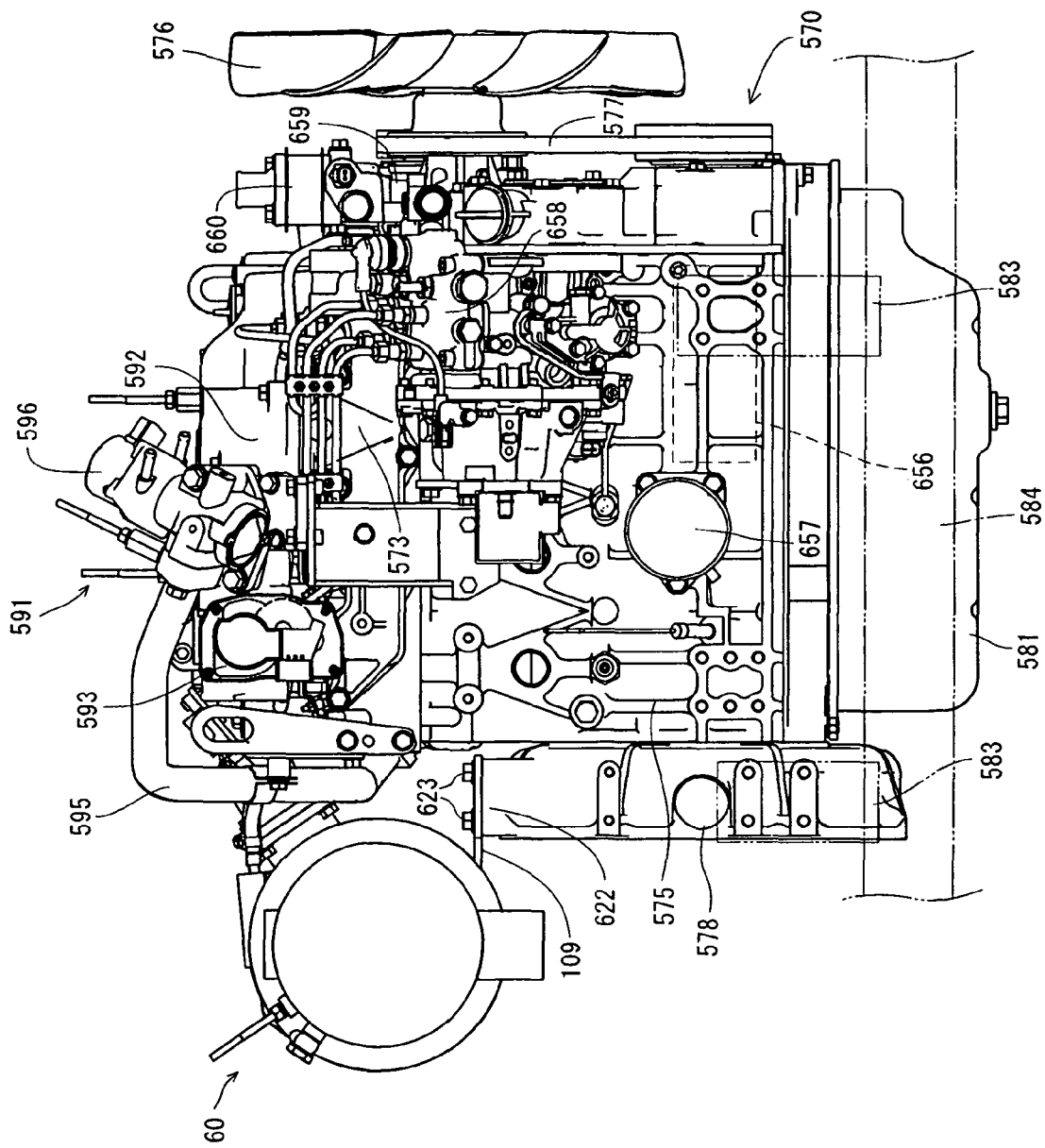
FIG. 18 is a side elevational view of an intake manifold installation side of the electronic governor type diesel engine.
Figure 20:
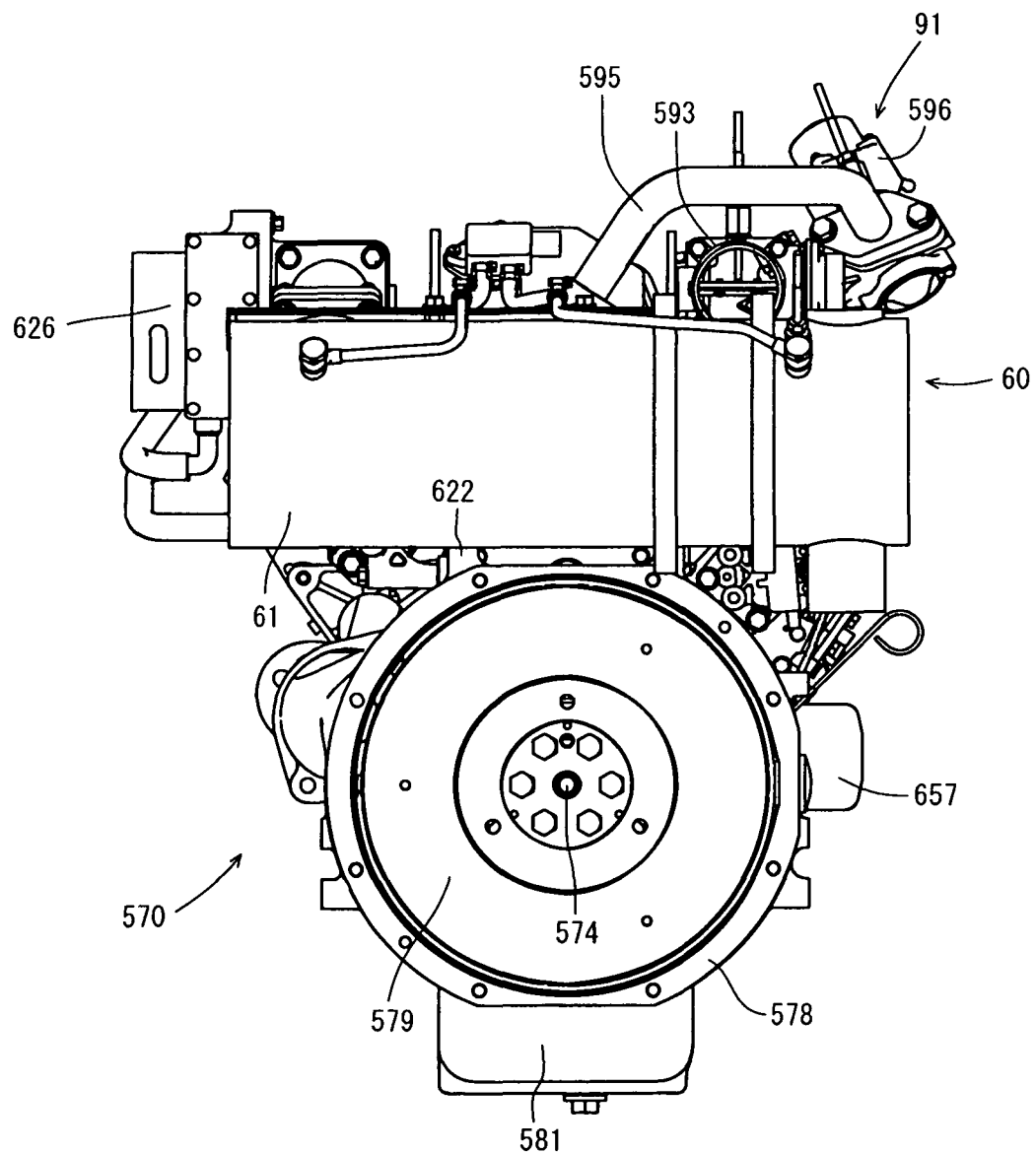
FIG. 20 is a side elevational view of a flywheel installation side of the electronic governor type diesel engine.
Figure 21:
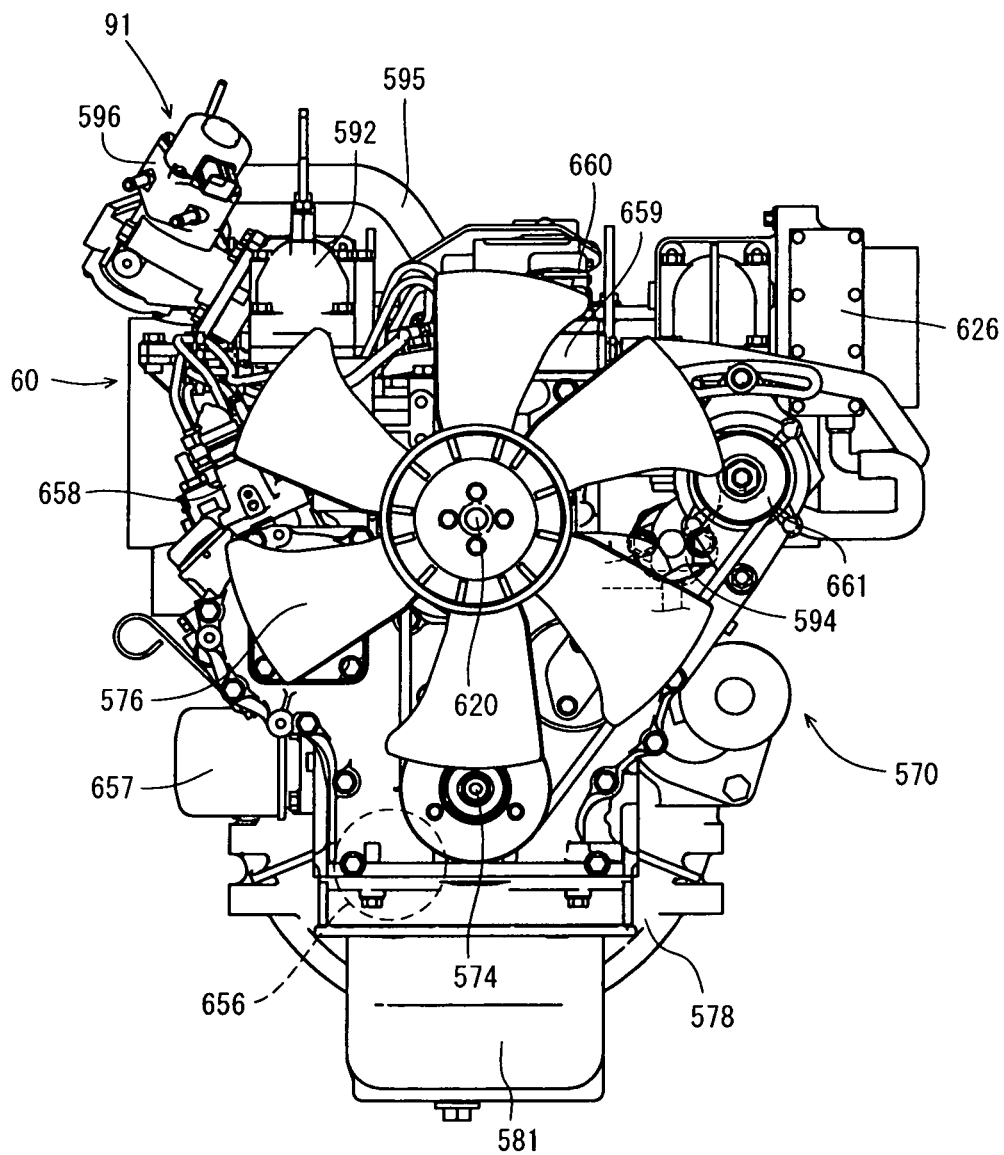
FIG. 21 is a side elevational view of a cooling fan installation side of the electronic governor type diesel engine.

As shown in FIG. 17, FIG. 18, and FIG. 20, a flywheel housing 578 is firmly fixed to a left side surface of the cylinder block 575. A flywheel 579 is provided within the flywheel housing 578. The flywheel 579 is pivoted to a left leading end side of the engine output shaft 574. The structure is made such that a power of the diesel engine 570 is taken out via the flywheel 579 to a working portion of the hydraulic shovel.

Further, an oil pan mechanism 581 is arranged in a lower surface of the cylinder block 575. A lubricating oil is reserved within the oil pan mechanism 581. The lubricating oil within the oil pan mechanism 581 is sucked by an oil pump 656 which is arranged at a position closer to a right side surface within the cylinder block 575, and is fed to each of lubricating portions of the diesel engine 570 via an oil filter 657 which is arranged in a right side surface of the cylinder block 575. The lubricating oil fed to each of the lubricating portions is returned thereafter to the oil pan mechanism 581. The oil pump 656 is structured such as to be driven on the basis of a rotation of the engine output shaft 574.

A fuel injection device 658 for feeding the fuel into a combustion chamber within the cylinder block 575 is attached to the above of the oil filter 657 (the below of the intake manifold 573) in a rear side surface of the cylinder block 575. The fuel injection device 658 is provided with an electronic governor and a fuel feed pump (an illustration of both of which is omitted) for regulating a fuel injection amount. The fuel within the fuel tank is fed into the fuel injection device 658 via the fuel filter by driving the fuel feed pump.

A cooling water pump 659 for lubricating a cooling water is arranged in a right side surface side of the cylinder block 575 so as to be coaxial with a fan shaft 620 of the cooling fan 576. The cooling water pump 659 is structured such as to be driven together with the cooling fan 576 on the basis of the rotation of the engine output shaft 574. The cooling water within a radiator (not shown) which is mounted in the hydraulic shovel is fed to the cooling water pump 659 via a thermostat case 660 which is provided in an upper portion of the cooling water pump 659. Further, the cooling water is fed to a water-cooled jacket (not shown) which is formed in the cylinder head 572 and the cylinder block 575, by driving the cooling water pump 659, and cools the diesel engine 570. The cooling water contributing the cooling of the diesel engine 570 is returned to the radiator. In this case, an alternator 661 is provided in a left side of the cooling water pump 659.

An engine leg attaching portion 582 is provided in each of front and rear side surfaces of the cylinder block 575 and front and rear side surfaces of the flywheel housing 578. An engine leg body 583 having a vibration proof rubber is fastened by bolt to each of the engine leg attaching portions 582. The diesel engine 570 is supported in a vibration proofing manner to an engine support chassis 584 of the hydraulic shovel via each of the engine leg bodies 583.

As shown in FIG. 18, an inlet portion of the intake manifold 573 protrudes upward from an approximately center portion of the intake manifold 573. Further, the inlet portion of the intake manifold 573 is connected to an air cleaner (not shown) via an EGR main body case 592 which constructs an EGR device 591 (an exhaust gas regeneration device). A fresh air (an external air) sucked into the air cleaner is fed to the intake manifold 573 via the EGR device 591 after being removed dusts and purified by the air cleaner, and is fed to each of the cylinders of the diesel engine 570.

As shown in FIG. 18 and FIG. 19, the EGR device 591 is provided with an EGR main body case 592 which mixes a part of the exhaust gas of the diesel engine 570 with the fresh air so as to feed to the intake manifold 573, an intake air throttle valve 593 which communicates the EGR main body case 592 with the air cleaner, a recirculation exhaust gas pipe 595 which is connected to the exhaust manifold 571 via an EGR cooler 594, and an EGR valve 596 which communicates the EGR main body case 592 with the recirculation exhaust gas pipe 595.

In other words, the intake manifold 573 and the intake air throttle valve 593 for introducing the fresh air are connected via the EGR main body case 592. Further, an outlet side of the recirculation exhaust gas pipe 595 extending from the exhaust manifold 571 is communicated with the EGR main body case 592. As shown in FIG. 19, the EGR main body case 592 is formed as a long tube shape. The intake air throttle valve 593 is connected by bolt to one end portion in the longitudinal direction of the EGR main body case 592. A downward opening end portion which is formed at a position in an opposite side to the intake air throttle valve 593 in the EGR main body case 592 is detachably fastened by bolt to an inlet portion of the intake manifold 573.

In the third embodiment, an outlet side of the recirculation exhaust gas pipe 595 is connected to the EGR main body case 592 via the EGR valve 596. The EGR valve 596 is structured such as to regulate a feed amount of the EGR gas to the EGR main body case 592 by regulating an opening degree thereof. An opening end portion which protrudes downward diagonally from an outer peripheral surface of the EGR valve 596 is connected to a longitudinal intermediate portion of the EGR main body case 592. An inlet side of the recirculation exhaust gas pipe 595 is connected to a lower surface side of the exhaust manifold 571 via the EGR cooler 594.

According to the structure mentioned above, the fresh air (the external air) is fed into the EGR main body case 592 from the air cleaner via the intake air throttle member 593, and the EGR gas (a part of the exhaust gas discharged from the exhaust manifold 571) is fed into the EGR main body case 592 via the EGR valve 596 from the exhaust manifold 571. After the fresh air from the air cleaner and the EGR gas from the exhaust manifold 571 are mixed within the EGR main body case 592, a mixed gas within the EGR main body case 592 is fed to the intake manifold 573. Thus, a part of the exhaust gas which is discharged to the exhaust manifold 571 from the diesel engine 570 is recirculated to the diesel engine 570 from the intake manifold 573, whereby a maximum combustion temperature at a time of the high load operation descends, and a discharge amount of NOx (a nitrogen oxide) from the diesel engine 570 is lowered.

The intake air throttle valve 593 is provided for ascending an intake air pressure of the diesel engine 570. In other words, when the particulate matter (the soot) is piled up in the soot filter 65, the particulate matter (the soot) piled up in the soot filter 65 burns by making the intake air pressure of the diesel engine 570 higher on the basis of an actuation control of the intake air throttle valve 593 so as to make the exhaust gas temperature from the diesel engine 570 high. As a result, the particulate matter disappears, and the soot filter 65 is regenerated. Thus, even if such a work that the load tends to become smaller and the temperature of the exhaust gas tends to become lower (such a work that the particulate matter tends to be piled up) is continuously carried out, it is possible to regenerate the soot filter 65 on the basis of a forced ascent of the intake air pressure by the intake air throttle valve 593, and it is possible to appropriately maintain an exhaust gas purifying capacity of the DPF 60. Further, a burner or the like for burning the soot which is piled up in the soot filter 65 is not necessary.

As shown in FIG. 17 to FIG. 19, one end side of the fixing leg body 109 is fixed by welding to the DPF casing 61. Another end side of the fixing leg body 109 is detachably fastened to an DPF attaching portion 622 which is formed in an upper surface of the flywheel housing 578 by a bolt 623. Accordingly, the DPF 60 is supported to the flywheel housing 578 having a high rigidity via both the fixing leg bodies 109. In this case, since the structure of the DPF 60 is basically the same as the first and second embodiment, a detailed description will be omitted by attaching the same reference numerals to the first and second embodiment.

As shown in FIG. 17, an outlet portion of the exhaust manifold 571 protrudes upward from a left end portion side of the exhaust manifold 571. The outlet portion of the exhaust manifold 571 is detachably connected to the exhaust gas inlet side of the DPF 60 via an exhaust gas throttle device 626 for regulating an exhaust gas pressure of the diesel engine 570. The exhaust gas which moves into the DPF 60 from the outlet portion of the exhaust manifold 571 moves to a tail pipe (not shown) from the exhaust gas discharge side after being purified by the DPF 60, and is finally discharged out of the machine.

(3-2) Structure for Executing Fuel Injection Control and Control Aspect of the Same Next, a description will be given of a structure for executing a fuel injection control and control aspects of the same with reference to FIG. 22 and FIG. 23. In the DPF 60, in order to maintain a purifying performance of the exhaust gas in an appropriate state, it is necessary that the exhaust gas temperature is equal to or higher than a predetermined temperature (approximately 300° C.). In this regard, the third embodiment is structured such that the exhaust gas temperature from the diesel engine 570 can be regulated by utilizing the intake air throttle valve 593.

In an electronic governor controller 611 which serves as control means mounted on the hydraulic shovel, in the same manner as the first and second embodiments, in order to execute the automatic low rotation control (the auto deceleration control) for lowering the engine speed to a predetermined first low rotating speed (the low idle rotating speed) at a time when a previously set automatic low rotation condition is established, and suppress the reduction of the exhaust gas temperature at a time when both of the automatic low rotation condition and a forced regeneration condition mentioned below are established, the engine speed is set to be maintained at a second low rotating speed (a high idle rotating speed) which is higher than the low idle rotating speed, and it has a central processing unit (CPU) and memory means.

Figure 22:
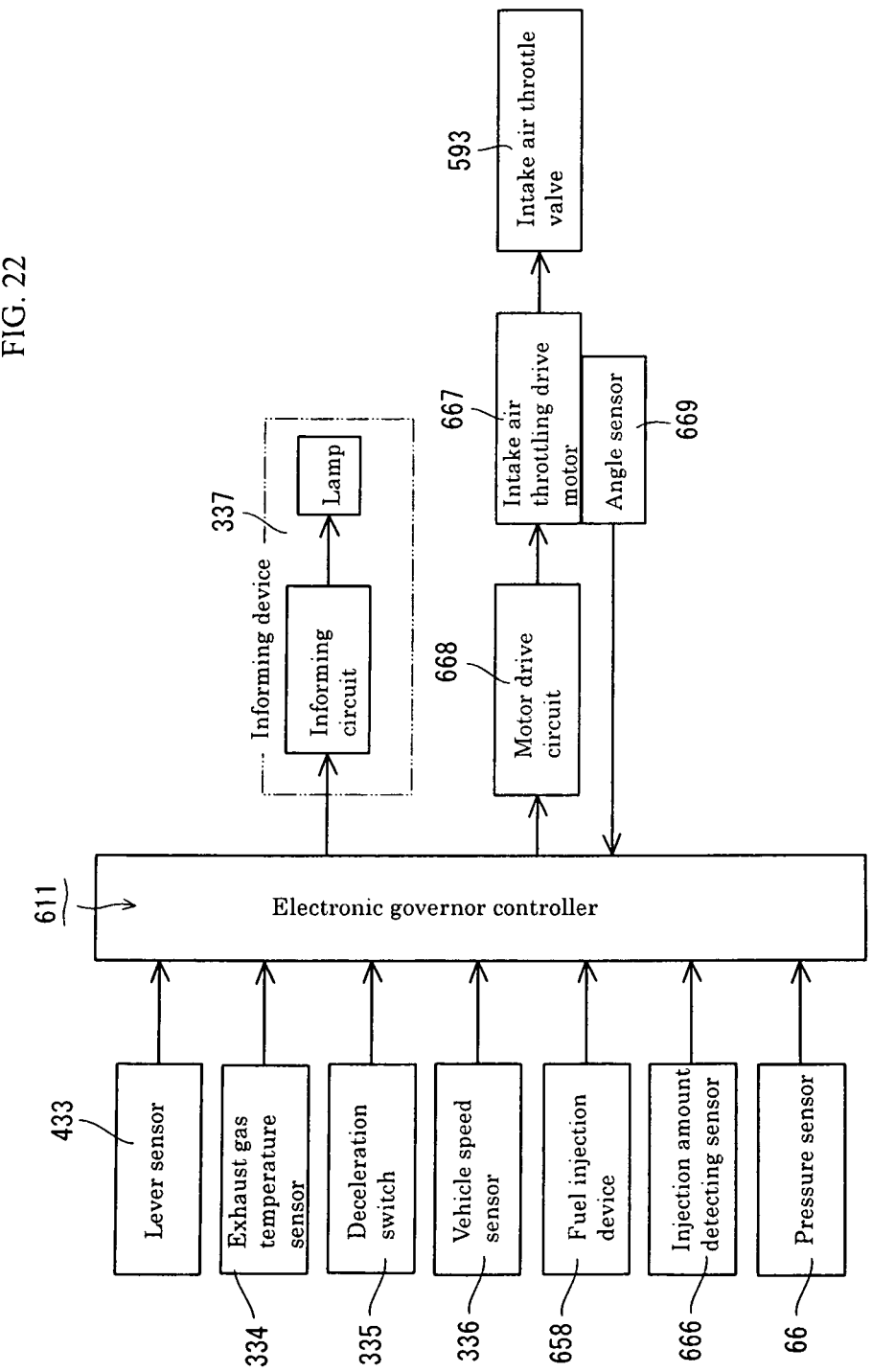
FIG. 22 is a function block diagram of an electronic governor controller.

As shown in FIG. 22, to the electronic governor controller 611, there are electrically connected a fuel injection device 658 of the diesel engine 570, an injection amount detecting sensor 666 which detects a fuel injection amount from the fuel injection device 658, a potentiometer type lever sensor 433 which detects an operation position of the operation lever 416, an exhaust gas temperature sensor 334 which detects an exhaust gas temperature of the exhaust manifold 571, a deceleration switch 335 which serves as selection operating means for selectively operating the auto deceleration control lowering the engine speed to the low idle rotating speed, a vehicle speed sensor 336 which detects a vehicle speed (a moving speed) of the hydraulic shovel 400, a pressure sensor 66 which detects a clogged state of the DPF 60, an informing device 337 which serves as the informing means, a motor drive circuit 668 with respect to an intake air throttling drive motor 667 which can rotate forward and backward, and an angle sensor 669 which detects a valve opening and closing angle of the intake air throttle valve 593. In this case, various blinking data of the informing device 337 is previously stored in memory means of the electronic governor controller 611.

Figure 23:
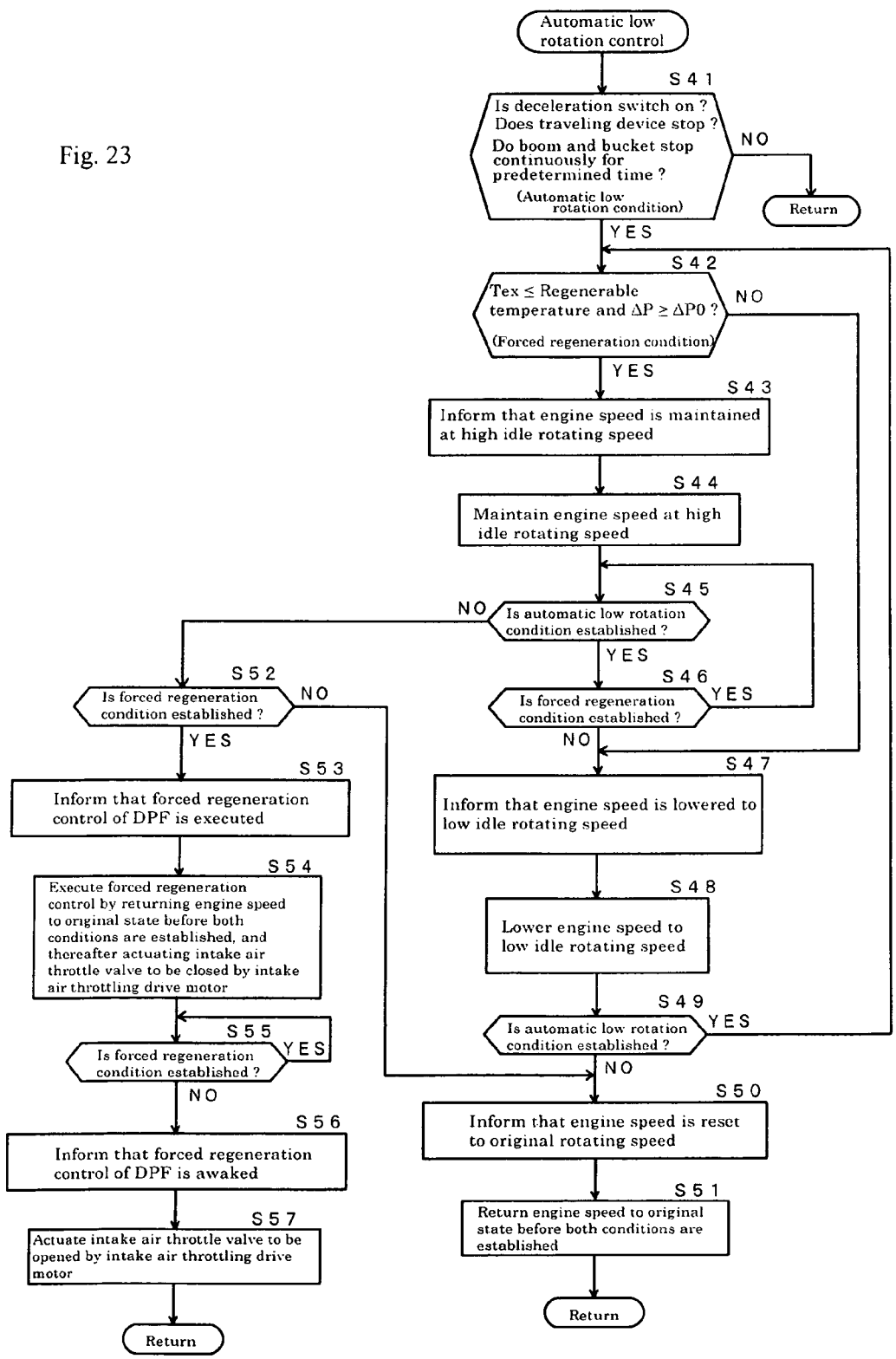
FIG. 23 is a flow chart of an automatic low rotation control.

In this case, as shown in a flow chart in FIG. 23, first of all, it is discriminated whether a position fixing state of a traveling lever 415 is detected by a traveling sensor 432, and a position fixing state of an operation lever 416 (a stop of the boom and the bucket) is continuously detected by a lever sensor 433 for a predetermined time, at a time of turning on the deceleration switch 335, that is, whether the automatic low rotation condition is established (a step S41). If the condition is established (YES in the step S41), it is next discriminated whether the detection value Tex of the exhaust gas temperature is equal to or less than the regenerable temperature (for example, about 300° C.), and the pressure difference ΔP between the detection value P of the pressure sensor 66 and the reference pressure value Ps is equal to or more than the critical pressure difference value ΔP0, that is, whether the forced regeneration condition is established (a step S42).

If the forced regeneration condition is not established (NO in the step S42), the step goes to a step S37 mentioned below, and it is informed that the engine speed of the diesel engine 570 will be lowered to the low idle rotating speed (from the original rotating speed) for a predetermined time by the informing device 337 (details will be mentioned below). When the forced regeneration condition is established (YES in the step S42), the particulate matter is piled up to some extent in the soot filter 65 and there is generated a state in which the regenerating motion of the soot filter 65 is hard to make progress. Then, it is next informed that the engine speed of the diesel engine 570 will be maintained at the high idle rotating speed, for a predetermined time by the informing device 337 (a step S43), and thereafter the injection state of the fuel from the fuel injection device 658 is regulated so as to maintain the engine speed of the diesel engine 570 to the high idle rotating speed which is higher than the low idle rotating speed, for suppressing the reduction of the exhaust gas temperature so as to prevent a deterioration of the clogged state of the DPF 60 (a step S44).

Further, it is discriminated whether the automatic low rotation condition mentioned above is established (a step S45), and if it is established (YES in the step S45), it is discriminated whether the forced regeneration condition mentioned above is established (a step S46). If the forced regeneration condition is not established (NO in the step S46), a sedimentation state of the particulate matter in the soot filter 65 is relaxed to some extent, so that it is informed that the engine speed of the diesel engine 570 will be lowered to the low idle rotating speed, for a predetermined time by the informing device 337 (a step S47), and thereafter the injection state of the fuel from the fuel injection device 658 is regulated so as to lower the engine speed of the diesel engine 570 to the low idle rotating speed (from a quasi low rotating speed) (a step S48).

Next, it is discriminated whether the same automatic low rotation condition as the steps S41 and S45 is continuously established (a step S49), and if it is established (YES in the step S49), the step goes back to the step S42 mentioned above. If the automatic low rotation condition is not established (NO in the step S49), it is informed that the engine speed of the diesel engine 570 will be returned to the original rotating speed, for a predetermined time by the informing device 337 (a step S50), and thereafter the injection state of the fuel from the fuel injection device 658 regulated so as to return the engine speed of the diesel engine 570 to the original rotating speed before both the conditions (the automatic low rotation condition and the forced regeneration condition) are established (a step S51).

Turning to the step S45, if the automatic low rotation condition is not established (NO in the step S45), it is next discriminated whether the forced regeneration condition is established (a step S52). If the forced regeneration condition is established (YES in the step S52), it is informed that the forced regeneration control of the DPF 60 will be executed, for a predetermined time by the informing device 337 (a step S53), and thereafter the forced regeneration control of the DPF 60 is executed after returning the engine speed of the diesel engine 570 to the original rotating speed before both the conditions (the automatic low rotation condition and the forced regeneration condition) are established (a step S54). In other words, the intake air throttle valve 593 is actuated so as to be closed by driving the intake air throttling drive motor 667. Thus, a load of the diesel engine 570 is increased, and an output (a fuel injection amount) of the diesel engine 570 is increased for maintaining the engine speed. As a result, the exhaust gas temperature from the diesel engine 570 rises. Further, the particulate matter in the soot filter 65 forcibly burns. Next, if the forced regeneration condition is not established (NO in the step S55), it is informed that the forced regeneration control of the DPF 60 will be awaked, for a predetermined time by the informing device 337 (a step S56), thereafter the intake air throttle valve 593 is actuated so as to be opened by driving the intake air throttling drive motor 667, and returns the valve opening and closing angle of the intake air throttle valve 593 to the original state before the closing actuation (a step S57). Thus, since the load of the diesel engine 570 is reduced, the output (the fuel injection amount) of the diesel engine 570 is reduced for maintaining the engine speed.

Turning to the step S52, if the forced regeneration condition is not established (NO in the step S52), the step goes to a step S50, it is informed that the engine speed of the diesel engine 570 will be returned to the original rotating speed, for a predetermined time by the informing device 337, thereafter the injection state of the fuel from the fuel injection device 658 is regulated in a step S51, and returns the engine speed of the diesel engine 570 to the original rotating speed before both the conditions (the automatic low rotation condition and the forced regeneration condition) are established.

As is apparent from the description mentioned above, the same operations and effects as those of the case of the first and second embodiments can be obtained in the case of being structured as the third embodiment.

(4) Fourth Embodiment

Figure 24:
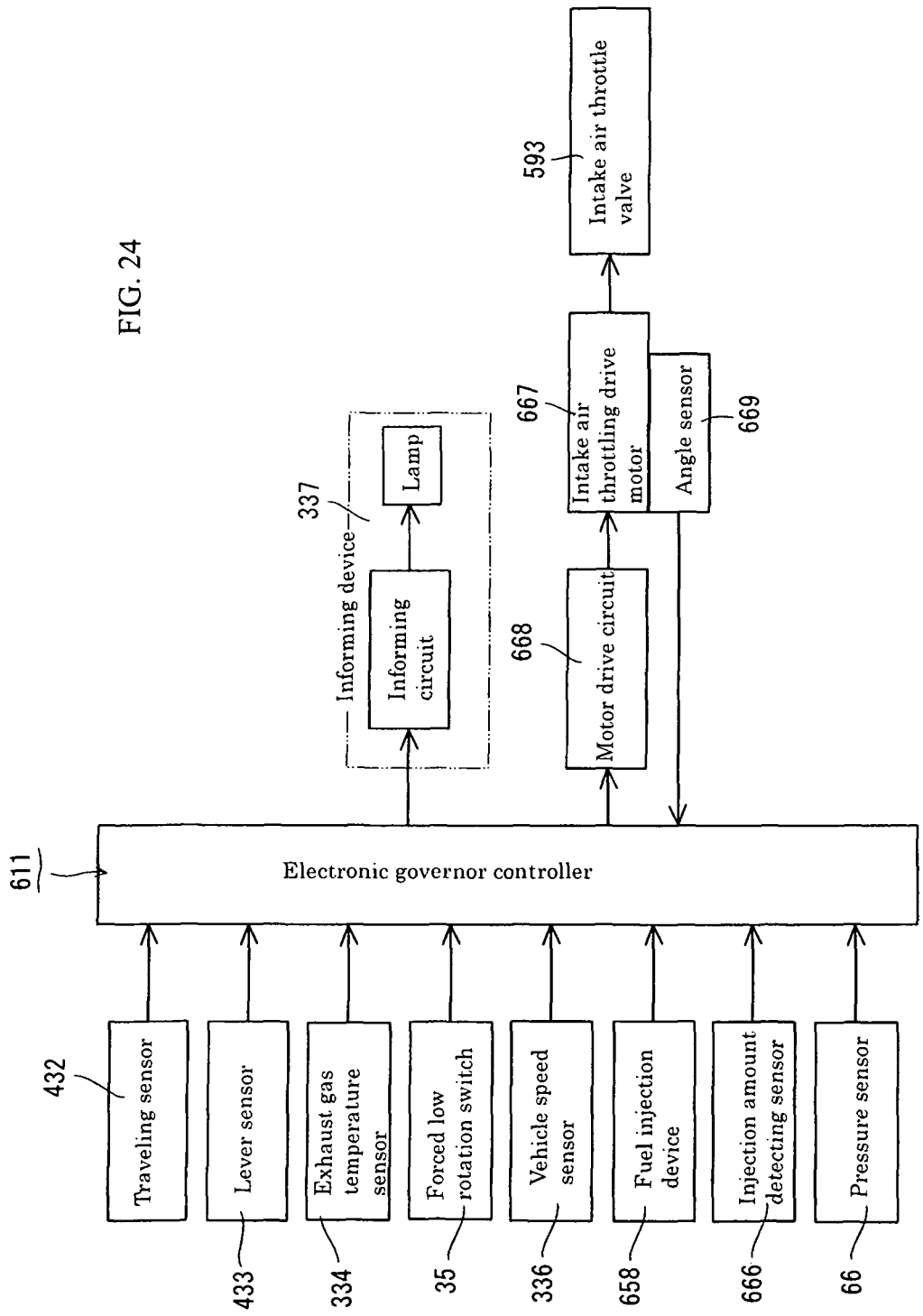
FIG. 24 is a function block diagram of an electronic governor type controller according to a fourth embodiment.
Figure 25:
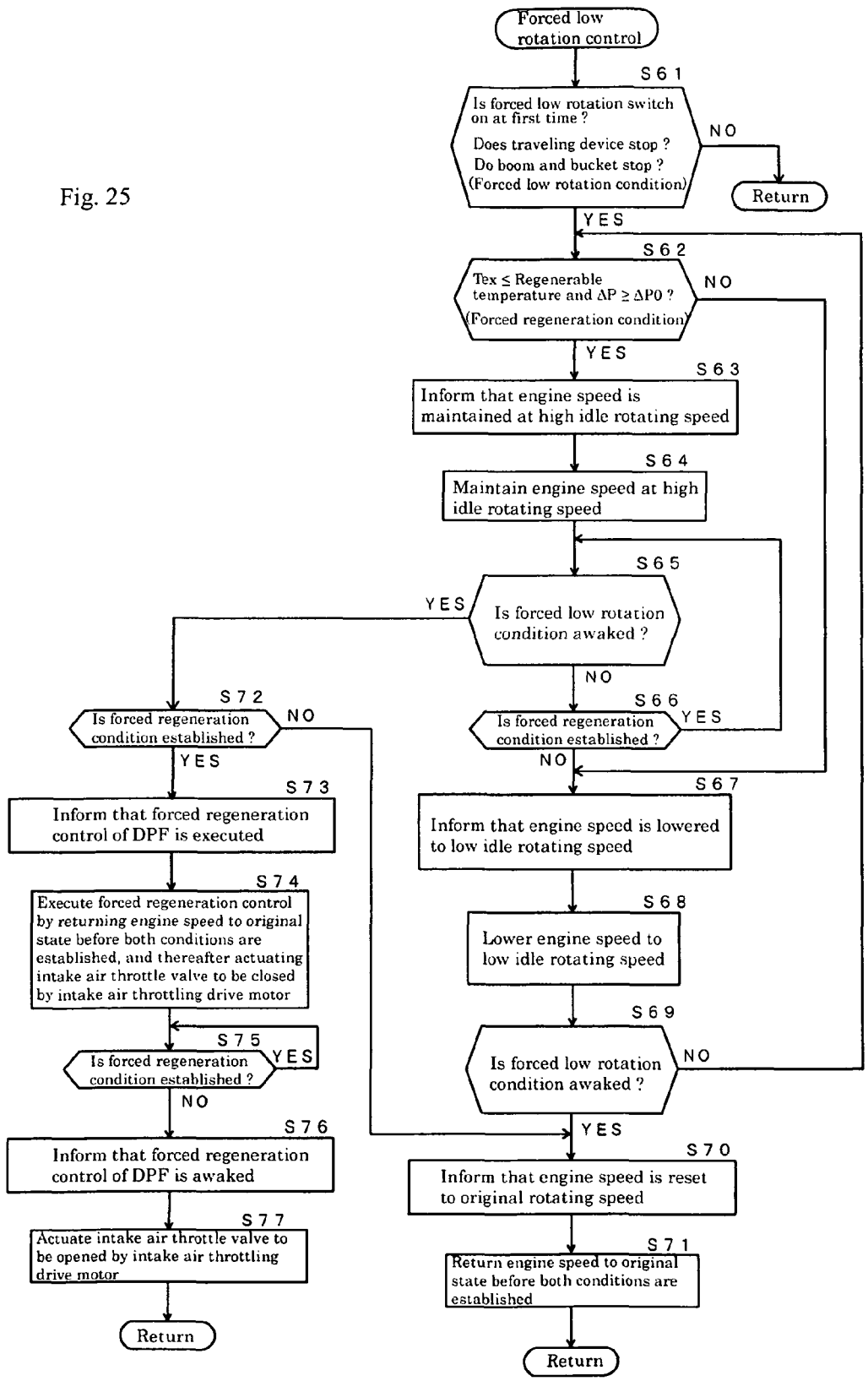
FIG. 25 is a flow chart of a forced low rotation control.

FIG. 24 and FIG. 25 show a fourth embodiment in the case that the present invention is applied to the hydraulic shovel which mounts the electronic governor type diesel engine thereon. In the fourth embodiment, since the structures of the hydraulic shovel 400 and the diesel engine 570 are basically the same as the third embodiment, a detailed description will be omitted by attaching the same reference numerals as the reference numerals of the third embodiment.

(4-1) Structure for Executing Fuel Injection Control and Control Aspect of the Same The electronic governor controller 611 which serves as the control means mounted on the hydraulic shovel is set to execute a forced low rotation control (a one touch deceleration control) which lowers the engine speed to a predetermined first low rotating speed (a low idle rotating speed) at a time of operating the forced low rotation switch 35 so as to be turned on (a first time pushing operation), and to maintain the engine speed at a second low rotating speed (a high idle rotating speed) which is higher than the low idle rotating speed, for suppressing the reduction of the exhaust gas temperature, if a forced regeneration condition mentioned below is established at a time when both of the forced low rotation condition and the forced regeneration condition mentioned below are established. The electronic governor controller 611 has a central processing unit (CPU) and memory means (an illustration of which is omitted).

As shown in FIG. 24, to the electronic governor controller 611, there are electrically connected a fuel injection device 658 of the diesel engine 570, an injection amount detecting sensor 666 which detects a fuel injection amount from the fuel injection device 658, a potentiometer type traveling sensor 432 which detects an operation position of the traveling lever 415, a potentiometer type lever sensor 433 which detects an operation position of the operation lever 416, an exhaust gas temperature sensor 334 which detects an exhaust gas temperature of the exhaust manifold 571, a forced low rotation switch 35 which serves as forced low rotation operating means for executing a forced low rotation control forcibly lowering the engine speed to a predetermined first low rotating speed (a low idle rotating speed), a vehicle speed sensor 336 which detects a vehicle speed (a moving speed) of the hydraulic shovel 400, a pressure sensor 66 which detects a clogged state of the DPF 60, an informing device 337 which serves as the informing means, a motor drive circuit 668 with respect to an intake air throttling drive motor 667 which can rotate forward and backward, and an angle sensor 669 which detects a valve opening and closing angle of the intake air throttle valve 593. In this case, various blinking data of the informing device 337 is previously stored in memory means of the electronic governor controller 611.

In this case, as shown in a flow chart in FIG. 25, first of all, it is discriminated whether a position fixing state of a traveling lever 415 is detected by a traveling sensor 432, and a position fixing state of an operation lever 416 (a stop of the boom 411 and the bucket 413) is detected by a lever sensor 433, at a time of carrying out the pushing operation of the forced low rotation switch 35 at the first time, that is, whether the forced low rotation condition is established (a step S61). If the condition is established (YES in the step S61), it is next discriminated whether the detection value Tex of the exhaust gas temperature is equal to or less than the regenerable temperature (for example, about 300° C.), and the pressure difference $\Delta P$ between the detection value P of the pressure sensor 66 and the reference pressure value Ps is equal to or more than the critical pressure difference value $\Delta P0$, that is, whether the forced regeneration condition is established (a step S62).

If the forced regeneration condition is not established (NO in the step S62), the step goes to a step S67 mentioned below, and it is informed that the engine speed of the diesel engine 570 will be lowered to the low idle rotating speed (from the original rotating speed) for a predetermined time by the informing device 337 (details will be mentioned below).

When the forced regeneration condition is established (YES in the step S62), the particulate matter is piled up to some extent in the soot filter 65 and there is generated a state in which the regenerating motion of the soot filter 65 is hard to make progress. Then, it is next informed that the engine speed of the diesel engine 570 will be maintained at the high idle rotating speed, for a predetermined time by the informing device 337 (a step S63), and thereafter the injection state of the fuel from the fuel injection device 658 is regulated so as to maintain the engine speed of the diesel engine 570 to the high idle rotating speed which is higher than the low idle rotating speed, for suppressing the reduction of the exhaust gas temperature so as to prevent a deterioration of the clogged state of the DPF 60 (a step S64).

Further, it is discriminated whether the forced low rotation switch 35 is operated to be pushed at the second time, or whether the traveling lever 415 or the operation lever 416 is operated, that is, whether the forced low rotation condition is awaked (a step S65), if it is awaked (YES in the step S65), it is discriminated whether the forced regeneration condition mentioned above is established (a step S66). If the forced regeneration condition is not established (NO in the step S66), a sedimentation state of the particulate matter in the soot filter 65 is relaxed to some extent, so that it is informed that the engine speed of the diesel engine 570 will be lowered to the low idle rotating speed, for a predetermined time by the informing device 337 (a step S67), and thereafter the injection state of the fuel from the fuel injection device 658 is regulated so as to lower the engine speed of the diesel engine 570 to the low idle rotating speed (from the high idle rotating speed) (a step S68).

Next, it is discriminated whether the forced low rotation switch 35 is operated to be pushed at the second time, or whether the traveling lever 415 or the operation lever 416 is operated (whether the forced low rotation condition is awaked) (a step S69), and if it is not awaked (NO in the step S69), the step goes back to the step S62 mentioned above. If the forced low rotation condition is awaked (YES in the step S69), it is informed that the engine speed of the diesel engine 570 will be returned to the original rotating speed, for a predetermined time by the informing device 337 (a step S70), and thereafter the injection state of the fuel from the fuel injection device 658 is regulated so as to return the engine speed of the diesel engine 570 to the original rotating speed before both the conditions (the forced low rotation condition and the forced regeneration condition) are established (a step S71).

Turning to the step S65, if the pushing operation of the forced low rotation switch 35 at the second time, or the operation of the traveling lever 415 or the operation lever 416 (whether the forced low rotation condition is not awaked) is not established (NO in the step S65), it is next discriminated whether the forced regeneration condition is established (a step S72). If the forced regeneration condition is established (YES in the step S72), it is informed that the forced regeneration control of the DPF 60 will be executed, for a predetermined time by the informing device 337 (a step S73), and thereafter the forced regeneration control of the DPF 60 is executed after returning the engine speed of the diesel engine 570 to the original rotating speed before both the conditions (the forced low rotation condition and the forced regeneration condition) are established (a step S74). In other words, the intake air throttle valve 593 is actuated so as to be closed by driving the intake air throttling drive motor 667. Thus, a load of the diesel engine 570 is increased, and an output (a fuel injection amount) of the diesel engine 570 is increased for maintaining the engine speed. As a result, the exhaust gas temperature from the diesel engine 570 rises. Further, the particulate matter in the soot filter 65 forcibly burns. Next, if the forced regeneration condition is not established (NO in the step S75), it is informed that the forced regeneration control of the DPF 60 will be awaked, for a predetermined time by the informing device 337 (a step S76), thereafter the intake air throttle valve 593 is actuated so as to be opened by driving the intake air throttling drive motor 667, and returns the valve opening and closing angle of the intake air throttle valve 593 to the original state before the closing actuation (a step S77). Thus, since the load of the diesel engine 570 is reduced, the output (the fuel injection amount) of the diesel engine 570 is reduced for maintaining the engine speed.

Turning to the step S72, if the forced regeneration condition is not established (NO in the step S72), the step goes to a step S70, it is informed that the engine speed of the diesel engine 570 will be returned to the original rotating speed, for a predetermined time by the informing device 337, thereafter the injection state of the fuel from the fuel injection device 658 is regulated in a step S71, and the engine speed of the diesel engine 570 is returned to the original rotating speed before both the conditions (the automatic low rotation condition and the forced regeneration condition) are established.

As is apparent from the description mentioned above, the same operations and effects as those of the case of the first to third embodiments can be obtained in the case of being structured as the fourth embodiment.

(5) Fifth Embodiment

Figure 26:
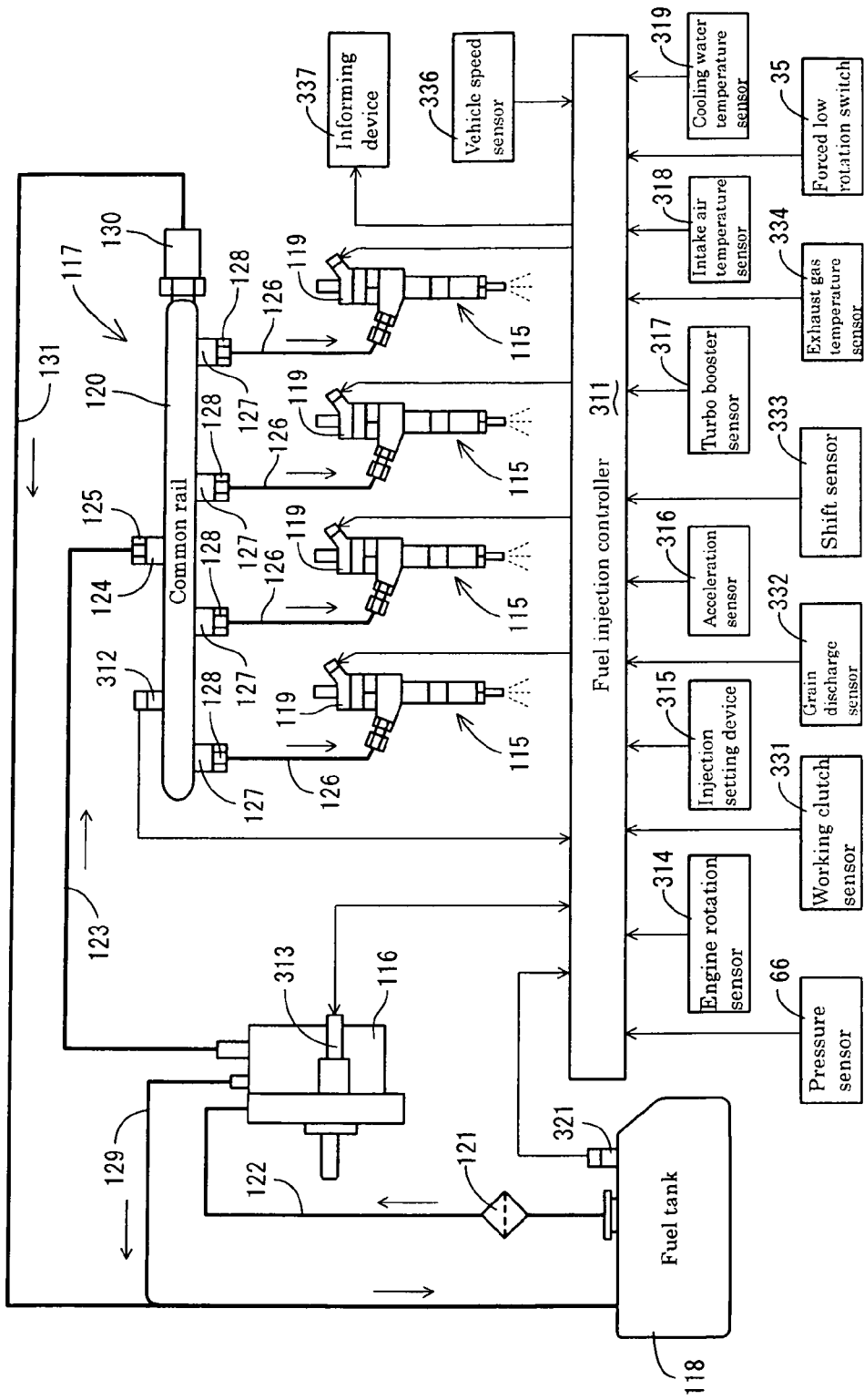
FIG. 26 is a fuel system explanatory view of a diesel engine according to a fifth embodiment.
Figure 27:
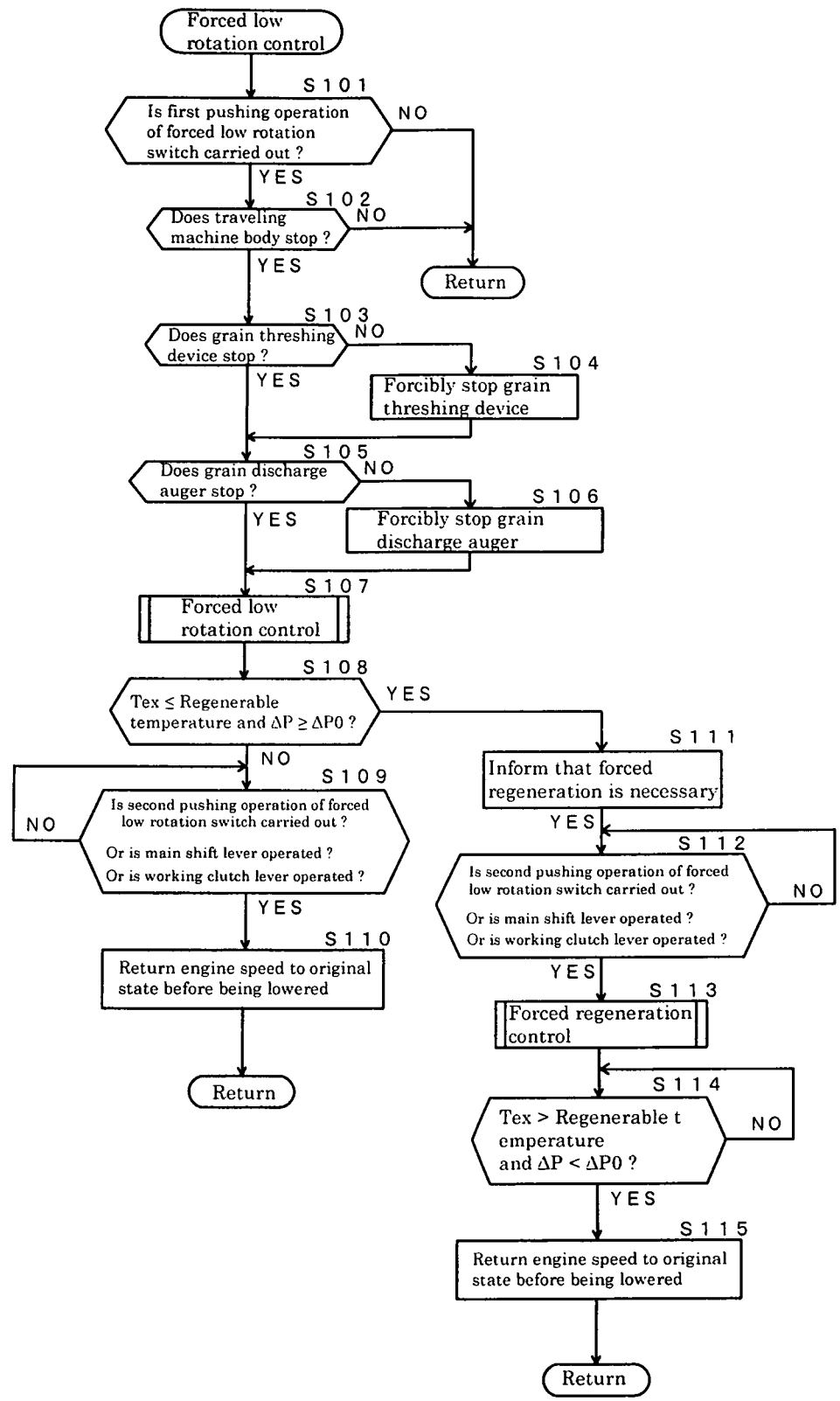
FIG. 27 is a flow chart of a forced low rotation control.

FIG. 26 and FIG. 27 show a fifth embodiment in the case of making the combined harvester execute the forced low rotation control. A basic structure of the fifth embodiment is in common with the first embodiment, however, this case is different from the first embodiment in a point that the forced low rotation switch 35 is employed in place of the deceleration switch 335 (refer to FIG. 26). The forced low rotation switch 35 is a reset type push switch (which may be called as a momentary switch), and is set such as to forcibly lower the engine speed to the low idle rotating speed by a push-down operation at the first time, and to return the engine speed to the original rotating speed before being lowered, from the low idle rotating speed by a push-down operation at the second time.

A fuel injection controller 311 according to the fifth embodiment is structured such as to execute a forced low rotation control in preference and inhibit the execution of the forced regeneration control at a time of operating the forced low rotation switch 35 to be turned on (the pushing operation at the first time), regardless of the necessity of the forced regeneration control, and to stop the forced low rotation control at a time of operating the forced low rotation switch 35 to push once again or operating the main shift lever 16 or the working clutch lever 18 with respect to the combined harvester, as one example of the fuel injection control. In addition, the fuel injection controller 311 is structured such as to execute the forced regeneration control if the clogged state in the DPF 60 reaches a previously set state (a state in which the DPF 60 is clogged enough to cause an output reduction of the diesel engine 70) at a time of stopping the forced low rotation control, and to return the engine speed to the original rotating speed before being lowered from the low idle rotating speed, if it does not reach the previously set state.

In this case, the forced low rotation control (the one touch deceleration control) means automatically lowering the engine speed to the low idle rotating speed (lowering the output of the diesel engine 70) by electronically controlling each of the fuel injection valves 119 so as to regulate the injection state (the injection pressure, the injection timing, and the injection period) of the fuel which is fed from each of the injectors 115, at a time of operating the forced low rotation switch 35 to be turned on (the pushing operation at the first time). The forced regeneration control means forcibly burning the particulate matter in the DPF 60 (the soot filter 65) by electrically controlling each of the fuel injection valves 119 so as to regulate the injection state of the fuel which is fed from each of the injectors 115, on the basis of the detection information of the pressure sensor 66 and the exhaust gas temperature sensor 334, thereby raising the output of the diesel engine 70 and raising the exhaust gas temperature.

According to the structure mentioned above, it is impossible to carry out the forced regeneration control raising the output of the diesel engine 70 in an overlapping manner during the execution of the forced low rotation control which descends the output of the diesel engine 70. Accordingly, it is possible to efficiently execute each of the controls without overlapping, in addition to coexistence of two fuel injection controls (the forced low rotation control and the forced regeneration control) which require the mutually opposed actions to the diesel engine 70. Therefore, the fuel consumption saving and the exhaust gas purification in the combined harvester are compatible. It is possible to do away with an uncomfortable feeling of an operator due to a rapid change of an engine noise.

Further, since the fuel injection controller 311 according to the fifth embodiment is structured such as to execute the forced regeneration control if the clogged state in the DPF 60 reaches the previously set state (the state in which the DPF 60 is clogged enough to cause the output reduction of the diesel engine 70), and to return the engine speed to the original rotating speed before being lowered from the low idle rotating speed if it does not reach the previously set state, at a time of operating the main shift lever 16 or the working clutch lever 18 with respect to the combined harvester so as to stop the forced low rotation control, it is possible to easily secure the output of the diesel engine 70 only by carrying out the operation for starting the combined harvester or the operation for driving the working portion (the grain threshing device 5 or the like) even if an operator fails to carry out the returning operation from the forced low rotation control (the push-down operation at the second time of the forced low rotation switch in the fifth embodiment). Therefore, it is possible to securely prevent such a problem that the diesel engine 70 rapidly stops due to a lack of the output or an overload by starting the combined harvester or driving the working portion by the low idle rotating speed, at a time of returning from the forced low rotation control.

Further, the fuel injection controller 311 according to the fifth embodiment is structured such as to inform by the informing device 337 that a forced regeneration of the DPF 60 (the soot filter 65) is necessary at a time when the clogged state in the DPF 60 reaches the previously set state (the state in which the DPF 60 is clogged enough to cause the output reduction of the diesel engine 70) during the execution of the forced low rotation control. Thus, it is possible to comprehend whether the clogging is generated in the DPF 60 (the soot filter 65), even during the execution of the forced low rotation control in which the forced regeneration control is inhibited, thereby calling an operator's attention to the clogging of the DPF 60. Since the forced low rotation control is executed, it is possible to avoid a trouble of a failure caused by the clogging of the DPF 60.

Next, a description will be given of one example of the forced low rotation control mentioned above with reference to a flow chart in FIG. 27. The forced low rotation control according to the fifth embodiment executes the forced low rotation control (a step S107) by making a stop of the grain threshing device 5 and the grain discharge auger 8 a condition (steps S103 to S106), if a neutral position operation of the main shift lever 16 (a stop of the traveling machine body 1) is detected by the vehicle speed sensor 336 (YES in a step S102), at a time of carrying out the push-down operation of the forced low rotation switch 35 at the first time (YES in a step S101). In other words, it lowers the engine speed of the diesel engine 70 to the low idle rotating speed by regulating the injection state of the fuel from each of the injectors 115.

In this case, the stop of the grain threshing device 5 is discriminated on the basis of the detection of the disconnecting operation of the working clutch lever 18 by the working clutch sensor 331 (the step S103), and the stop of the grain discharge auger 8 is detected by the grain discharge sensor 332 (the step S105). The structure is made such as to forcibly stop the grain threshing device 5 and the grain discharge auger 8 by driving an actuator (not shown) if both are driven (the steps S104 and S106).

Next to the step S107, it is discriminated whether a detection value Tex of the exhaust gas temperature is equal to or less than a regenerable temperature (for example, about 300° C.), and a pressure difference $\Delta P$ between a detection value P of the pressure sensor 66 and a reference pressure value Ps is equal to or more than a critical pressure difference value $\Delta P0$ (a step S108). If the condition is not established (NO in the step S108), the particulate matter is not piled up in the soot filter 65 very much. Therefore, it is next discriminated whether the forced low rotation switch 35 is operated to be pushed at the second time, or whether the main shift lever 16 or the working clutch lever 18 is operated (a step S109). If the condition is established (YES in the step S109), the forced low rotation control is stopped and the injection state of the fuel from each of the injectors 115 is regulated so as to return, and returns the engine speed of the diesel engine 70 to the original rotating speed before being lowered from the low idle rotating speed (a step S110).

Turning to the step S108, if the condition mentioned above is established (YES in the step S108), it comes to a state in which not only the particulate matter is piled up in the soot filter 65, but also a regenerating action of the soot filter 65 does not make progress. Accordingly, it is informed that the forced regeneration of the DPF 60 (the soot filter 65) is necessary, for a predetermined time by the informing device 337 (a step S111), and thereafter it is discriminated whether the forced low rotation switch 35 is operated to be pushed at the second time, or whether the main shift lever 16 or the working clutch lever 18 is operated (a step S112). If the condition is established (YES in the step S112), the forced low rotation control is stopped and the forced regeneration control of the DPF 60 is executed (a step S113). In other words, the exhaust gas temperature is raised by regulating the injection state of the fuel from each of the injectors 115 so as to raise the engine speed of the diesel engine 70 to the set rotating speed, thereby forcibly burning the particulate matter in the soot filter 65. Next, if the detection value Tex of the exhaust gas temperature goes beyond the regenerable temperature, and the pressure difference $\Delta P$ becomes less than the critical pressure difference value $\Delta P0$ (a step S114), the engine speed of the diesel engine 70 is returned to the original rotating speed before being lowered, from the set rotating speed, by regulating the injection state of the fuel from each of the injectors 115 (a step S115).

As is apparent from the description mentioned above, since in the engine device having the engine 70 which serves as the power source, the exhaust gas purifying filter device 60 which is arranged in the exhaust gas path of the engine 70, and the control means 311 which executes the forced regeneration control of the filter device 60 on the basis of the clogged state of the filter device 60 and the driving state of the engine 70 (the exhaust gas temperature), the engine device further comprises the forced low rotation operating means 35 for executing the forced low rotation control which forcibly lowers the engine speed to the predetermined low rotating speed (the low idle rotating speed), and the control means 311 is structured such as to execute the forced low rotation control in preference at a time of operating the forced low rotation operating means 35 to be turned on, regardless of necessity of the forced regeneration control, the forced regeneration control for raising the output of the engine 70 is not carried out in an overlapping manner, during the execution of the forced low rotation control for lowering the output of the engine 70. Thus, it is possible to efficiently execute each of the controls without overlapping, in addition to coexistence of two fuel injection controls (the forced low rotation control and the forced regeneration control) which require the mutually opposed actions to the engine 70. Therefore, it is possible to achieve such an effect that the fuel consumption saving and the exhaust gas purification in the combined harvester are compatible. Further, there is such an advantage that it is possible to do away with an uncomfortable feeling of an operator due to a rapid change of an engine noise.

Further, since the control means 311 is structured such as to stop the forced low rotation control at a time of operating the moving system operating means 16 or the working system operating means 18 with respect to the working machine on which the engine is mounted, execute the forced regeneration control if the clogged state of the filter device 60 reaches the previously set state (the state in which the filter 60 is clogged enough to cause the output reduction of the engine 70) at this time, and return the engine speed to the original rotating speed before being lowered if the clogged state of the filter device 60 does not reach the previously set state, it is possible to easily secure the output of the engine 70 only by carrying out the operation for starting the working machine or the operation for driving the working portion (the grain threshing device 5 or the like), even if an operator fails to carry out the returning operation from the forced low rotation control (the push-down operation at the second time of the forced low rotation operating means 35 in the fifth embodiment). Therefore, there is achieve such an effect that it is possible to securely prevent a problem that the engine 70 rapidly stops due to a lack of the output or the overload, by starting the working machine or driving the working portion under the low idle rotating speed, at a time of returning from the forced low rotation control.

Further, since the control means 311 is structured such as to inform by the informing means 337 which is connected to the control means 311 at a time when the clogged state in the filter device 60 reaches the previously set state (which is equal to or more than the critical pressure difference value ΔP0) during the execution of the forced low rotation control, there is achieved such an effect that it is possible to comprehend whether the clogging is generated in the filter device 60 so as to call an operator's attention to the clogging of the filter device 60, even during the execution of the forced low rotation control in which the forced regeneration control is inhibited. Since the forced low rotation control is executed, there is such an advantage that it is possible to avoid a trouble of a failure caused by the clogging of the filter device 60.

(6) Sixth Embodiment

Figure 28:
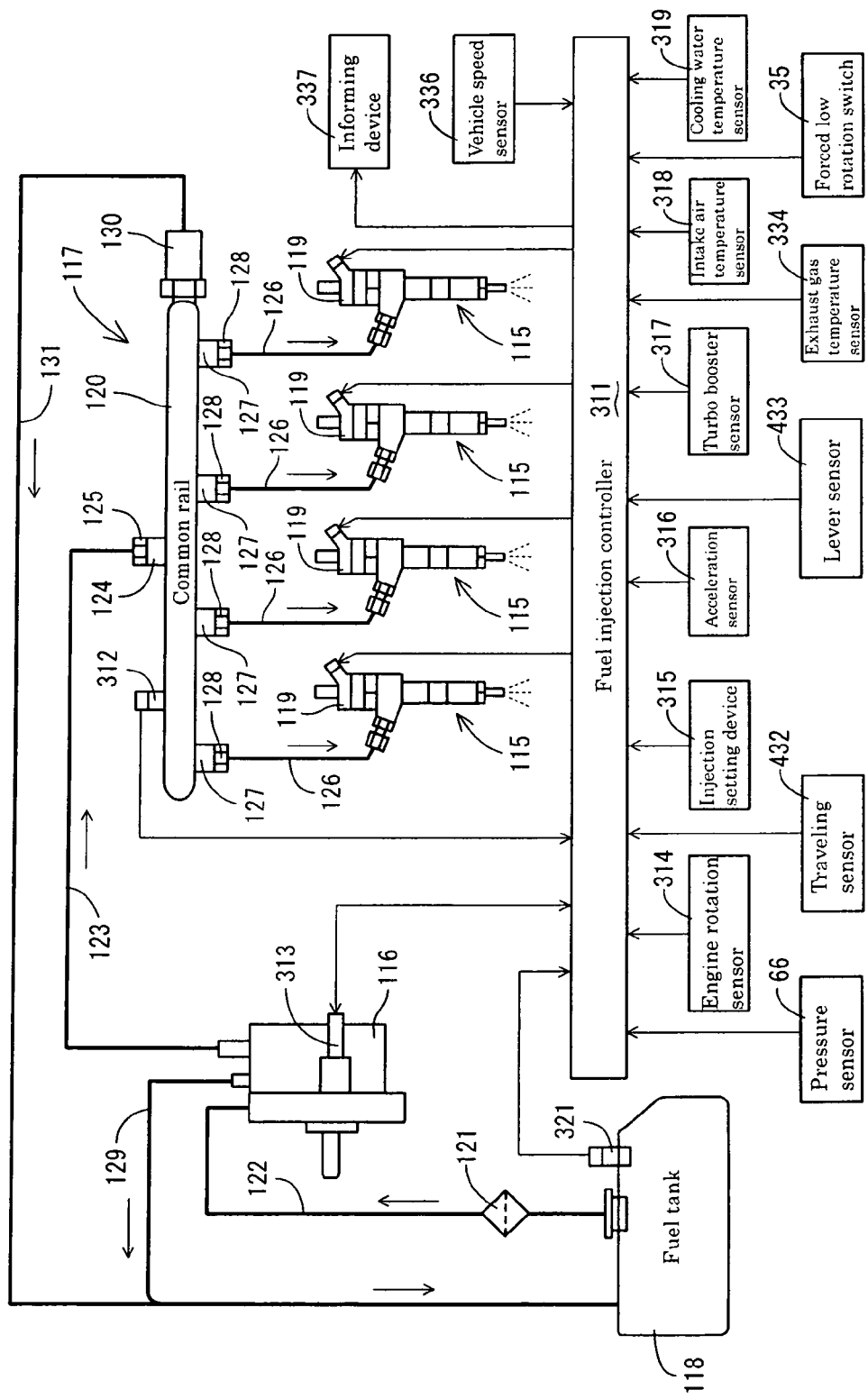
FIG. 28 is a fuel system explanatory view of a diesel engine according to a sixth embodiment.
Figure 29:
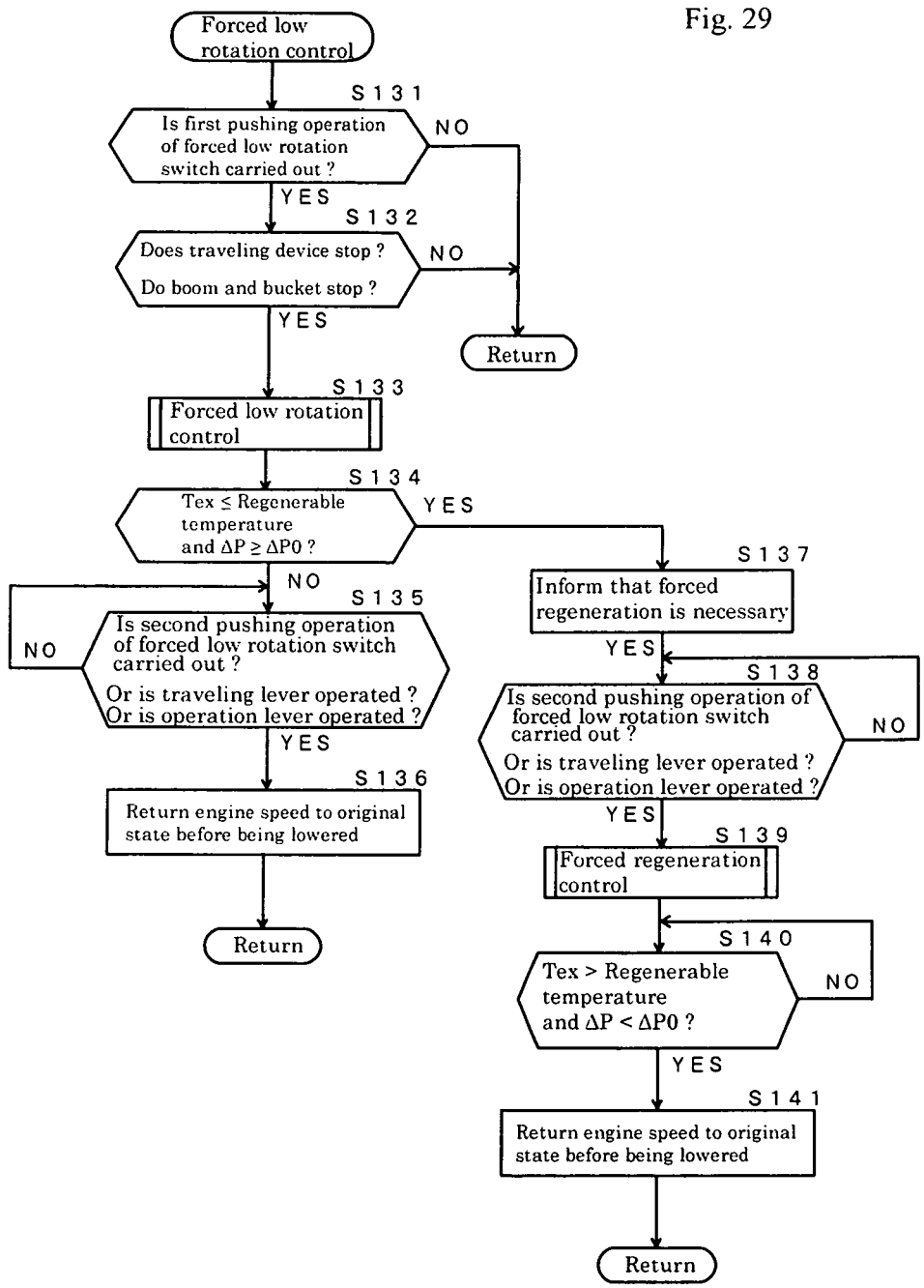
FIG. 29 is a flow chart of a forces low rotation control.

FIG. 28 and FIG. 29 show a sixth embodiment in the case of making the hydraulic shovel 400 execute the forced low rotation control. A basic structure of the sixth embodiment is in common with the second embodiment, however, this case is different from the second embodiment in a point that the forced low rotation switch 35 is employed in place of the deceleration switch 335 (refer to FIG. 28).

A fuel injection controller 311 according to the sixth embodiment is also structured such as to execute the forced low rotation control in preference and inhibit the execution of the forced regeneration control at a time of carrying out the operation of the forced low rotation switch 35 to be turned on (the pushing operation at the first time) regardless of the necessity of the forced regeneration control and to stop the forced low rotation control at a time of operating the forced low rotation switch 35 to push once again or operating the traveling lever 415 or the operating lever 416. In addition, the fuel injection controller 311 is structured such as to execute a forced regeneration control if a clogged state in the DPF 60 reaches a previously set state (a state in which the DPF 60 is clogged enough to cause an output reduction of the diesel engine 70) at a time of stopping the forced low rotation control, and return the engine speed to an original rotating speed before being lowered from a low idle rotating speed, if it does not reach the previously set state.

Next, a description will be given of one example of the forced low rotation control according to the sixth embodiment with reference to a flow chart in FIG. 29. The forced low rotation control according to the sixth embodiment executes the forced low rotation control (a step S133), if a position fixed state of a traveling lever 415 (a stop of the traveling device 402) is detected by a traveling sensor 432, and a position fixed state of an operating lever 416 (a stop of a boom 411 and a bucket 413) is detected by a lever sensor 433 (a step S132), at a time of carrying out the push-down operation of the forced low rotation switch 35 at the first time (YES in a step S131). In other words, it lowers the engine speed of the diesel engine 70 to the low idle rotating speed by regulating the injection state of the fuel from each of the injectors 115.

Next, it is discriminated whether a detection value Tex of the exhaust gas temperature is equal to or less than a regenerable temperature (for example, about 300° C.), and a pressure difference ΔP between a detection value P of the pressure sensor 66 and a reference pressure value Ps is equal to or more than a critical pressure difference value ΔP0 (a step S134). If the condition is not established (NO in the step S134), the particulate matter is not piled up in the soot filter 65 very much. Therefore, it is next discriminated whether the forced low rotation switch 35 is operated to be pushed at the second time, or whether the traveling lever 415 or the operating lever 416 is operated (a step S135). If the condition is established (YES in the step S135), the forced low rotation control is stopped and the injection state of the fuel from each of the injectors 115 is regulates so as to return, and returns the engine speed of the diesel engine 70 to the original rotating speed before being lowered from the low idle rotating speed (a step S136).

Turning to the step S134, if the condition mentioned above is established (YES in the step S134), it comes to a state in which not only the particulate matter is piled up in the soot filter 65, but also a regenerating action of the soot filter 65 does not make progress. Accordingly, it is informed that the forced regeneration of the DPF 60 (the soot filter 65) is necessary, for a predetermined time by the informing device 337 (a step S137), and thereafter it is discriminated whether the forced low rotation switch 35 is operated to be pushed at the second time, or whether the traveling lever 415 or the operating lever 416 is operated (a step S138). If the condition is established (YES in the step S138), the forced low rotation control is stopped and the forced regeneration control of the DPF 60 is executed (a step S139). In other words, the exhaust gas temperature is raised by regulating the injection state of the fuel from each of the injectors 115 so as to raise the engine speed of the diesel engine 70 to the set rotating speed, thereby forcibly burning the particulate matter in the soot filter 65. Next, if the detection value Tex of the exhaust gas temperature goes beyond the regenerable temperature, and the pressure difference ΔP becomes less than the critical pressure difference value ΔP0 (a step S140), the engine speed of the diesel engine 70 is returned to the original rotating speed before being lowered, from the set rotating speed, by regulating the injection state of the fuel from each of the injectors 115 (a step S141).

As is apparent from the description mentioned above, the same operations and effects as the case of the fifth embodiment can be obtained in the case of structuring such as the sixth embodiment.

(7) Seventh Embodiment

Figure 30:
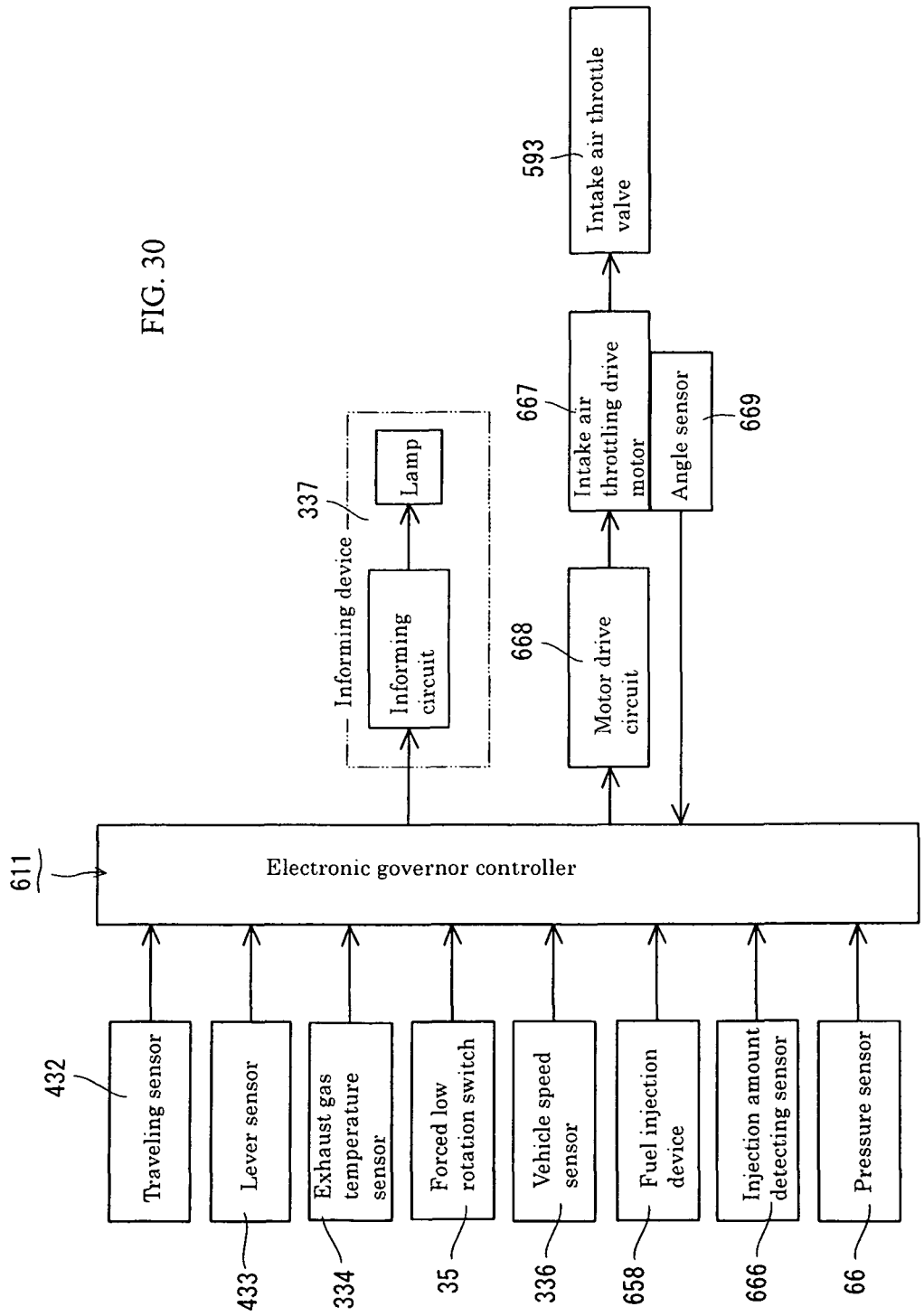
FIG. 30 is a function block diagram of an electronic governor controller according to a seventh embodiment.
Figure 31:
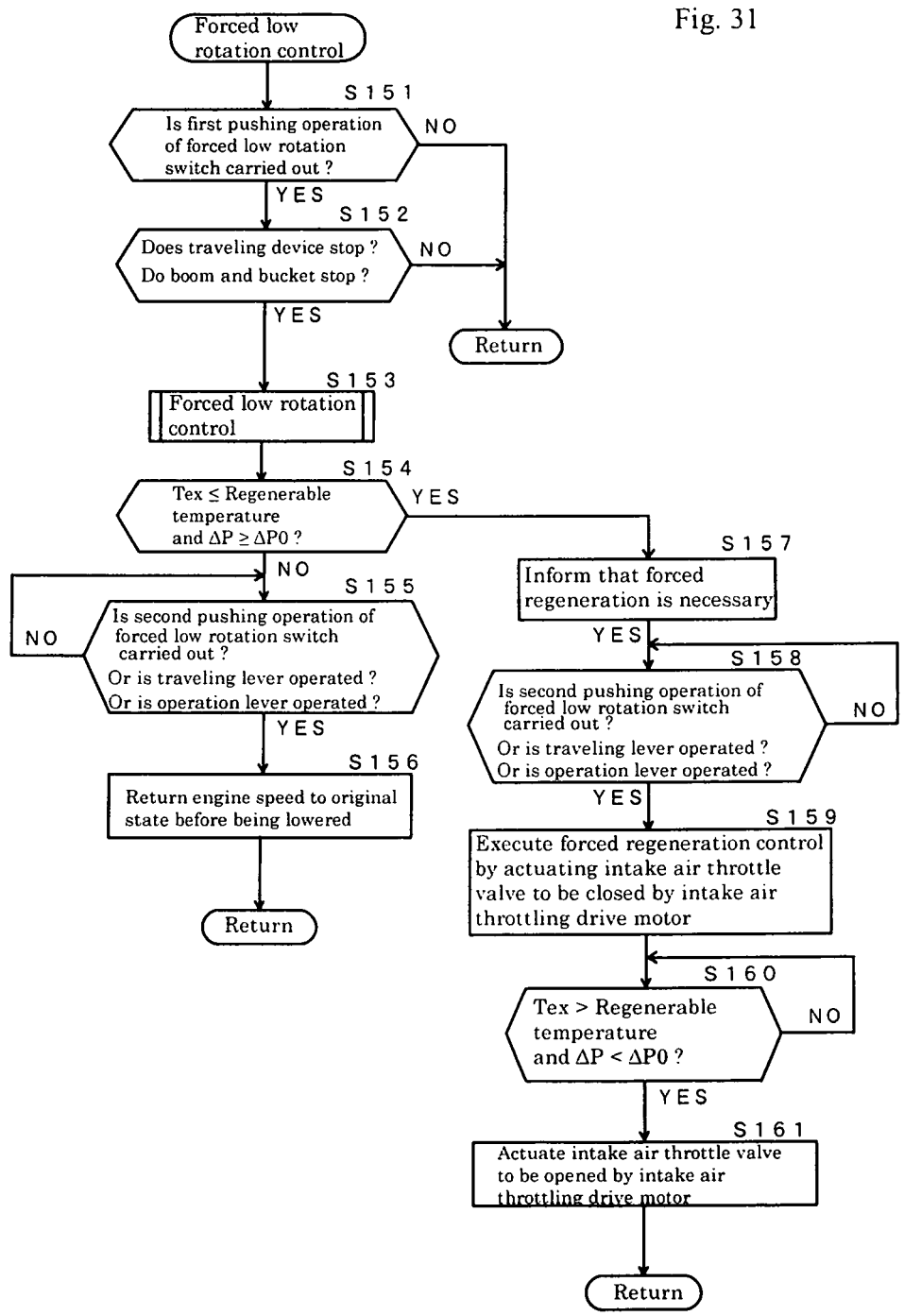
FIG. 31 is a flow chart of a forced low rotation control.

FIG. 30 and FIG. 31 show a seventh embodiment in the case of making the hydraulic shovel 400 mounting the electronic governor type diesel engine thereon execute the forced low rotation control. A basic structure of the seventh embodiment is in common with the third embodiment, however, this case is different from the third embodiment in a point that the forced low rotation switch 35 is employed in place of the deceleration switch 335 (refer to FIG. 30).

An electronic governor controller 611 according to the seventh embodiment is also structured such as to execute the forced low rotation control in preference and inhibit the execution of the forced regeneration control at a time of carrying out the operation of the forced low rotation switch 35 to be turned on (the pushing operation at the first time) regardless of the necessity of the forced regeneration control, and to stop the forced low rotation control at a time of opening the forced low rotation switch 35 to push once again or operating the traveling lever 415 or the operating lever 416, in the same manner as the fifth and sixth embodiments. In addition, the electronic governor controller 611 is structured such as to execute a forced regeneration control if a clogged state in the DPF 60 reaches a previously set state (a state in which the DPF 60 is clogged enough to cause an output reduction of the diesel engine 570) at a time of stopping the forced low rotation control, and return the engine speed to an original rotating speed before being lowered from a low idle rotating speed, if it does not reach the previously set state.

In this case, as shown in a flow chart in FIG. 31, the forced low rotation control is executed (a step S153), if a position fixed state of a traveling lever 415 (a stop of the traveling device 402) is detected by a traveling sensor 432, and a position fixed state of an operating lever 416 (a stop of a boom 411 and a bucket 413) is detected by a lever sensor 433 (a step S152), at a time of carrying out the push-down operation of the forced low rotation switch 35 at the first time (YES in a step S151). In other words, the engine speed of the diesel engine 570 is lowered to the low idle rotating speed by regulating the injection state of the fuel from a fuel injection device 658.

Next, it is discriminated whether a detection value Tex of the exhaust gas temperature is equal to or less than a regenerable temperature (for example, about 300° C.), and a pressure difference ΔP between a detection value P of the pressure sensor 66 and a reference pressure value Ps is equal to or more than a critical pressure difference value ΔP0 (a step S154). If the condition is not established (NO in the step S154), the particulate matter is not piled up in the soot filter 65 very much. Therefore, it is next discriminated whether the forced low rotation switch 35 is operated to be pushed at the second time, or whether the traveling lever 415 or the operating lever 416 is operated (a step S155). If the condition is established (YES in the step S155), the forced low rotation control is stopped and the injection state of the fuel from the fuel injection device 658 is regulated so as to return, and returns the engine speed of the diesel engine 570 to the original rotating speed before being lowered from the low idle rotating speed (a step S156).

Turning to the step S154, if the condition mentioned above is established (YES in the step S154), it comes to a state in which not only the particulate matter is piled up in the soot filter 65, but also a regenerating action of the soot filter 65 does not make progress. Accordingly, it is informed that the forced regeneration of the DPF 60 (the soot filter 65) is necessary, for a predetermined time by the informing device 337 (a step S157), and thereafter it is discriminated whether the forced low rotation switch 35 is operated to be pushed at the second time, or whether the traveling lever 415 or the operating lever 416 is operated (a step S158). If the condition is established (YES in the step S158), the forced low rotation control is stopped and the forced regeneration control of the DPF 60 is executed after returning the engine speed of the diesel engine 570 to the original rotating speed before being lowered (a step S159). In this case, an intake air throttle valve 593 is actuated to be closed by driving an intake air throttling drive motor 667. Accordingly, a load of the diesel engine 570 is increased, and an output (a fuel injection amount) of the diesel engine 570 is increased for maintaining the engine speed. As a result, an exhaust gas temperature from the diesel engine 570 rises. Further, the particulate matter in the soot filter 65 forcibly burns. Next, if the detection value Tex of the exhaust gas temperature goes beyond the regenerable temperature, and the pressure difference ΔP becomes less than the critical pressure difference value ΔP0 (a step S160), the intake air throttle valve 593 is actuated to be opened by driving the intake air throttling drive motor 667, and a valve opening and closing angle of the intake air throttle valve 593 is returned to the original state before being actuated to be closed (a step S161). Accordingly, since a load of the diesel engine 570 is reduced, the output (the fuel injection amount) of the diesel engine 570 is reduced for maintaining the engine speed.

As is apparent from the description mentioned above, the same operations and effects as the cases of the fifth and sixth embodiments can be obtained in the case of structuring such as the seventh embodiment.

(8) Others

The present invention is not limited to the embodiments mentioned above, but can be embodies into various aspects. For example, the engine of the working machine to which the present invention is applied may be of the common rail type or the electronic governor type. Further, the present invention can be applied to the automatic low rotation control (the auto deceleration control) and the forced low rotation control (the one touch deceleration control) as exemplified by the first to fourth embodiments. In other words, the low rotation control of the present invention is a concept including both of the automatic low rotation control (the auto deceleration control) and the forced low rotation control (the one touch deceleration control). The structure for the forced regeneration control is not limited to a type which controls the fuel injection amount and the exhaust gas throttling device, but may apply a dummy load utilizing a hydraulic device or the like to the engine, or may control the intake air throttle. The point is that the structure can forcibly raise the exhaust gas temperature. Further, the present invention can be applied to a power generator, a marine vessel or the like without being limited to the agricultural machine (the combined harvester, the tractor or the like) and the construction machine (the hydraulic shovel, the fork lift or the like). The working machine is used as a generic name of the agricultural machine, the construction machine, the power generator, the marine vessel and the like. In addition, the structure of each of the portions is not limited to the illustrated embodiments, but can be changed variously without departing from the spirit of the present invention.

REFERENCE SIGNS LIST

60 DPF
64 Diesel oxidation catalyst
65 Soot filter
66 Pressure sensor
70 Common rail type diesel engine
117 Common rail system
311 Fuel injection controller serving as control means
331 Working clutch sensor
332 Grain discharge sensor
333 Shift sensor
334 Exhaust gas temperature sensor
335 Deceleration switch
336 Vehicle speed sensor
337 Voice device
433 Lever sensor
570 Electronic governor type diesel engine
593 Intake air throttle valve
658 Fuel injection device

The invention claimed is:

1. An engine device comprising:
an engine which serves as a power source and has a rotating speed, the rotating speed including an operating rotating speed during a work operation;
an exhaust gas purifying filter device which is arranged in a path of an exhaust gas of the engine; and
a control means for coordinating lowering and raising of engine speed to achieve forced regeneration of said filter device during presence of a plurality of low rotation conditions, said control means being configured
to execute a low rotation control for lowering speed of the engine toward a predetermined first low rotating speed automatically in response to detection of the plurality of low rotation conditions,
to test for a forced regeneration condition during said low rotation control, and
to execute forced regeneration control when each one of two conditions are concurrently present, a first condition of the two conditions being that low rotation control is being executed, a second condition of the two conditions being that the forced regeneration condition is detected; and
wherein during said forced regeneration control, said control means is configured to modify said low rotation control, while the engine speed is being lowered toward the first low rotating speed, to a second rotation control for achieving a second low rotating speed, which is higher than the first low rotating speed, said second rotation control for suppressing a reduction of temperature of the exhaust gas so that filter regeneration may occur;
wherein, when said second rotation control ends in response to a termination of said filter forced regeneration condition before completion of said low rotation control, the control means is configured to resume lowering the engine speed to the first low rotating speed; and
wherein the control means is further configured to achieve and maintain the engine speed at the first low rotating speed when the filter forced regeneration condition is not detected, and
to adjust the engine speed back toward the operating rotating speed that prevailed before the low rotation conditions and the filter forced regeneration condition were established only after the low rotation conditions and forced regeneration condition have ended.

2. An engine device comprising:
an engine which serves as a power source;
an exhaust gas purifying filter device which is arranged in an exhaust gas path of the engine;
a control means which is configured to detect a forced regeneration condition of the filter device and to execute a forced regeneration control of the filter device; and
a forced low rotation switch coupled to the control means and that causes execution of a forced low rotation control by the control means which forcibly lowers the engine speed toward a predetermined low rotating speed; and
wherein the control means is configured to test for said forced regeneration condition during said forced low rotation control, while the engine speed is being lowered toward the first low rotating speed;
wherein the control means is configured to execute the forced regeneration control upon detection of two conditions being concurrently present, a first of the two conditions being that said low rotation control is being executed, and a second of the two conditions being that the filter forced regeneration condition is detected during said test for said forced regeneration condition;
wherein during said forced regeneration control, said control means is configured to modify said forced low rotation control to achieve a second low rotating speed, which is higher than the first low rotating speed, said forced regeneration control for suppressing a reduction of temperature of the exhaust gas so that filter regeneration may occur; and
wherein, when said forced regeneration control ends in response to a termination of said filter forced regeneration condition before completion of said low rotation control, the control means being configured to resume lowering the engine speed to the first low rotating speed.

* * * * *